US00RE45695E

(19) United States
(12) Reissued Patent
Oshima et al.

(10) Patent Number: US RE45,695 E
(45) Date of Reissued Patent: Sep. 29, 2015

(54) OPTICAL DISC

(75) Inventors: Mitsuaki Oshima, Kyoto (JP); Yasumori Hino, Nara (JP)

(73) Assignee: Panasonic Intellectual Property Corporation of America, Torrance, CA (US)

(21) Appl. No.: 13/462,117

(22) Filed: May 2, 2012

Related U.S. Patent Documents

Reissue of:
(64) Patent No.: 7,710,852
Issued: May 4, 2010
Appl. No.: 10/558,609
PCT Filed: May 28, 2004
PCT No.: PCT/JP2004/007796
§ 371 (c)(1),
(2), (4) Date: Sep. 27, 2006
PCT Pub. No.: WO2004/107331
PCT Pub. Date: Dec. 9, 2004

(30) Foreign Application Priority Data

May 30, 2003 (JP) ..... 2003-155691

(51) Int. Cl.
*G08B 13/14* (2006.01)
*G06K 7/00* (2006.01)

(52) U.S. Cl.
CPC ..... *G06K 7/0008* (2013.01)

(58) Field of Classification Search
None
See application file for complete search history.

(56) References Cited

U.S. PATENT DOCUMENTS 4,701,880 A 10/1987 Ichihara
5,119,353 A 6/1992 Asakura
5,450,492 A 9/1995 Hook et al.
5,465,381 A 11/1995 Schmidt et al.
5,479,384 A * 12/1995 Toth et al. ..... 369/14
5,539,267 A 7/1996 Fan et al.
5,572,226 A 11/1996 Tuttle
5,646,464 A 7/1997 Sickafus
5,652,838 A 7/1997 Lovett et al.
5,862,117 A * 1/1999 Fuentes et al. ..... 369/100
5,979,757 A 11/1999 Tracy et al.
6,044,046 A * 3/2000 Diezmann et al. ..... 369/14
6,226,109 B1 5/2001 Tompkin et al.
6,318,636 B1 11/2001 Reynolds et al.
6,359,596 B1 3/2002 Claiborne
6,400,272 B1 * 6/2002 Holtzman et al. ..... 340/572.1
6,617,963 B1 9/2003 Watters et al.
6,634,564 B2 10/2003 Kuramochi
6,961,540 B1 11/2005 Kondoh
7,086,073 B2 8/2006 Benedikt et al.

(Continued)

FOREIGN PATENT DOCUMENTS

JP 2306443 12/1990
JP H03-224799 10/1991

(Continued)

OTHER PUBLICATIONS

Japanese Office Action for corresponding Japanese Application No. 2009-209854 dated Apr. 13, 2011.

(Continued)

*Primary Examiner* — Nicholas Lee
(74) *Attorney, Agent, or Firm* — Renner, Otto, Boisselle & Sklar, LLP

(57) ABSTRACT

An optical disc according to the present invention includes a plurality of recording layers; a receiving section for receiving, from outside an optical disc, a switching instruction for switching a target layer to be targeted for recording or reproducing information among the plurality of the recording layers; and a switching section for switching the target layer among the plurality of recording layers, based on the switching instruction received.

3 Claims, 73 Drawing Sheets

(56) References Cited

U.S. PATENT DOCUMENTS

| | | | | |
|---|---|---|---|---|
| 7,096,221 | B2 | 8/2006 | Nakano | |
| 7,379,095 | B2 | 5/2008 | Kondoh | |
| 7,733,377 | B2 | 6/2010 | Kondoh | |
| 2001/0040507 | A1* | 11/2001 | Eckstein et al. | 340/572.4 |
| 2002/0026325 | A1 | 2/2002 | Hirahara et al. | |
| 2002/0059175 | A1 | 5/2002 | Nakano | |
| 2002/0078363 | A1 | 6/2002 | Hill et al. | |
| 2002/0097664 | A1* | 7/2002 | Ono et al. | 369/273 |
| 2002/0162894 | A1 | 11/2002 | Kuramochi | |
| 2003/0167207 | A1* | 9/2003 | Berardi et al. | 705/16 |
| 2003/0218941 | A1* | 11/2003 | Terao et al. | 369/13.01 |
| 2003/0223100 | A1 | 12/2003 | Anderson | |
| 2003/0227846 | A1* | 12/2003 | Lee et al. | 369/53.21 |
| 2004/0174435 | A1 | 9/2004 | Kondoh | |
| 2005/0026643 | A1 | 2/2005 | White et al. | |
| 2005/0270964 | A1* | 12/2005 | Ujino | 369/274 |
| 2006/0071795 | A1 | 4/2006 | Benedikt | |
| 2008/0068465 | A1 | 3/2008 | Kondoh | |

FOREIGN PATENT DOCUMENTS

| | | |
|---|---|---|
| JP | 06-309840 | 11/1994 |
| JP | 08-161790 | 6/1996 |
| JP | 09-198471 | 7/1997 |
| JP | 09-245381 | 9/1997 |
| JP | 11-007412 | 1/1999 |
| JP | 11-149532 | 6/1999 |
| JP | 11-203832 | 7/1999 |
| JP | 11-203847 | 7/1999 |
| JP | 2000-132871 | 5/2000 |
| JP | 2000-137773 | 5/2000 |
| JP | 2000-137777 | 5/2000 |
| JP | 2000-276558 | 10/2000 |
| JP | 2001-014277 | 1/2001 |
| JP | 2001-67842 | 3/2001 |
| JP | 2001-078166 | 3/2001 |
| JP | 2001-176088 | 6/2001 |
| JP | 2001-243308 | 9/2001 |
| JP | 2001-297568 | 10/2001 |
| JP | 2001-307464 | 11/2001 |
| JP | 2001-312496 | 11/2001 |
| JP | 2001-319380 | 11/2001 |
| JP | 2002-02217 | 1/2002 |
| JP | 2002-019921 | 1/2002 |
| JP | 2002-022177 | 1/2002 |
| JP | 2002-037417 | 2/2002 |
| JP | 2002-083278 | 3/2002 |
| JP | 2002-124891 | 4/2002 |
| JP | 2002-132595 | 5/2002 |
| JP | 2002-147929 | 5/2002 |
| JP | 2002-150142 | 5/2002 |
| JP | 2002-163613 | 6/2002 |
| JP | 2002-203224 | 7/2002 |
| JP | 2003-085502 | 3/2003 |
| JP | 2003-157477 | 5/2003 |
| JP | 2006-085823 | 3/2006 |
| JP | 2003-157477 | 5/2013 |
| WO | 94/18580 | 8/1994 |
| WO | 97/14144 | 4/1997 |
| WO | 00/23994 A1 | 4/2000 |
| WO | 00/65551 | 11/2000 |
| WO | WO 00/77700 A1 | 12/2000 |
| WO | 01/37082 A1 | 5/2001 |
| WO | 2004/077410 | 9/2004 |

OTHER PUBLICATIONS

International Search Report for corresponding Application No. PCT/JP2004/007796, mailed Jul. 13, 2004.

Supplementary Search Report for corresponding EP Application No. 04735392.5, issued on Nov. 26, 2008.

Japanese Office Action for corresponding Application No. 2012-284771 dated Jan. 21, 2013.

Japanese Office Action for corresponding Application No. 2012-284771 dated Mar. 6, 2013.

Japanese Office Action for corresponding Application No. 2012-103574 dated Nov. 28, 2012.

Japanese Office Action for corresponding Application No. 2012-103574 dated Oct. 26, 2012.

Korean Office Action for corresponding Application No. 2005-7002399 dated Jun. 18, 2009.

Japanese Office Action for corresponding Application No. 2004-527391 dated Oct. 31, 2008.

Japanese Office Action for corresponding Application No. 2004-527391 dated Jul. 29, 2008.

International Search Report for corresponding PCT/JP2003/010185 mailed Sep. 9, 2003.

"'Techno Forum' Optorom Computer Kino Naizo no Disk Kaihatsu", Nikkan Kogyo Shinbun, The Nikkan Kogyo Shinbun, Ltd., Tokyo JP, Sep. 29, 1997.

European Search Report for corresponding Application No. 12189660.9 dated May 29, 2013.

"Identification cards—Contactless integrated circuit(s) cards—Proximity cards—Part 1: Physical characteristics", International Standard ISO/IEC No. 14443-1, dated Apr. 15, 2000.

"Identification cards—Contactless integrated circuit(s) cards—Vicinity cards—Part 1: Physical characteristics", International Standard ISO/IEC No. 15693-1, dated Jul. 15, 2000.

Japanese Office Action for related Japanese Application No. 2012-103573 mailed on Aug. 29, 2013.

Mell et al.; "The NIST Definition of Cloud Computing, National Institute of Standards and Technology Special Publication 800-145", Reports on Computer Systems Technology, Sep. 2011.

Extended European Search Report for corresponding Application No. 13152757.4 dated Jun. 26, 2013.

Supplementary European Search Report for corresponding European Application No. 03784639.1 dated Oct. 8, 2010.

Office Action for corresponding European Application No. 03784639.1 dated Sep. 12, 2011.

Office Action for corresponding Japanese Application No. 2013-215388 dated Mar. 4, 2014.

Summons to attend oral proceedings for the corresponding European patent application No. 04735392.5, Apr. 9, 2014.

Office Action for related U.S. Appl. No. 13/851,646 dated Jan. 30, 2015.

European Search report for corresponding European Patent Application No. 13152746.7 dated Dec. 22, 2014.

* cited by examiner

FIG.4
(a)
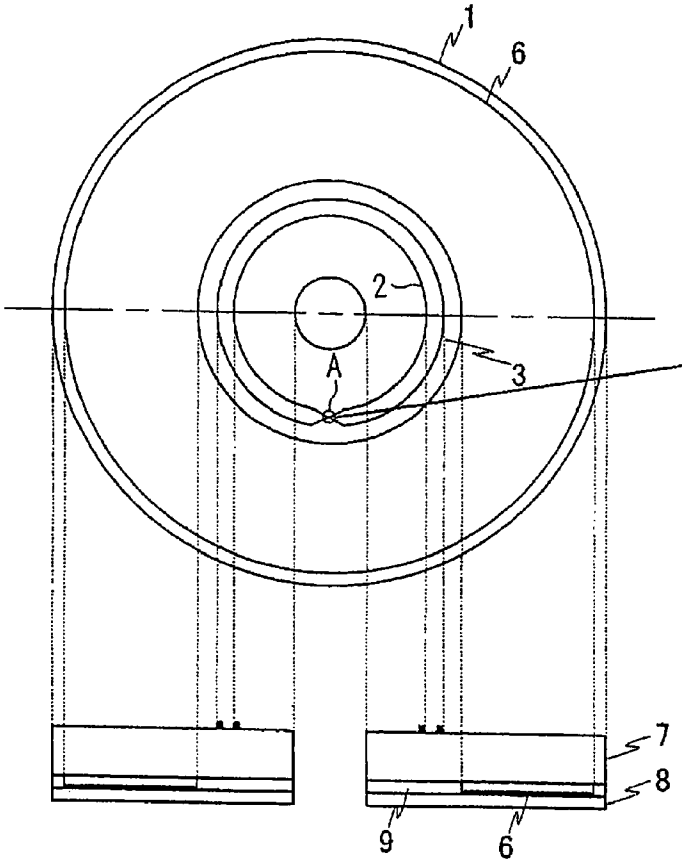
(b)
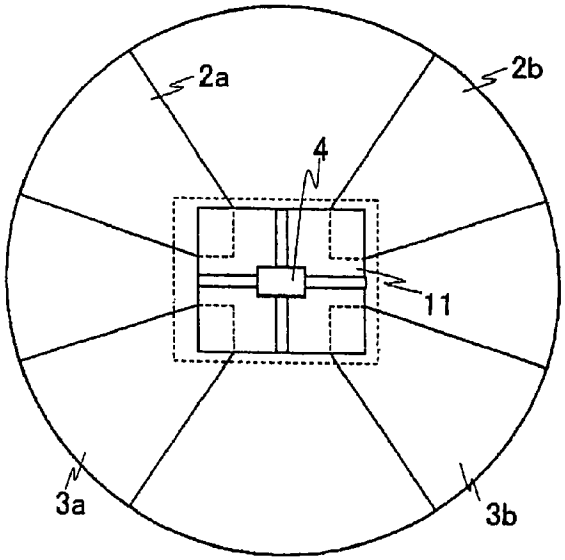

FIG.9

| ID information 37 | Disc management number 57 | Optical ID information 115 | Media ID 116 | Cryptographic key block 117 | Last update time 141 | Data reliability flag 142 | Total capacity 58 | Remaining capacity 59 | Disc physical property information 54 / Disc type 60 | | Disc logic information 55 / Program 70 | | |
|---|---|---|---|---|---|---|---|---|---|---|---|---|---|
| | | | | | | | | | Layer(s) 61 | Recording | Start address | End address | Recording time |
| | 01 | | | | | 0 | | | | | | | |
| | 02 | | | | | 1 | | | | | | | |
| | 03 | | | 141a | 0 | | | | | | | | |
| (e.g.) 128bit 1125cb26345··· | 04 | | | | 2002/01/01 | 1 | 50GB | 24GB | 2 | RW | | | |

53

FIG.36
Film fabrication method
13.5MHz
(a) Top plan view
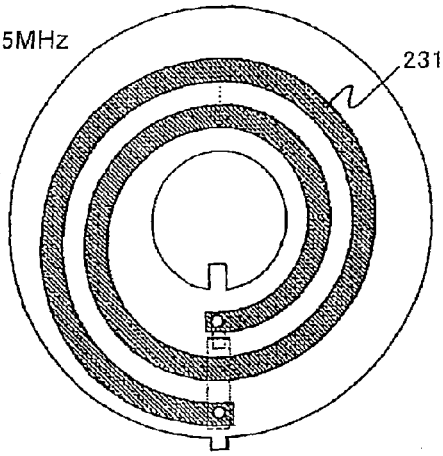
(b) Bottom plan view
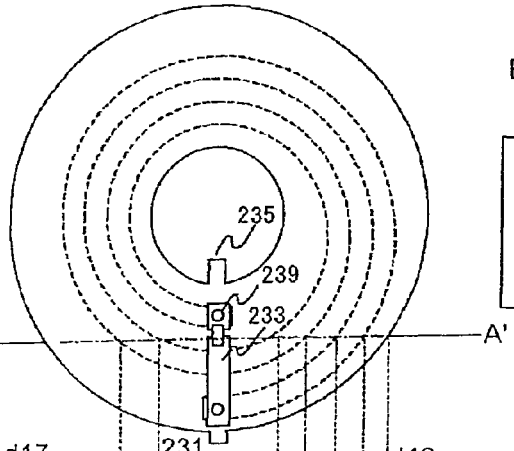
Enlarged view
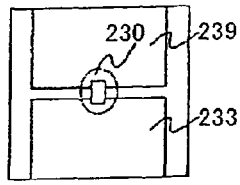
d13=15~20 μm
d14=8 μm
d15=50 μm
d16=15 μm
d17=8 μm
d19=50 μm
(c) Cross-sectional view along A-A'
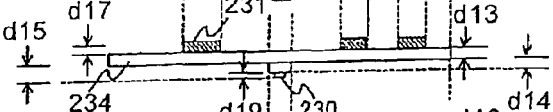
(d) Adhesive layer
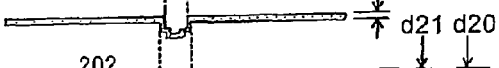
(e) Substrate
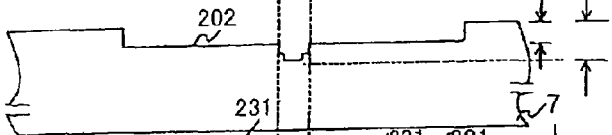
(f) Cross-sectional view after adhesion
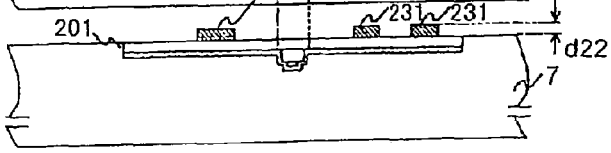

FIG.41

Structure of information layers
(fabrication methods: sputtering for all)

| Film thickness | Name | Material | Metal | Dielectric |
|---|---|---|---|---|
| 100nm (50nm × 2 ) | Reflection layer 257 | Ag alloy | Metal Good electric conductivity | |
| 10nm | Light absorption layer 256 | $Zn\text{-}SiO_2$ (metal) | Close to metal | |
| 30nm | Dielectric layer 255 | $Zn\text{-}SiO_2$ | | Dielectric |
| nm | Interface layer 254 | GeN (Dielectric) | | Dielectric |
| 10nm | Recording layer 253 | GeSbTe compound | | |
| nm | Interface layer 252 | GeN (Dielectric) | | Dielectric |
| 100nm (50nm × 2 ) | Dielectric layer 251 | $ZnS\text{-}SiO_2$ | | Dielectric |
| 0.6mm or 1.1mm or 0.075mm or 0.8mm or 1.2mm | Substrate 7 | Polycarbonate (PC) | | |

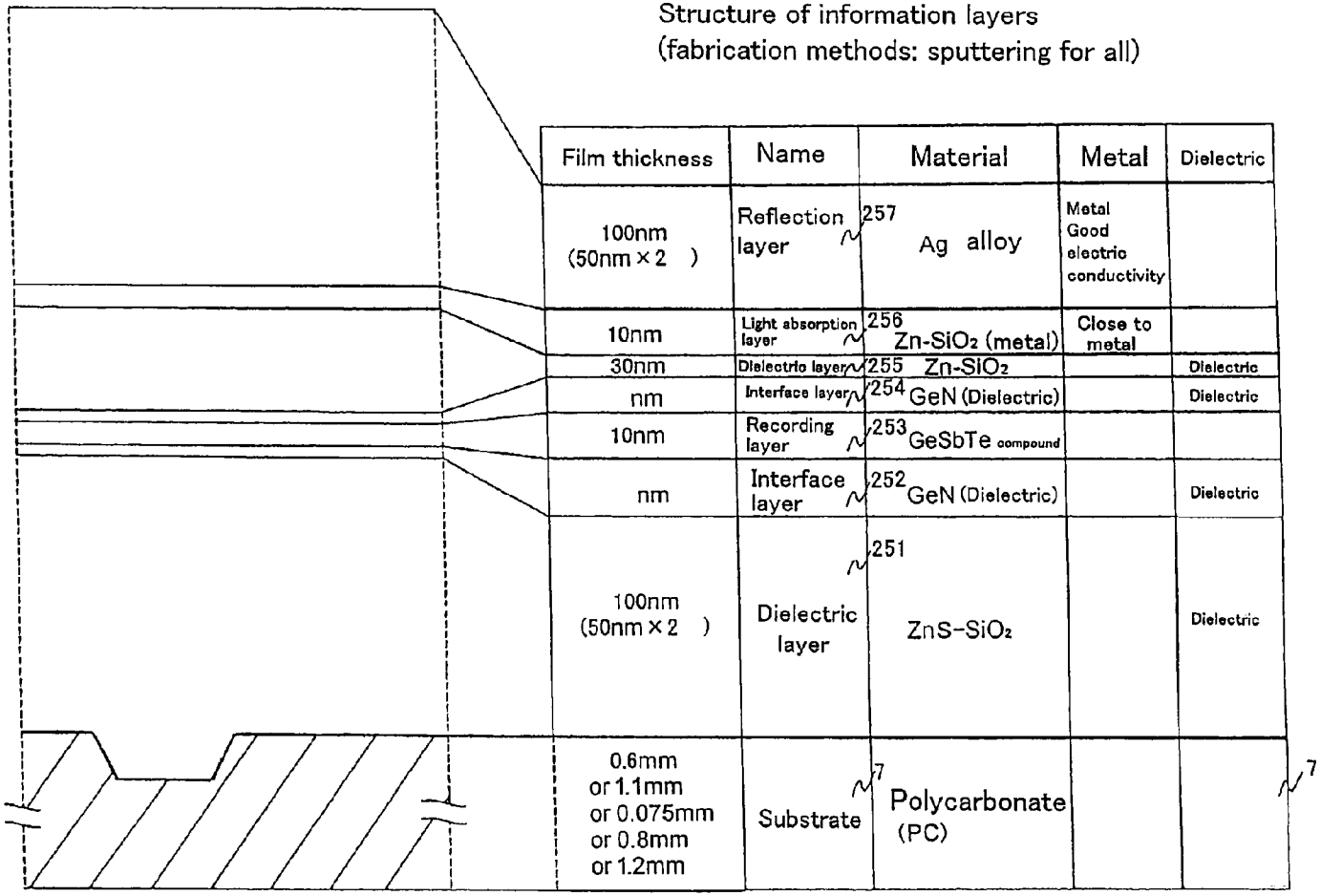

FIG.44
$$f = \frac{1}{2\pi\sqrt{LC}} \text{ (Hz)}$$
(a)
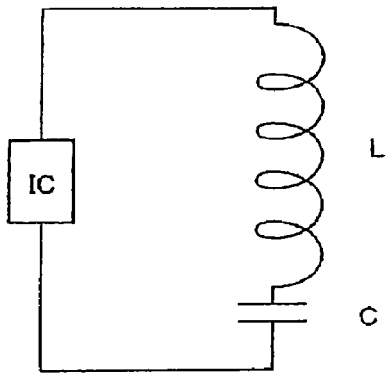
(b)
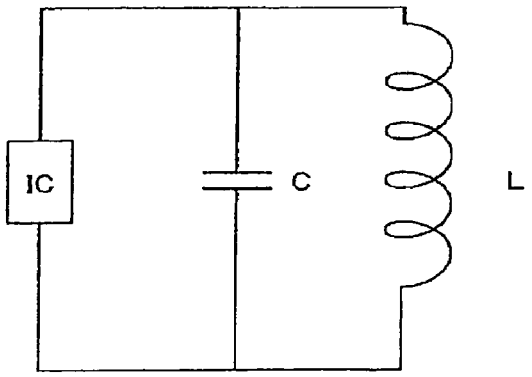
(c)
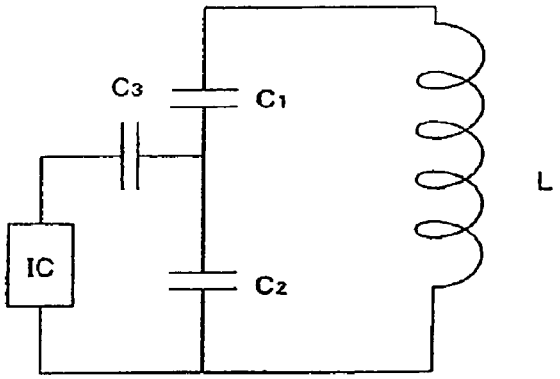

FIG.45
(a) Shape of mask
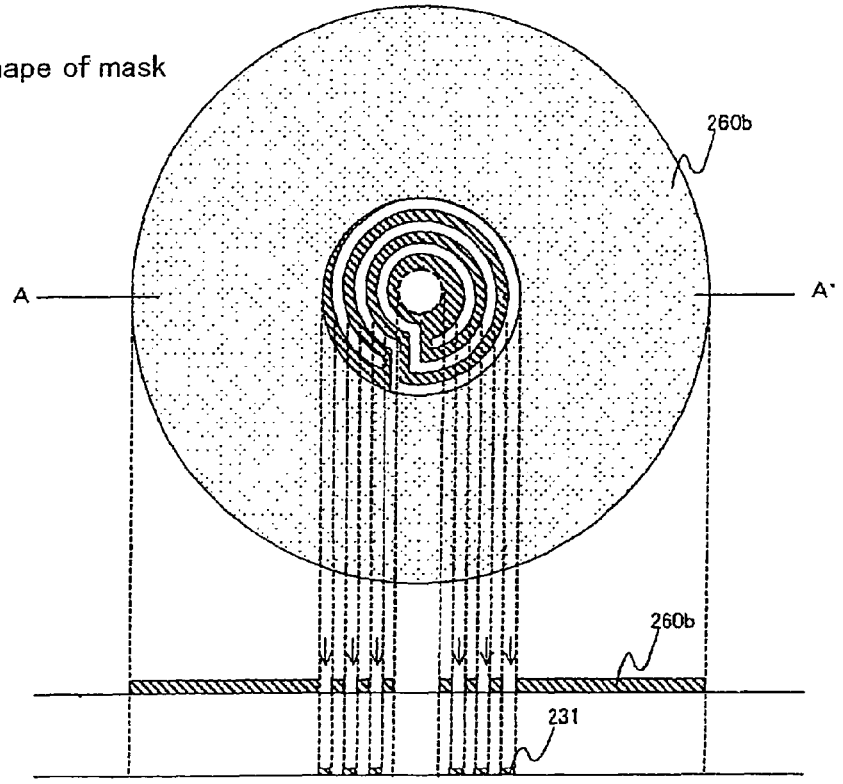
(b) Step of forming 4 discs at the same time
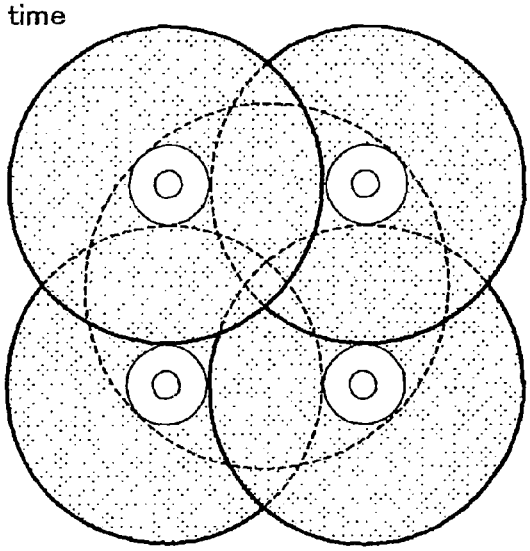

FIG.47
(a) Shape of mask
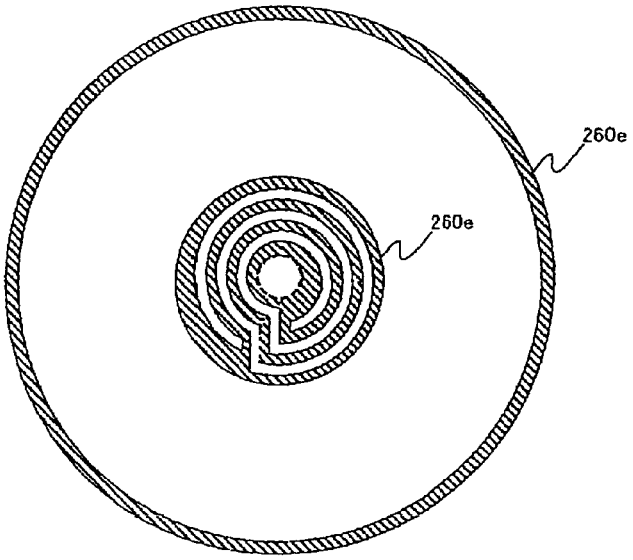
(b) Formation of antenna and reflection film
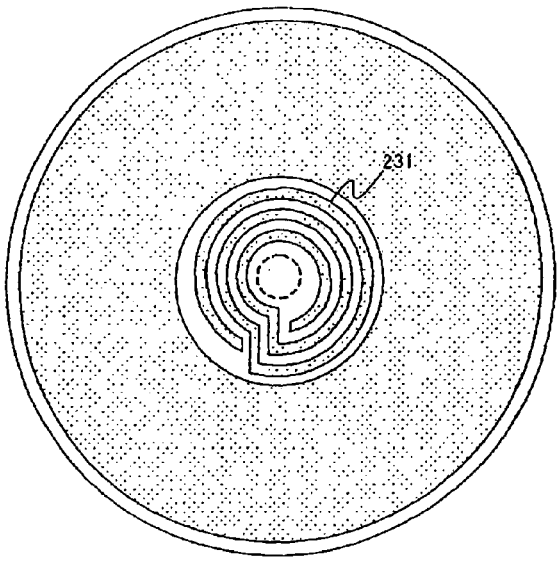

FIG.48
(a) Shape of mask
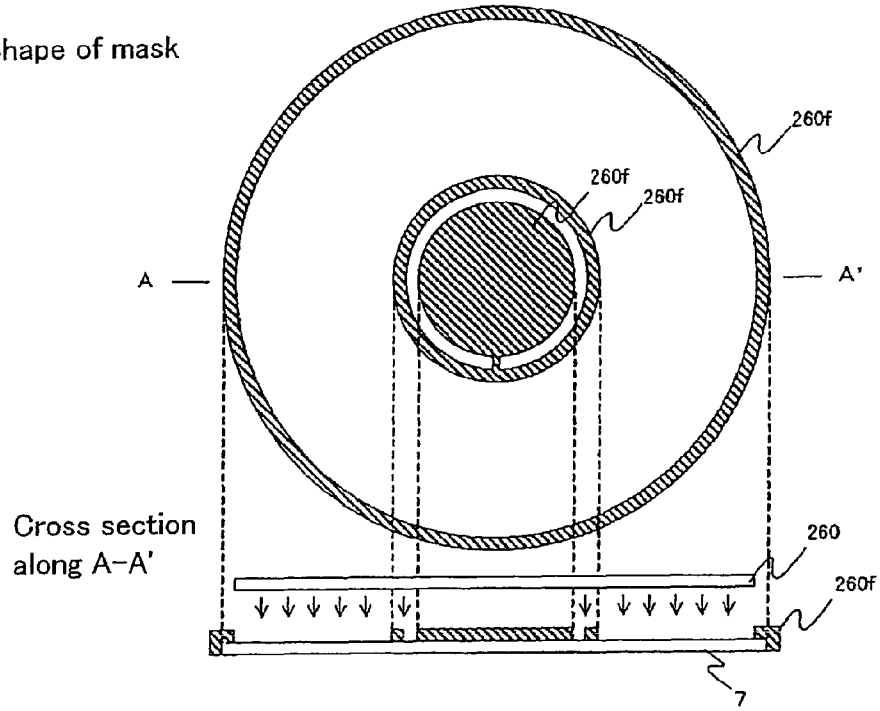
(b) Formation of antenna and reflection film
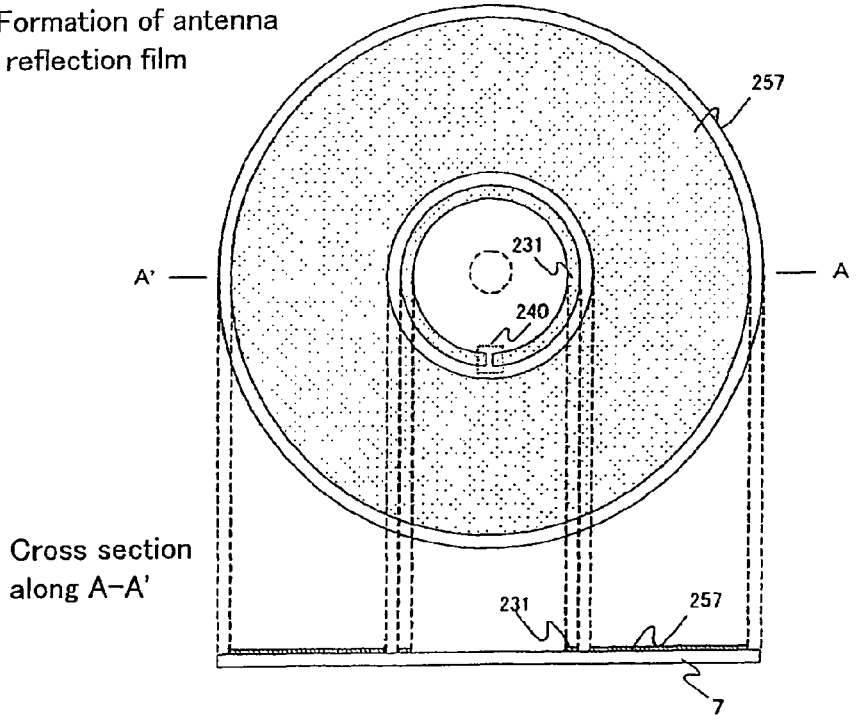

(a) Top plan view (b) Side view (c) Bottom plan view

FIG.54
(a)
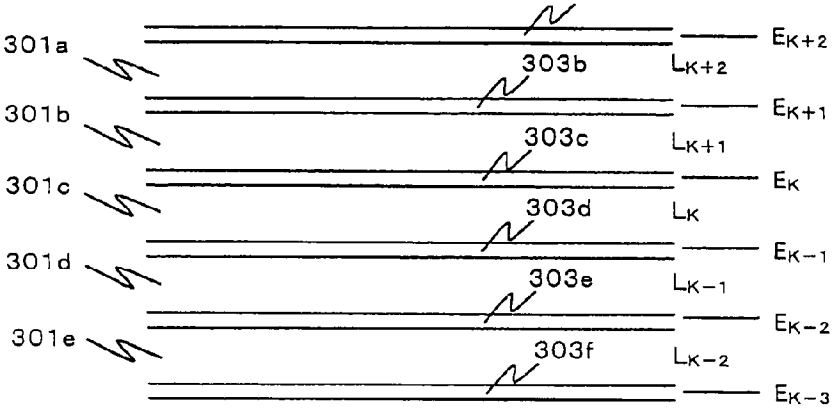
(b)
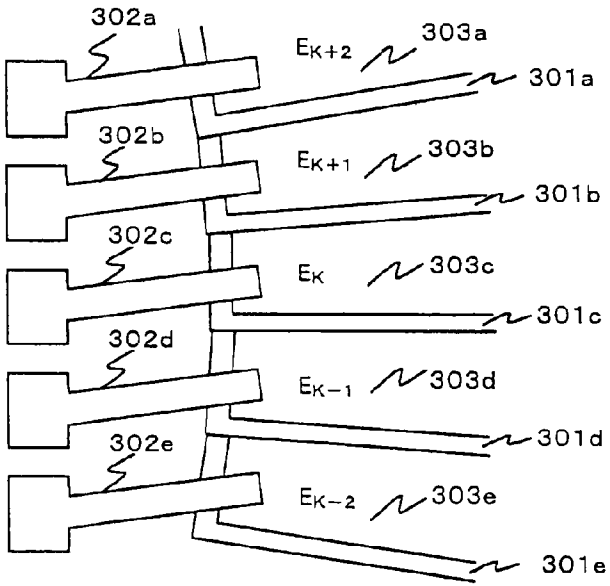

OPTICAL DISC

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD

The present invention relates to an optical disc and an apparatus for controlling tracking.

BACKGROUND ART

In recent years, ID information is becoming more important. Experimentation on incorporating integrated circuits including ID information has been attempted. Such kinds of applications are expected to continue in the future (see, for example, Japanese Laid-Open Publication No. 2002-83482). Conventionally, a method for physically searching a portable-type optical disc which includes an IC including ID information has not been proposed.

Portable-type optical discs are dispersed after recording of the contents due to their portability. Thus, there is a demand for a method of searching for contents which have been recorded in the portable optical discs. The objective of the present invention is to provide an optical disc and a remote control device which enable searching for contents recorded on an optical disc by mounting an IC including ID information on an optical disc.

The objective of the present invention is also to provide a multi-layer disc capable of switching a target layer without applying a voltage to a conducing layer of a disc directly from outside the disc.

The objective of the present invention is also to provide an apparatus capable of controlling tracking of a laser light irradiated onto a target layer even in the case where no track is provided on the target layer.

DISCLOSURE OF THE INVENTION

According to the present invention, a transmitting antenna and a receiving antenna are provided in an inner peripheral portion of an optical disc, and a transmission/reception IC which stores ID information of the optical disc is connected to the antennas.

With such an optical disc, a system which can search for ID information of an optical disc from a recording/reproduction apparatus over radio waves can be provided.

According to the present invention, an optical disc includes a receiving section for receiving a switching instruction for switching a target layer and a switching section for switching a target layer based on the received switching instruction. Thereby, the optical disc can switch a target layer without applying a voltage to a conducting layer of the optical disc directly from a recording/reproduction apparatus.

The present invention achieves control of tracking of a laser light to be irradiated onto a target layer by controlling tracking of another laser light. Thereby, even in the case where no track is provided on the target layer, tracking of a laser light irradiated onto the target layer can be controlled.

BRIEF DESCRIPTION OF THE DRAWINGS

FIG. 4(a) is a top view of an optical disc according to one embodiment of the present invention, and FIG. 4(b) is a top view of a tip portion of an optical disc according to one embodiment of the present invention.

FIG. 9 is a diagram showing a data structure of a disc information file according to one embodiment of the present invention.

FIGS. 36(a)-(f) are diagrams illustrating a step of producing an IC module according to one embodiment of the present invention.

FIG. 41 is a diagram showing a structure of an information layer according to one embodiment of the present invention.

FIGS. 44(a)-(c) are diagrams showing a resonance circuit according to some embodiments of the present invention.

FIG. 45(a) is a diagram showing a shape of a mask according to one embodiment of the present invention, and FIG. 45(b) is a diagram showing a step of forming four films at the same time according to one embodiment of the present invention.

FIG. 47(a) is a diagram showing a shape of a mask according to one embodiment of the present invention, and FIG. 47(b) is a top view of an antenna and a reflective film which have been formed according to one embodiment of the present invention.

FIG. 48(a) is a diagram showing a shape of a mask according to one embodiment of the present invention, and FIG. 48(b) is a top view of an antenna and a reflective film which have been formed according to one embodiment of the present invention.

FIG. 54(a) is a cross sectional-view of a disc according to one embodiment of the present invention, and FIG. 54(b) is a top view of a connecting point of a disc according to one embodiment of the present invention.

BEST MODE FOR CARRYING OUT THE INVENTION

Hereinafter, an embodiment of the present invention will be described with reference to the drawings.

(Structure of Optical Disc)

Hereinafter, an embodiment of the present invention when applied to a recording medium having a disc shape will be described.

Figure 1:
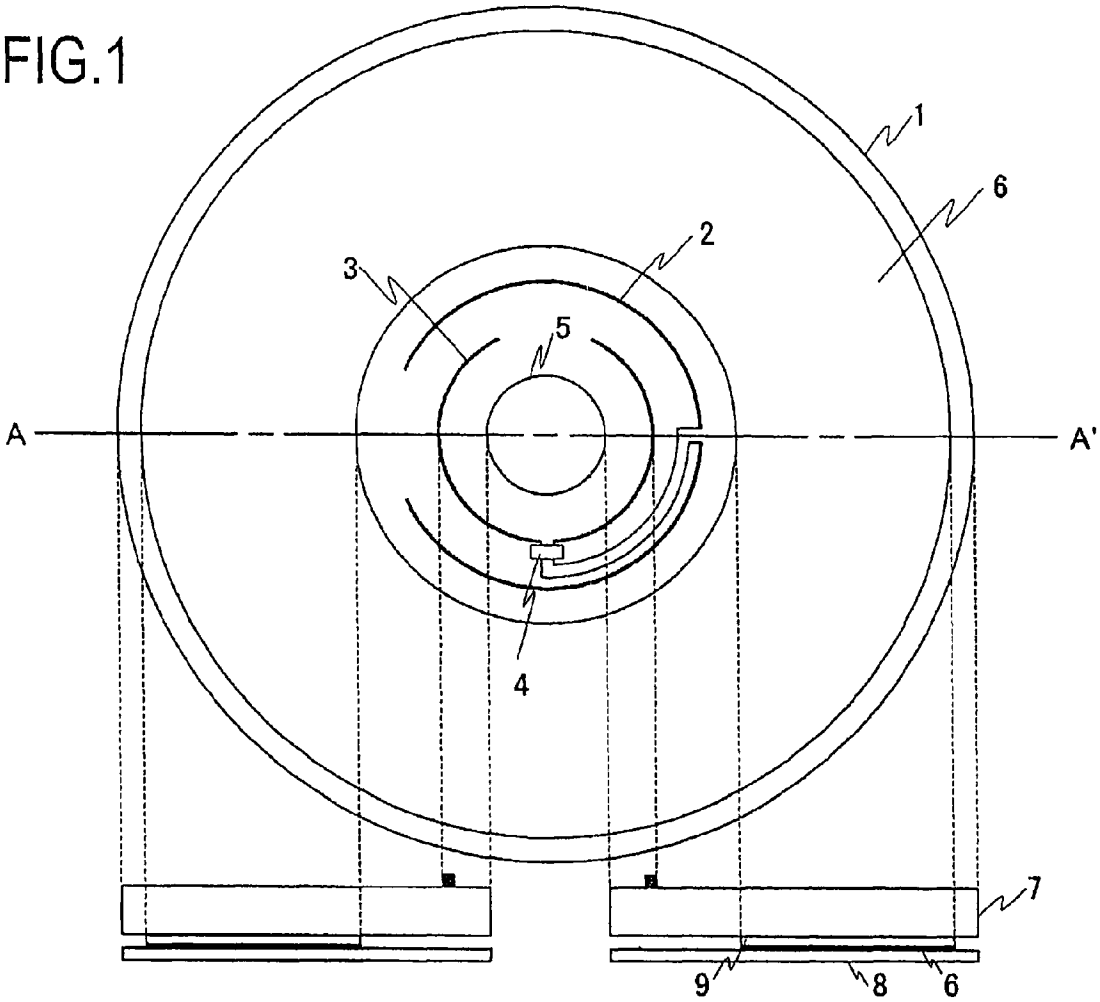
FIG. 1 is a top view of an optical disc according to one embodiment of the present invention.

FIG. 1 is a diagram showing an example of a structure of an optical disc 1 according to an embodiment of the present invention.

In an inner peripheral portion of the optical disc 1, a transmitting antenna 2 and a receiving antenna 3 are provided. The transmitting antenna 2 and the receiving antenna 3 are formed along a circumferential direction of the optical disc 1. In this example, the transmitting antenna 2 and the receiving antenna 3 are both dipole antennas.

In the inner peripheral portion of the optical disc 1, a transmission/reception IC 4 connected to the transmitting antenna 2 and the receiving antenna 3 is further provided. The transmission/reception IC 4 receives radio waves via the receiving antenna 3 and transmits radio waves via the transmitting antenna 2. In this example, the transmission/reception IC 4 is formed on a chip. The chip is called an RFID chip.

In a central portion of the optical disc 1, a hole 5 which allows the optical disc 1 to be attached to a rotation member for rotating the optical disc 1 is provided.

In an outer peripheral portion of the optical disc 1, an information layer 6, on which information can be recorded or from which information can be reproduced, is provided. The information layer 6 is formed between a substrate 7 and a transparent layer 8. An adhesive layer 9 is formed between the substrate 7 and the information layer 6.

Figure 2:
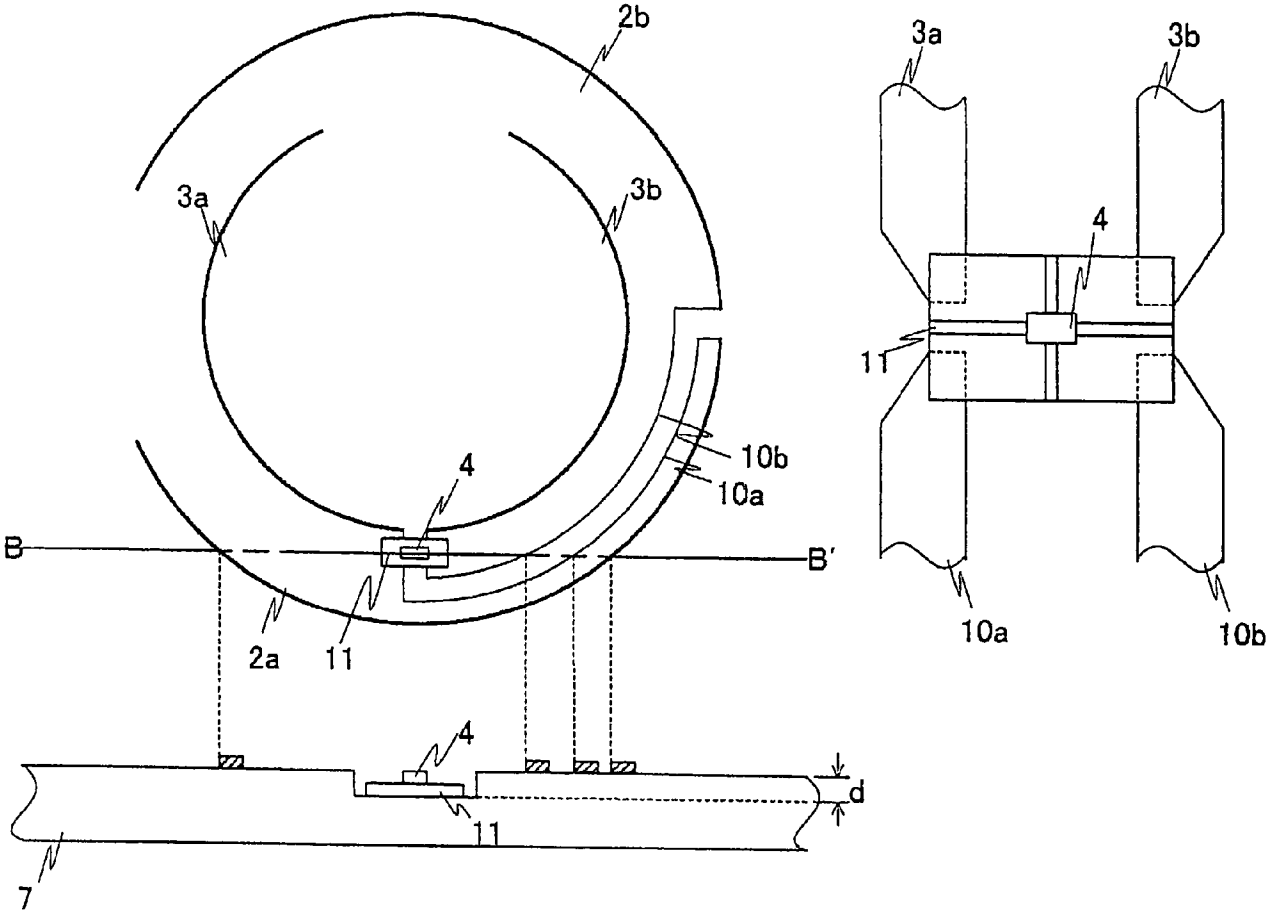
FIG. 2(a) is a top view of an optical disc according to one embodiment of the present invention.
FIG. 2(b) is a top view of a tip portion of an optical disc according to one embodiment of the present invention.

FIG. 2(a) is an enlarged view of a portion around the transmitting antenna 2 and the receiving antenna 3 shown in FIG. 1.

The transmitting antenna 2 includes transmitting antenna portions 2a and 2b. The receiving antenna 3 includes receiving antenna portions 3a and 3b. The transmitting antenna portions 2a and 2b are arranged so as to have an orientation shifted by 90° from an orientation of the receiving antenna portions 3a and 3b.

FIG. 2(b) is a portion around the transmission/reception IC 4 shown in FIG. 1.

The receiving antenna portions 3a and 3b are connected to the transmission/reception IC 4 via a relay substrate 11. The transmitting antenna portions 2a and 2b are connected to the transmission/reception IC 4 via wiring 10a and 10b and the relay substrate 11. The wiring 10a extends the transmitting antenna portion 2a. The wiring 10b extends the transmitting antenna portion 2b. The wiring 10a and 10b are parallel to each other.

As indicated by a cross-section along B-B' in FIG. 2(a) a portion of the substrate 7 in which the relay substrate 11 is located is dug down by thickness d. The thickness d is designed such that the transmission/reception IC 4 will not be in contact with a recording/reproduction apparatus when the optical disc 1 is attached to the recording/reproduction apparatus. Herein, the recording/reproduction apparatus is an apparatus which performs at least one of a recording operation for recording information on the optical disc 1 and a reproduction operation for reproducing information recorded on the optical disc 1.

When the length of the transmitting antenna portions 2a and 2b (or the receiving antenna portions 3a and 3b) of a dipole antenna is L and the wavelength is $\lambda$, $L=\lambda/4$ and $\lambda=300/f$. Thus, for a frequency of 2.4 GHz, $\lambda=125$ mm and $L=31.3$ mm. Accordingly, it is possible to provide the transmitting antenna 2 and the receiving antenna 3 in an inner peripheral portion of a standard optical disc having a diameter of 120 mm.

Figure 3:
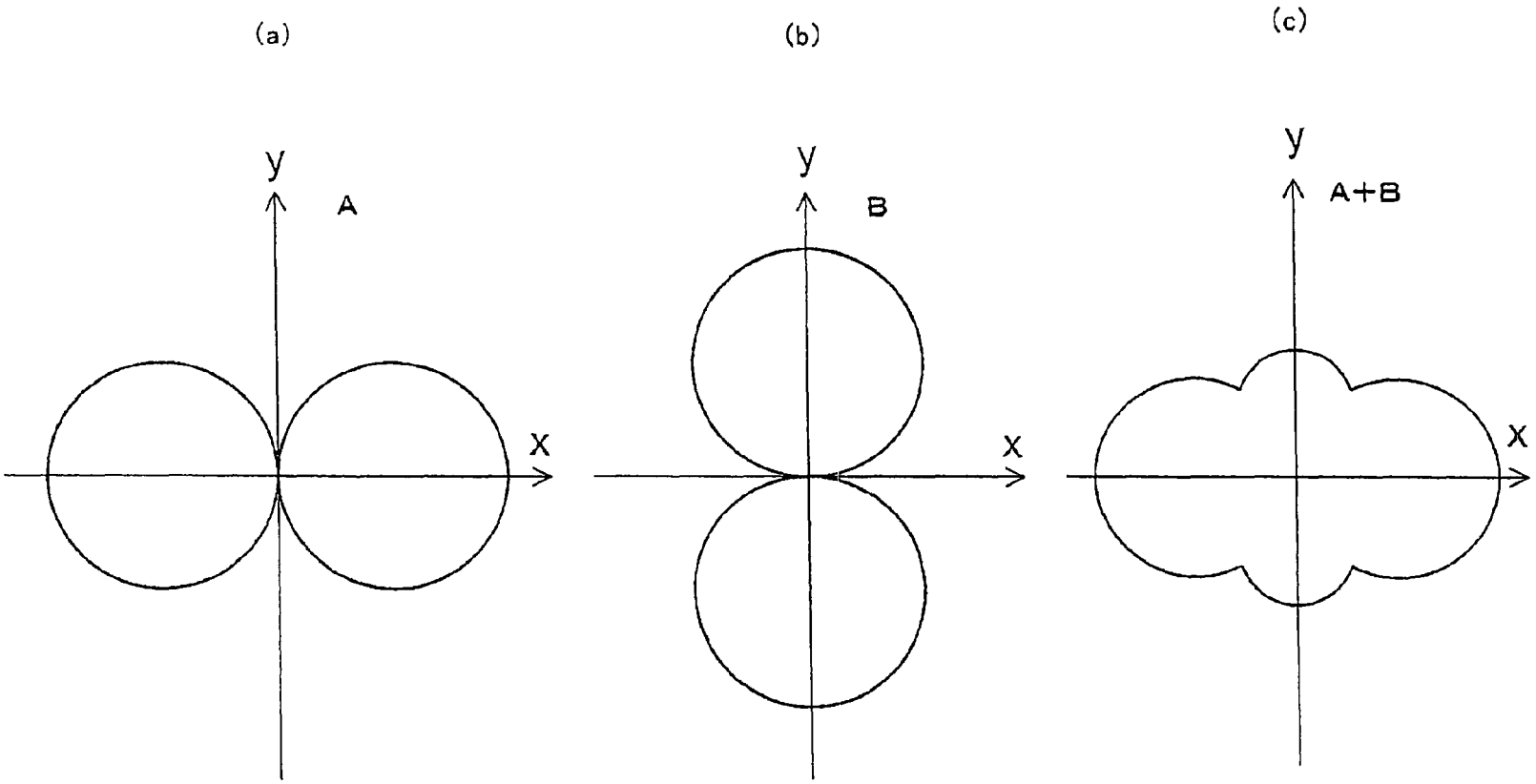
FIG. 3(a) is an electrolytic profile showing a directivity of an antenna A.
FIG. 3(b) is an electrolytic profile showing a directivity of an antenna B.
FIG. 3(c) is an electrolytic profile showing a directionality of the antenna A plus the antenna B.

With reference to FIG. 3, a directivity of dipole antennas will be described.

FIG. 3(a) shows a directivity of a dipole antenna A. It is shown that the antenna A is not sensitive in a longitudinal direction of dipoles of the antenna A (i.e., y direction).

FIG. 3(b) shows a directivity of a dipole antenna B shifted by 90° with respect to the dipole antenna A. It is shown that the antenna B is not sensitive in a longitudinal direction of dipoles of the antenna B (i.e., x direction).

FIG. 3(c) shows a directivity of an antenna in the case in which the dipole antenna A and the dipole antenna B are arranged in combination. The dipole antenna B is arranged so as to be shifted by 90° with respect to the dipole antenna A. It is shown that an antenna which is sensitive in all directions can be implemented by arranging the antennas A and B such that a dead zone of the antenna A and a dead zone of the antenna B are orthogonal to each other.

The transmitting antenna 2 (FIG. 1) and the receiving antenna 3 (FIG. 1) are arranged so that the dead zone of the transmitting antenna 2 and the dead zone of the receiving antenna 3 are orthogonal to each other. Thus, as shown in FIG. 3(c) an antenna which is sensitive in all directions can be implemented. As a result, regardless of an orientation of the optical disc 1, ID information (RFID) stored in the transmission/reception IC 4 of the optical disc 1 can be detected.

FIG. 4(a) shows another example of the structure of the optical disc 1 according to an embodiment of the present invention. In this example, a loop-type antenna is used instead of a dipole antenna.

In an inner peripheral portion of the optical disc 1, a transmitting antenna 2 and a receiving antenna 3 are provided. The transmitting antenna 2 and the receiving antenna 3 are formed along a circumferential direction of the optical disc 1. In this example, the transmitting antenna 2 and the receiving antenna 3 are both loop antennas. The receiving antenna 3 is positioned such than it is closer to the outer periphery compared to the receiving antenna 2.

In the inner peripheral portion of the optical disc 1, a transmission/reception IC 4 connected to the transmitting antenna 2 and the receiving antenna 3 is further provided (see FIG. 4(b)). The transmission/reception IC 4 receives radio waves via the receiving antenna 3 and transmits radio waves via the transmitting antenna 2.

FIG. 4(b) is an enlarged view of portion A shown in FIG. 4(a). Terminals 2a and 2b of the transmitting antenna 2 and terminals 3a and 3b of the receiving antenna 3 are connected to the transmission/reception IC 4 via a relay substrate 11.

When the length of the circumference of the loop antenna is L and the wavelength is λ, the antennas are set to be L=λ. Since λ=300/f, λ=125 mm. For a frequency f GHz, based on an empirical rule, a film thickness of an antenna is $2/\sqrt{f}$ μm. Accordingly, when f=2.45 GHz, a film thickness of an antenna may be 1.5 μm or more.

As described above, an antenna formed along a circumferential direction of an optical disc 1 and an optical disc 1 including a transmission/reception IC 4 for transmitting/receiving radio waves via the antennas are within the scope of the present invention. An antenna which is formed on the optical disc 1 is not limited to the above-mentioned two-types of antennas (i.e., dipole antenna and loop antenna).

(Method for Obtaining ID by Remote Control)

Figure 5:
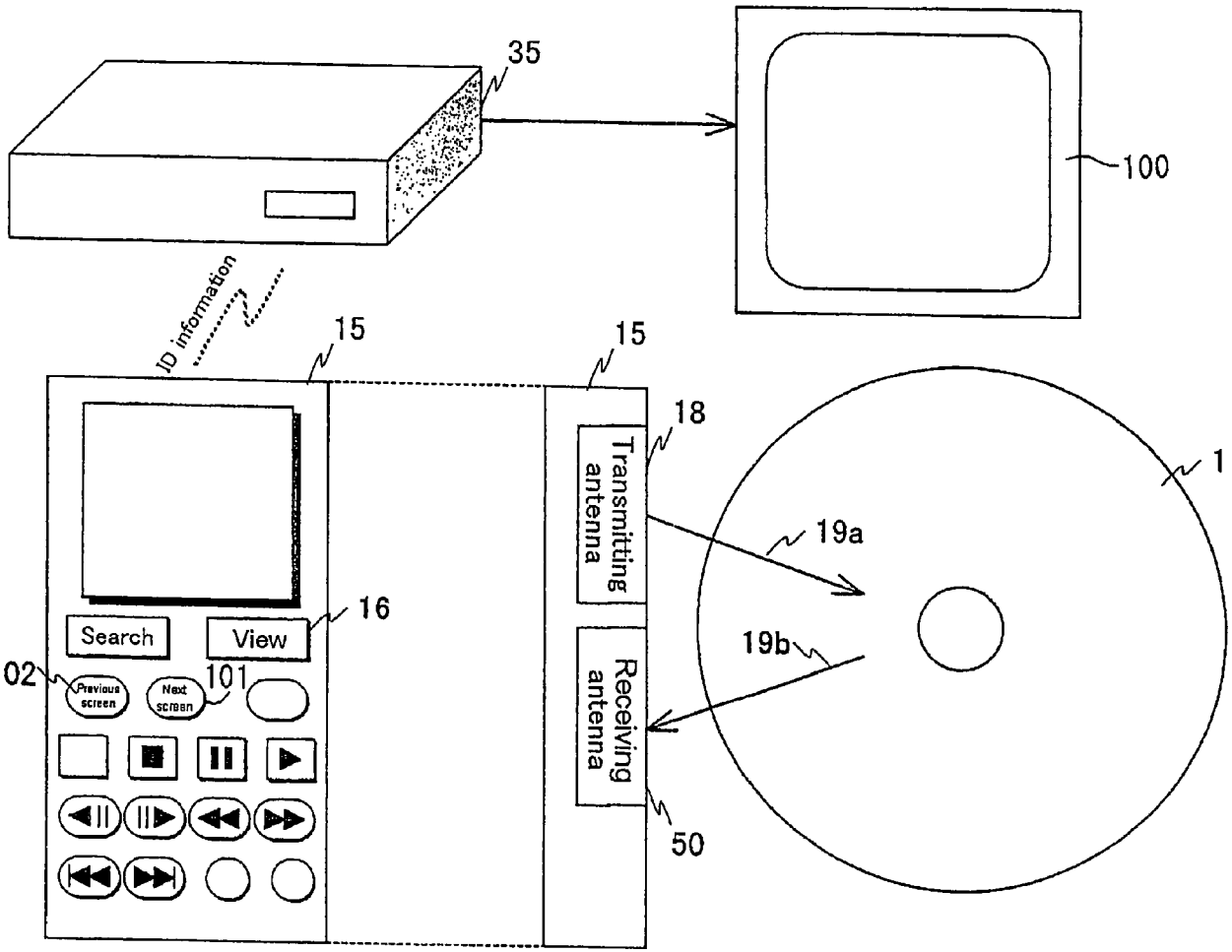
FIG. 5 is a diagram showing an appearance of an optical disc according to one embodiment of the present invention.
Figure 6:
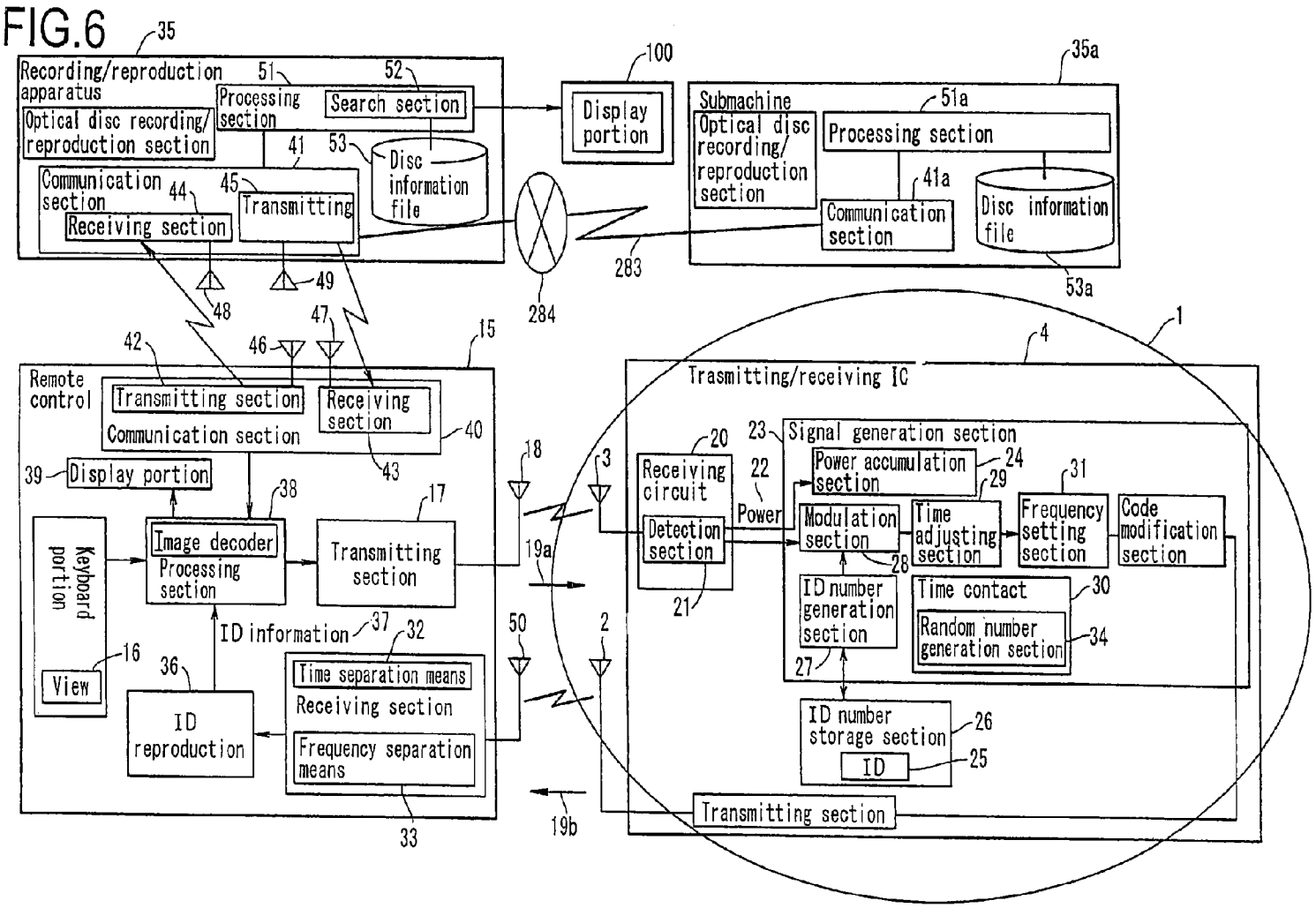
FIG. 6 is a block diagram showing structures of an optical disc, a remote control, and a recording/reproduction apparatus according to one embodiment of the present invention.

FIG. 5 shows an appearance of the optical disc 1, a remote control 15, a recording/reproduction apparatus 35 and a display portion 100. FIG. 6 shows an example of the structure of the optical disc 1, remote control 15 and recording/reproduction apparatus 35.

When a view button 16 of the remote control 15 is pressed, radio waves having a particular frequency (for example, 2.45 GHz) radiate from a transmitting section 17 and a transmitting antenna 18 to the optical disc 1, as indicated by an arrow 19a. Such radio waves are received by the receiving antenna 3 of the optical disc 1 and detected by a detection section 21 of a receiving circuit 20. Thus, power 22 and a signal are obtained. The power 22 is sent to a signal generation section 23 and temporarily accumulated in a power accumulation section 24 such as a capacitor or the like. This feeble power is used to read out ID 25 in an ID number storage section 26. An ID number generation section 27 and a modulation section 28 generate a modulation signal including the ID number. The modulation signal is delayed by a time period corresponding to a time constant 30 by a time adjusting section 29. The time constant 30 is preset when the transmission/reception ICs 4 is fabricated such that every transmission/reception ICs 4 has a different time constant 30.

The ID 25 is information for identifying the optical disc 1. The ID 25 is also called ID information. The ID 25 is not limited to a number (it may be a combination of alphanumeric characters, symbols and the like). The signal generation section 23 generates a signal including ID information in response to a signal output from the receiving circuit (receiving section) 20.

Figure 7:
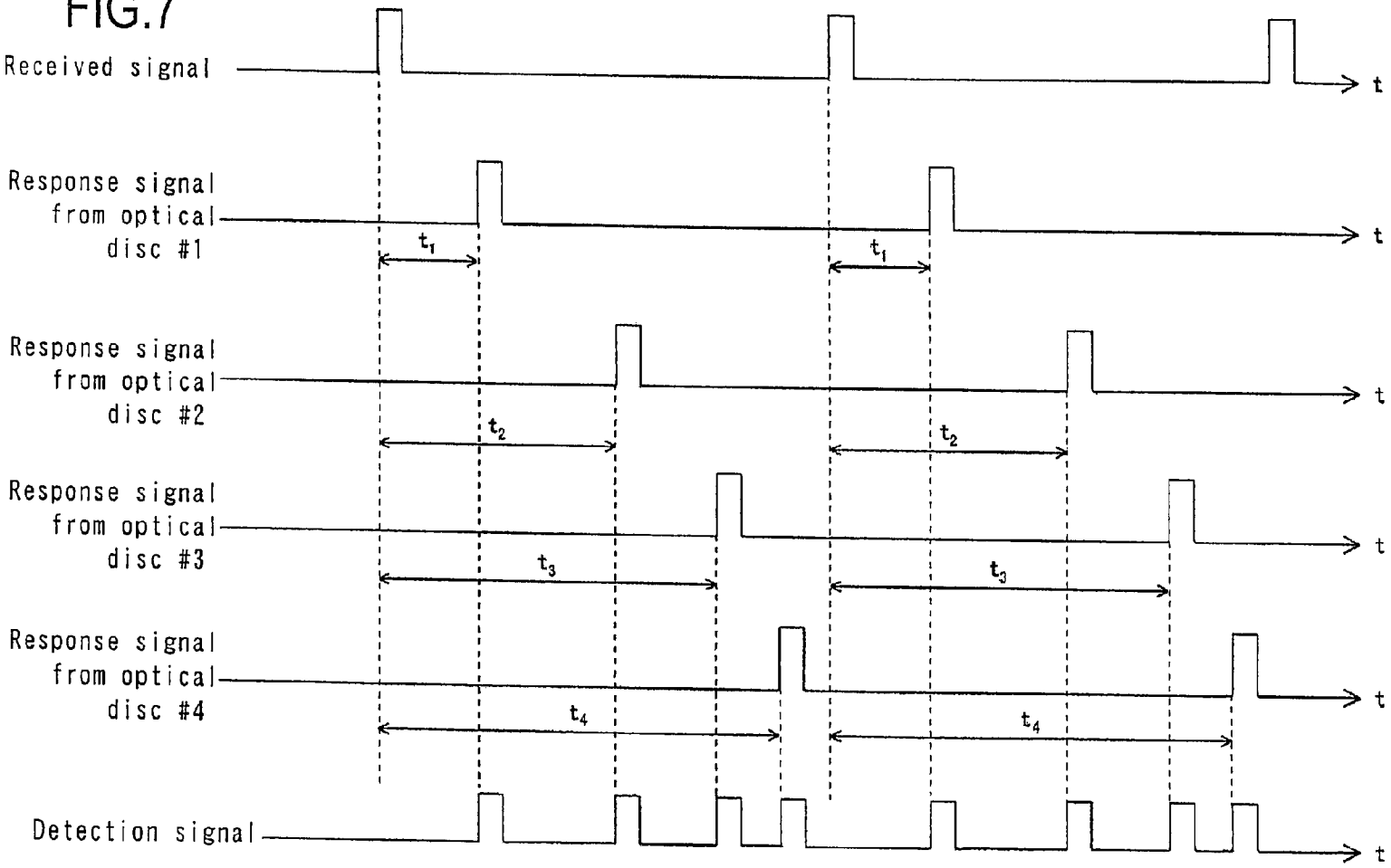
FIG. 7 is a timing diagram showing a reception signal and a detection signal according to one embodiment of the present invention.

FIG. 7 shows an example of waveforms of a reception signal received from the remote control 15, response signals from a plurality of optical discs 1 (#1-#4) responding to the reception signal, and a detection signal detected by the remote control 15.

The optical discs #1, #2, #3, and #4 have different response times $t_1$, $t_2$, $t_3$ and $t_4$ to the reception signal from the remote control 15. This is because the time constants 30 in the transmission/reception ICs 4 mounted on the optical discs #1 through #4 are different from each other. Thus, waveforms of the response signals from the optical discs #1 through #4 are different as shown in FIG. 7.

The waveform of the detection signal detected by the remote control 15 is as shown in FIG. 7. The response signals from the optical discs #1 through #4 are separated in a time-wise manner from each other. Thus, even when a plurality of optical discs 1 are present within the scope that the radio waves from the remote control 15 can reach, the remote control 15 can separate signals transmitted from a plurality of optical discs 1 in a time-wise manner and detect them. In this way, collision of the response signals from a plurality of optical discs 1 can be prevented.

In the remote control 15, the response signals from a plurality of optical discs 1 are separated in a time-wise manner by time separation means 32 (FIG. 6). Thus, IDs of the optical discs 1 can be identified stably.

Instead of presetting the time constants 30 such that every transmission/reception IC 4 has a different time constants 30, a random number generation section 34 for generating time constants at random may be provided to achieve similar effects.

Figure 8:
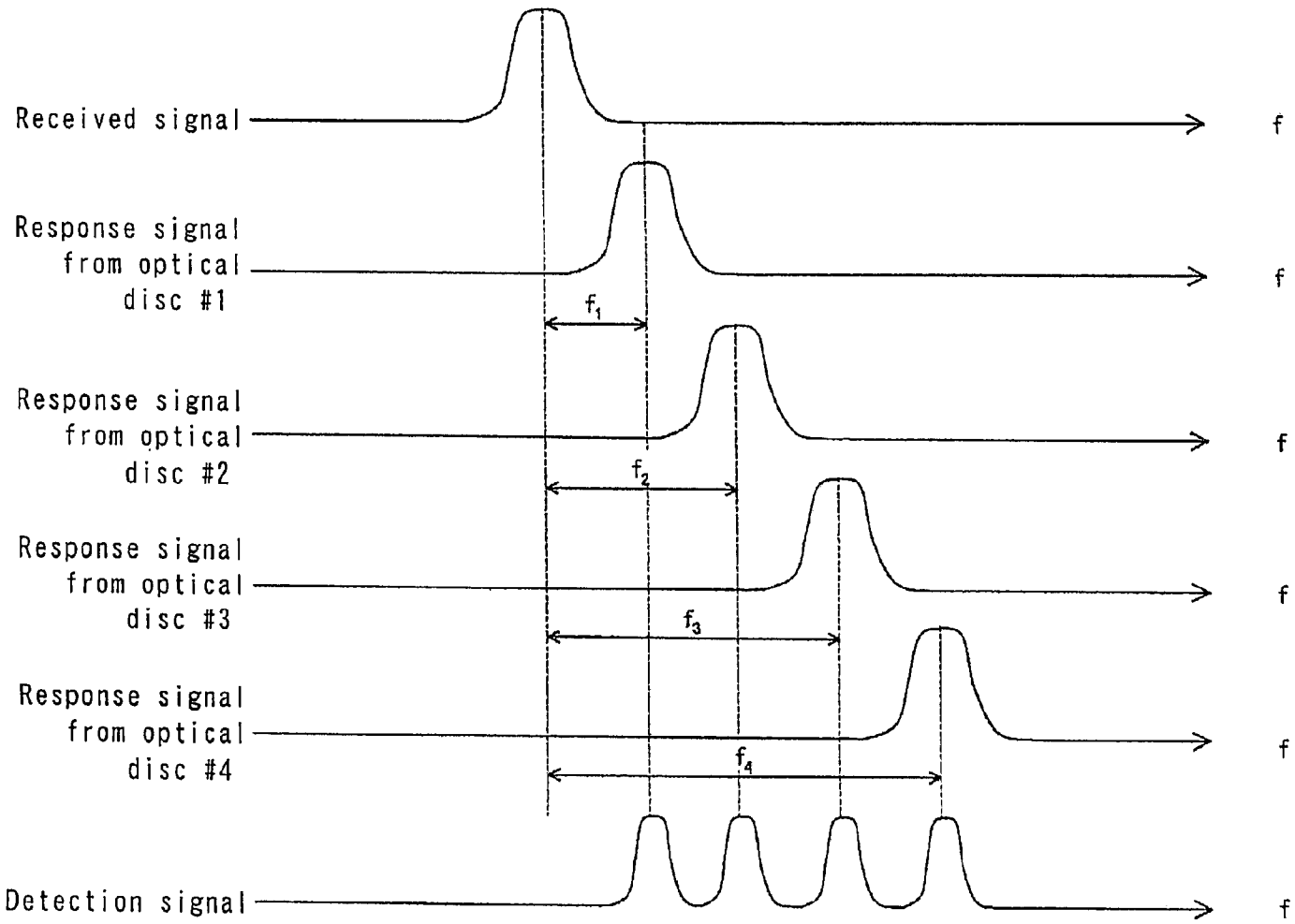
FIG. 8 is a waveform profile of a reception signal and a detection signal according to one embodiment of the present invention.

FIG. 8 shows another example of waveforms of a reception signal received from the remote control 15, response signals from a plurality of the optical discs 1 (#1-#4) responding to the reception signal, and a detection signal detected by the remote control 15.

The optical discs #1, #2, #3, and #4 have response signals having different amounts of shifts $f_1$, $f_2$, $f_3$ and $f_4$ in central frequencies from that of the reception signal from the remote control 15 (for example, an excitation signal having a particular central frequency). This is because the frequencies set by frequency setting sections 31 in the transmission/reception ICs 4 mounted on the optical discs #1 through #4 are different from each other. Thus, waveforms of the response signals from the optical discs #1 through #4 are different as shown in FIG. 8.

The waveform of the detection signal detected by the remote control 15 is as shown in FIG. 8. The response signals from the optical discs #1 through #4 are separated from each other with respect to the frequencies. Thus, even when a plurality of optical discs 1 are present within the scope that the radio waves from the remote control 15 can reach, the remote control 15 can separate signals transmitted from a plurality of optical discs 1 with respect to the frequencies and detect them. In this way, collision of the response signals from a plurality of optical discs 1 can be prevented.

In the remote control 15, the response signals from a plurality of optical discs 1 are separated with respect to the frequencies by frequency separation means 33 (FIG. 6). Thus, IDs of the optical discs 1 can be identified stably even within one time zone.

In the examples shown in FIGS. 7 and 8, the number of optical discs 1 which respond to the reception signal is not limited to four. N number of optical discs 1 may respond to the reception signal. Herein, n is any integer of 1 or greater.

Further, in an example shown in FIG. 6, the time adjusting section 29 and the frequency setting section 31 are both included in the signal generation section 23. This example is preferable because the response signals from a plurality of optical discs 1 can be separated in a time-wise manner and also with respect to the frequencies. However, the signal generation section 23 may include only one of the time adjusting section 29 and the frequency setting section 31. In this case, it is sufficient if only one of the time separation means 32 and the frequency separation means 33 is included in the receiving section of the remote control 15.

(Management of Disc Information by Recording/Reproduction Apparatus)

Next, with reference to FIG. 6, exchange of data between the remote control 15 and the recording/reproduction apparatus 35 will be described.

ID reproduction section 36 receives a reception signal including ID and generates ID information 37. The ID information 37 is output to a processing section 38. The processing section 38 displays the ID information 37 on a display portion 39 of the remote control 15 and transmits the ID information 37 to a receiving section 44 of a communication section 41 of the recording/reproduction apparatus 35 from a transmitting section 42 of a communication section 40. A method of communication between the communication section 40 and the communication section 41 may be an optical communication or may be a radio communication.

In the case where the communication between the communication section 40 and the communication section 41 is an optical communication, a light emitting portion for transmitting a remote control signal which is normally equipped to the remote control 15 may also serve as the transmitting section 42 and a light receiving portion for receiving the remote control signal which is usually equipped to the recording/reproduction apparatus 35 may also serve as the receiving section 44. In this case, it is not necessary to additionally provide a transmitting section 42 and a receiving section 44. Thus, a set of a transmitting/receiving unit (light receiving/emitting unit) can be omitted.

In the case where the communication between the communication section 40 and the communication section 41 is a radio communication, bidirectional communication can be performed between the communication section 40 and the communication section 41 by providing a transmitting antenna 46 and a receiving antenna 47 in the communication section 40, providing a transmitting antenna 49 and a receiving antenna 48 in the communication section 41, and using Bluetooth using radio waves of frequency 2.4 GHz or local area wireless network such as IEEE 802.11b. In this case, a transmitting antenna 46 of the remote control 15 may also serve as the transmitting antenna 18 and a receiving antenna 47 may also serve as the receiving antenna 50. Thus, a set of transmitting/receiving antennas can be omitted.

The receiving section 44 of the communication section 41 outputs the received ID information 37 to the processing section 51. In the processing section 51, a search section 52 searches a disc information file 53 and obtains disc physical property information 54, disc logic information 55 or the like corresponding to the ID information 37.

FIG. 9 shows an example of the data structure of the disc information file 53.

In the disc information file 53, a disc management number 57 is assigned to the ID information 37. ID information 37 is data equal to or greater than 100 bits (for example, data of 128 bits). By using disc management number 57 (for example, "04"), i.e., a virtual ID having a data amount smaller than that of the ID information 37, it becomes possible to manage IDs with smaller amount of data.

The disc information file 53 includes the disc physical property information 54 and the disc logic information 55 for each ID.

The disc physical property information 54 includes data indicating a total storage capacity 58 of the disc, a remaining capacity 59 of the disc, disc type 60 (such as rewritable type, write-once type, or ROM), the number of layers 61 of the disc (single layer or double layer) and the like.

The disc logic information 55 includes information regarding a program recorded on the disc (program information 70). The program information 70 includes property data of the program, information regarding contents, thumbnails of the contents and the like.

Figure 10:
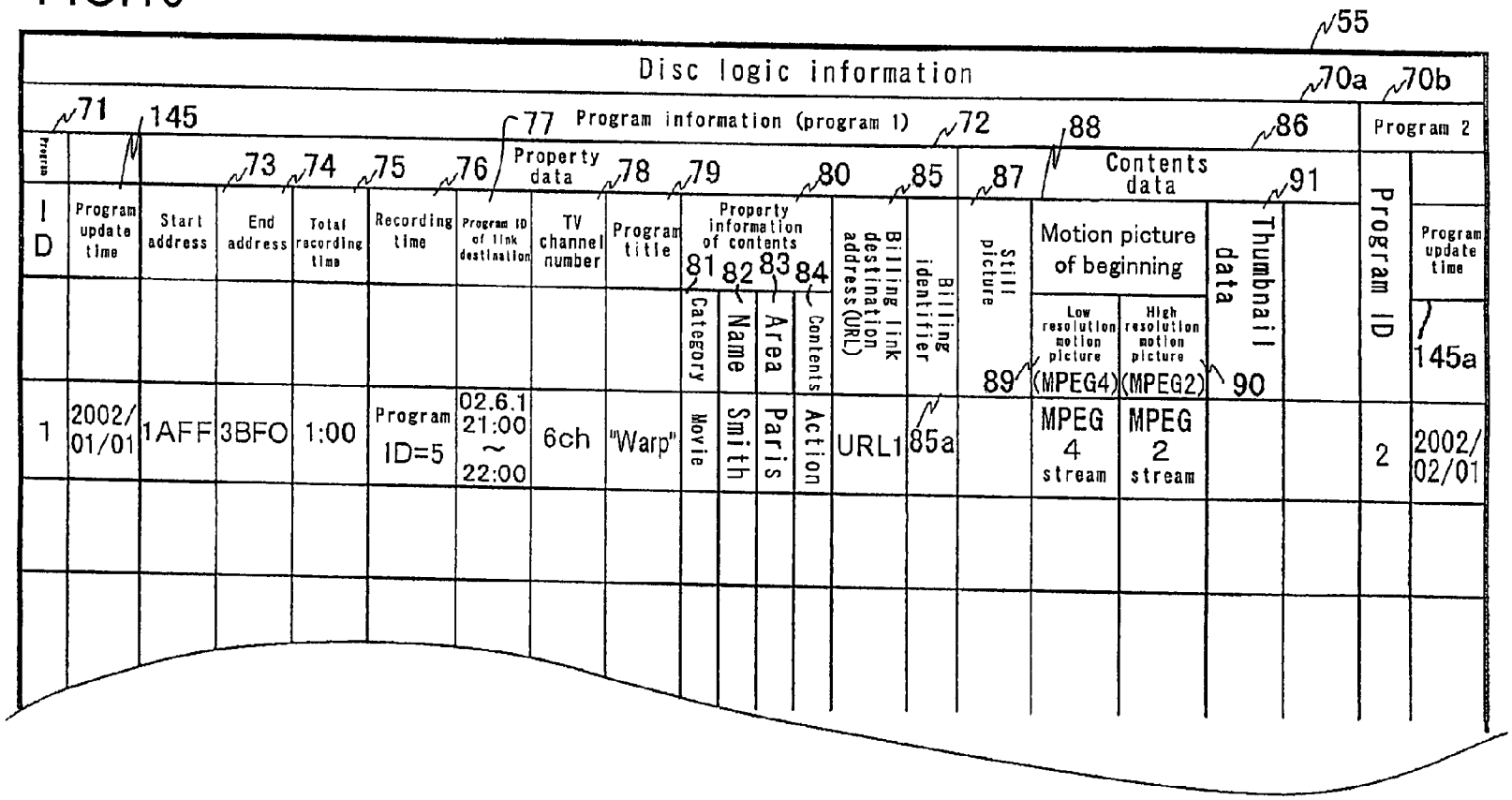
FIG. 10 is a diagram showing a data structure of a disc information file according to one embodiment of the present invention.

FIG. 10 shows program information 70a and 70b as examples of the program information 70 in the disc logic information 55.

The program information 70a indicates program information of program 1. The program information 70a includes a program ID 71, property data 72, and contents data 86.

The property data 72 includes a start address 73, an end address 74, total recording time 75, an ID of the program coming after the current program (program ID of link destination) 76, time to start and finish recording (recording time) 77, a recording source or a TV channel number 78, a program title 79, property information of the contents of the program 80 (a category of the program 81, a name of the characters appearing in the program 82, an area 83, program contents 84 and the like). Furthermore, in the case of a program linked to a web site, the property data 72 further includes an address of a web site of a link destination (URL) 85.

The contents data 86 includes a still picture 87 (for example, a still picture in JPEG format or the like of the first scene of program 1) and motion picture data 88 for first few seconds (a low-resolution motion picture 89 in MPEG 4 format or the like and a representative screen (thumbnail) of a high-resolution motion picture 90 at a high rate in MPEG 2 format or the like. The contents data 86 may include thumbnail data 91 which is a collection of the thumbnails.

Figure 11:
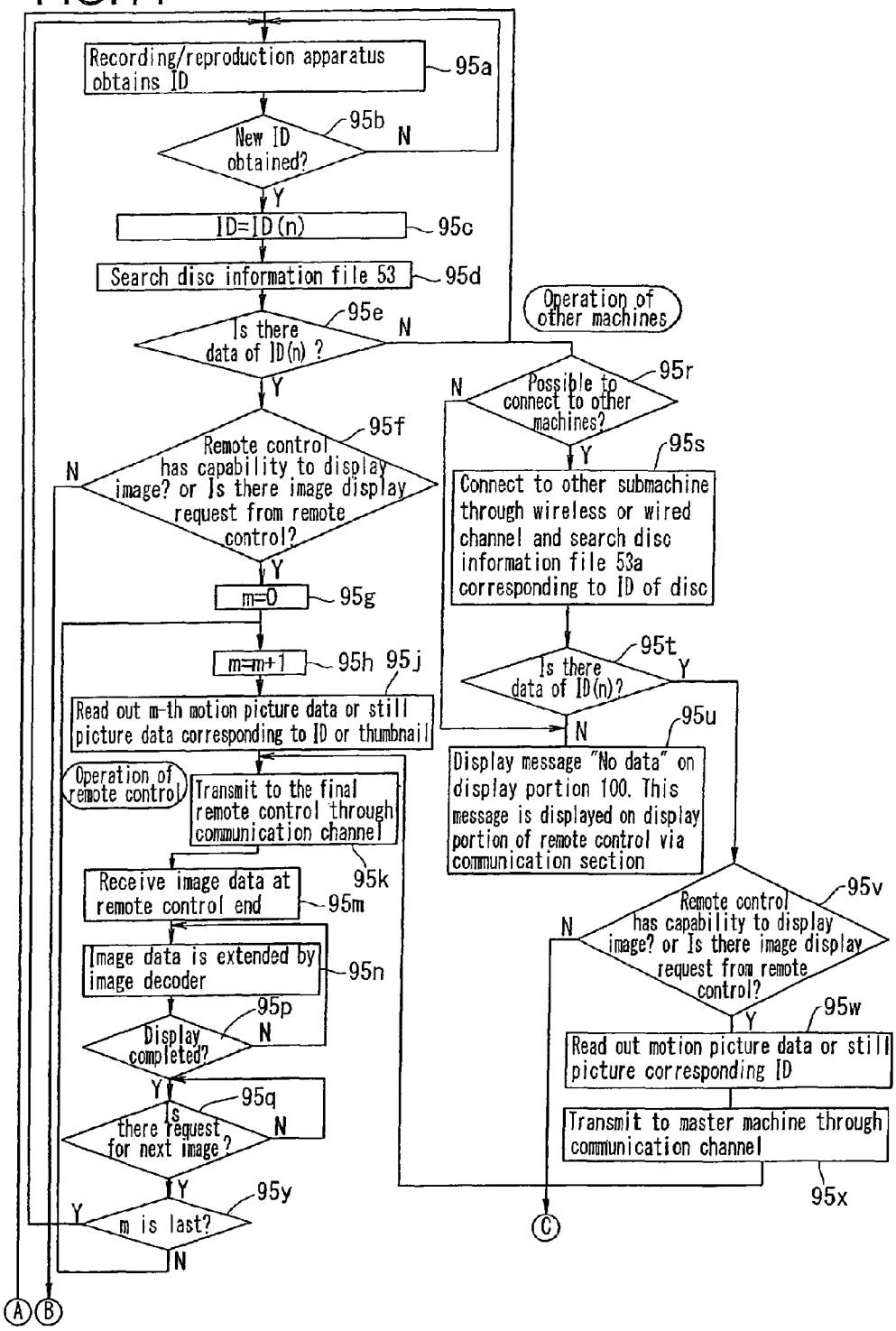
FIG. 11 is a flow chart showing a procedure according to one embodiment of the present invention.

With reference to flow charts of FIGS. 11 and 12, a method for obtaining ID and displaying property information and thumbnails of the contents of the corresponding disc by using the ID will be described.

Figure 13:
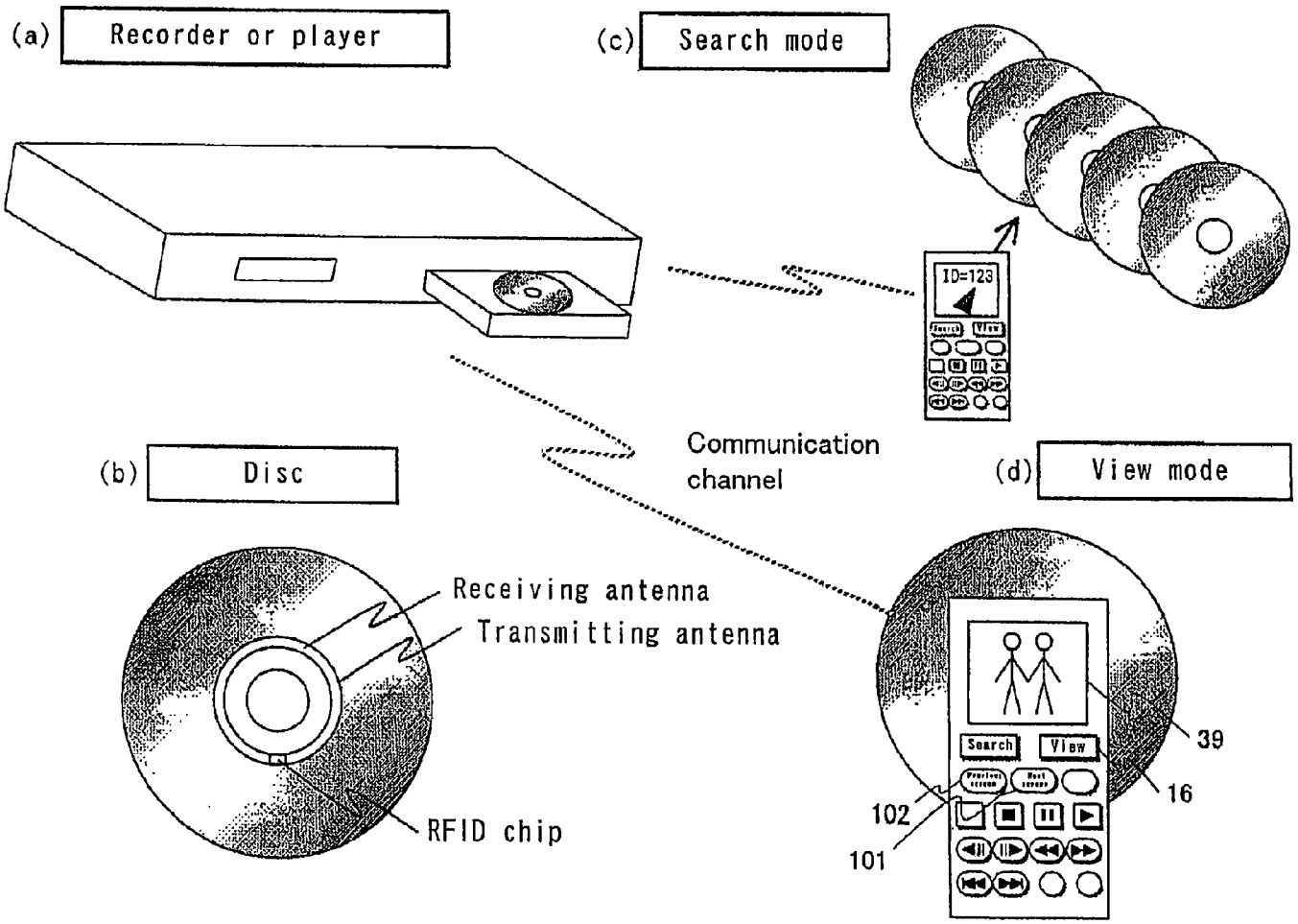
FIG. 13 is a diagram showing an operation of an optical disc and a remote control according to one embodiment of the present invention.

In step 95a, the recording/reproduction apparatus 35 waits to obtain the ID information that is to be sent from the remote control 15. In step 95b, the recording/reproduction apparatus 35 obtains new ID information which is different from the current ID information it has. Then, in step 95c, the processing section 51 defines the new ID information as the n-th ID information (i.e., ID(n)). In step 95d, the processing section 51 searches the disc information file 53 (FIGS. 9 and 10) using the search section 52. In step 95e, the processing section 51 determines whether there is data regarding ID(n) in the disc information file 53. If it is determined "Yes" in step 95e (i.e., if there is data regarding ID(n) in the disc information file 53), in step 95f, the processing section 51 determines whether the remote control 15 has the capability to display the image, or there is an image display request from the remote control 15. If it is determined "Yes" in step 95f, m=0 in step 95g and m is incremented by 1 in step 95h. In step 95j, the processing section 51 reads out image data (motion picture data 89 and 90, still picture data 87, or thumbnail data 91 (FIG. 10)) of m-th program information 72 (program m) corresponding ID(n) from the disc information file 53 by using the search section 52. In step 95k, the processing section 51 transmits image data to the remote control 15 via the communication channel (a transmitting section 45 and the transmitting antenna 49). In step 95m, the receiving section 43 of the remote control 15 receives the image data. In step 95n, the processing section 38 extends the received image data using an image decoder 100 and displays the extended image data in the display portion 39 (FIG. 13(d)). In this way, motion picture or still picture of thumbnails of data of contents recorded in the optical disc 1 can be confirmed by only bringing the remote control 15 close to the optical disc 1, without attaching the optical disc 1 to the recording/reproduction apparatus 35. In step 95p, the processing section 38 determines whether the display of the image data is completed or not and continues displaying the image data until the display of the image data is completed. Even after the display of the image data is completed, in step 95q, the processing section 38 continues displaying the image data until a next new image display request arrives, or until a certain amount of time has elapsed. The next new image display request may be issued by, for example, a user pressing a next screen button 101 of the remote control 15 (FIG. 5). If there is a next new image display request, it is determined "Yes" in step 95q, and the process proceeds to step 95y. In step 95y, it is determined whether m is the last or not. If m is not the last, the process proceeds to step 95h. In step 95h, m is incremented by 1. In step 95j, the processing section 38 displays the next new image on the display portion 39.

For example, in the case where the motion picture of a thumbnail of the program is displayed on the display portion 39 of the remote control 15, motion picture data is sent from the recording/reproduction apparatus 35 (server) to the remote control 15. The processing section 51 reads out motion picture data showing a thumbnail of program 1 (for example, motion picture data for the first 5 seconds of program 1) from the disc information file 53 and sends it to the remote control 15. The motion picture data is, for example, low-resolution motion picture data 89 of MPEG 4 grade. The processing section 38 receives the motion picture data and displays it on the displaying portion 39 (FIG. 13(d)). When the user presses the next screen button 101 of the remote control 15, the processing section 51 reads out motion picture data showing a thumbnail of program 2 (for example, motion picture data for the first 5 seconds of program 2) from the disc information file 53 and sends it to the remote control 15. The processing section 38 receives motion picture data and displays it on the displaying portion 39 (FIG. 13(d)).

In step 95q, in the case where the next image display request is issued, or a previous screen display request is issued by the user pressing a previous screen button 102 of the remote control 15, if m is the last in step 95y, the process returns to the first step 95a and the recording/reproduction apparatus 35 waits to obtain the next ID information. Thereafter, the same operation as described above is performed.

In this embodiment, normal quality images and low resolution motion picture 89 are both recorded in the disc information file 53. However, only normal quality images may be recorded in the disc information file 53. In this case, when a normal quality image is output, by performing rate conversion for a normal quality image (for example, MPEG2 image of 6 Mbps), the low-resolution motion picture 89 (for example, MPEG 4 image of 384 kbps) may be obtained and the low-resolution motion picture 89 may be sent to the remote control 15.

(Operation when an Image is not Displayed on Remote Control)

Figure 12:
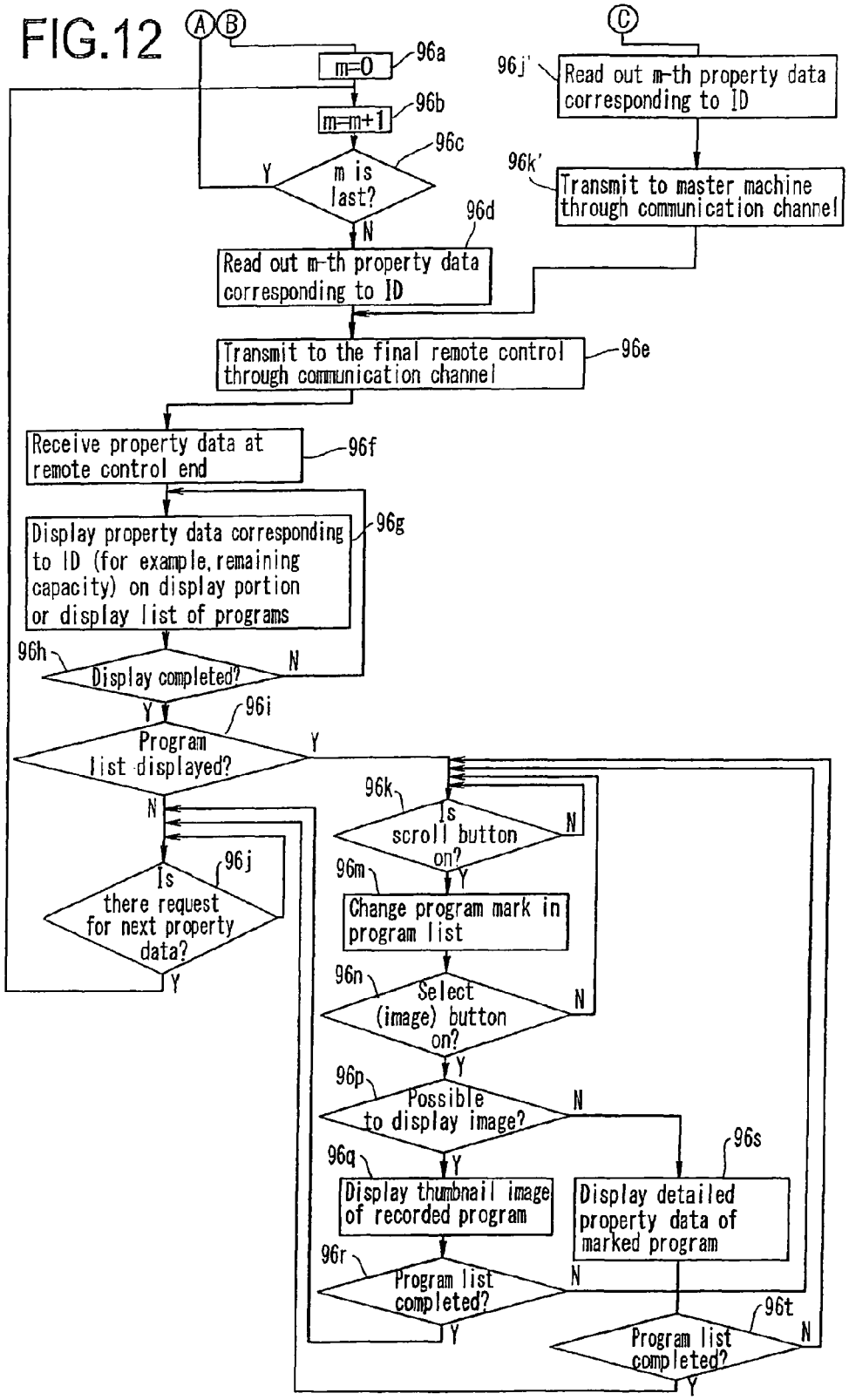
FIG. 12 is a flow chart showing a procedure according to one embodiment of the present invention.

If it is determined "No" in step 95f (i.e., when an image is not displayed on the remote control 15), the process proceeds to steps 96a through 96c shown in FIG. 12. If it is determined "No" in step 96c, the process proceeds to step 96d. In step 96d, the processing section 51 reads out the property data 72 of m-th program information 72 (program m) corresponding to ID (n) using the search section 52, and, in step 96e, transmits it through a communication path and finally to the remote control 15. In step 96f, the receiving section 43 of the remote control 15 receives the property data. In step 96g, the processing section 38 displays the property data (for example, remaining capacity) or the program list on the display portion 39. When the program list is displayed on the display portion 39, if the user presses a down key 104 of the remote control 15 (FIG. 14), the program in a downward direction in the screen is selected.

Figure 14:
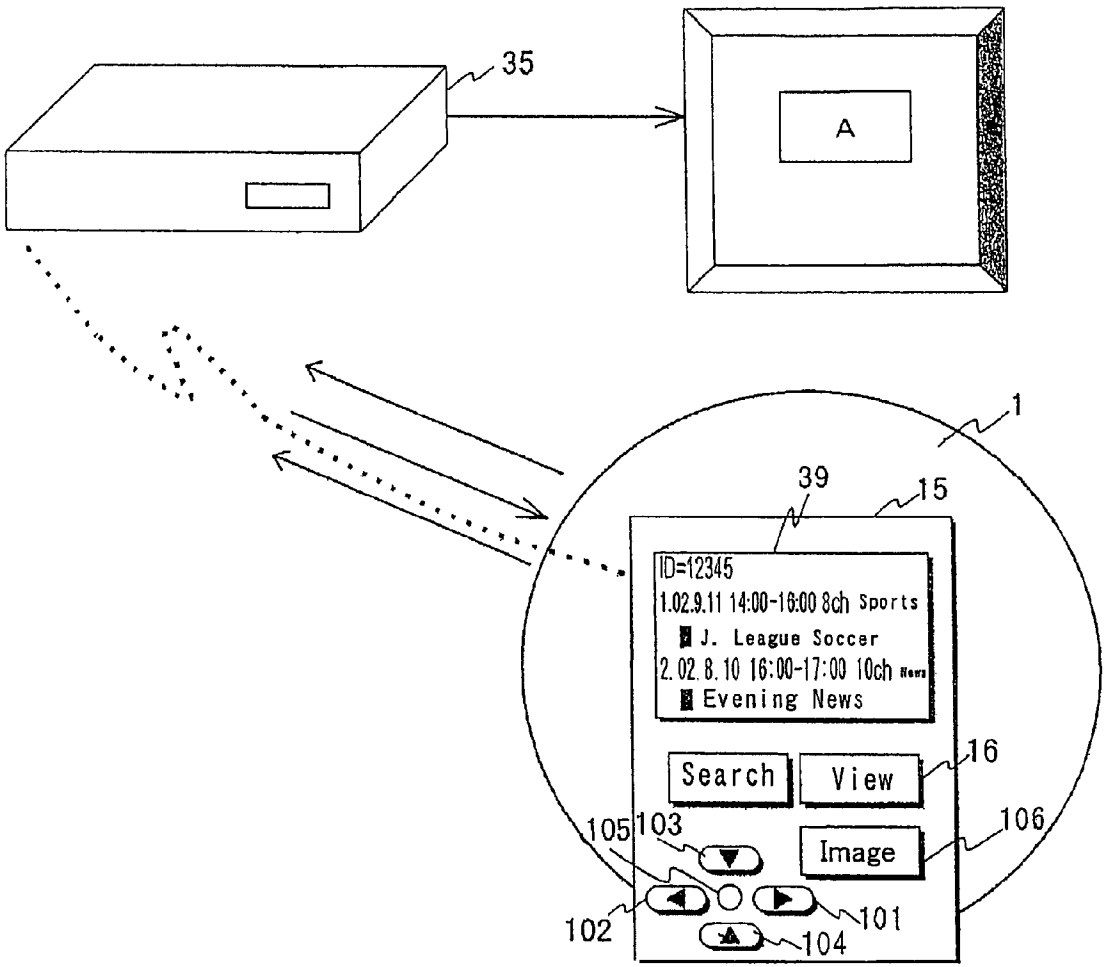
FIG. 14 is a diagram showing an operation flow of an optical disc and a remote control according to one embodiment of the present invention.

For displaying the program list on the display portion 39 of the remote control 15, as shown in FIG. 14, the user may (1) bring the remote control 15 close to the optical disc 1 and (2) press a view button 16 of the remote control 15. In response, the remote control 15 (3) reads out the ID of the optical disc 1 and (4) transmits the ID read by the remote control 15 to the recording/reproduction apparatus 35. The recording/reproduction apparatus 35 (5) searches the database to obtain the program list data and (6) sends the program list data to the remote control 15. Thus, the program list is displayed on the display portion 39 of the remote control 15. When the user presses the down key 104 of the remote control 15, (7) the program in a downward direction is selected.

With reference to the flow chart of FIG. 12, a procedure for displaying the program list will be explained.

In step 96h, the processing section 38 determines whether or not displaying the property data or the program list is completed and continues displaying the property data or the program list until displaying the property data or the program list is completed (FIG. 14). In step 96i, the processing section 38 determines whether the program list is displayed on the display portion 39. If it is determined "Yes" in step 96i, in step 96k, the processing section 38 determines whether any of the scroll buttons 101 through 104 (FIG. 14) is pressed or not. If it is determined "Yes" in step 96k, in step 96m, the processing section 38 changes a program mark in the program list. Next, if a selection button 105 or an image button 106 (FIG. 14) is pressed, in step 96p, the processing section 38 determines whether it is possible to display the image. If it is determined "Yes" in step 96p, in step 96q, the processing section 38 displays a thumbnail image, motion picture, or still picture of the selected program on the display portion 39. In step 96r, the processing section 38 determines whether or not the program list is completed. If it is determined "Yes" in step 96r, the process proceeds to step 96j. If it is determined "No" in step 96p (i.e., if the image cannot be displayed), the process proceeds to step 96s. In step 96s, the processing section 38 displays the detailed property data of the marked program on the display portion 39. The property data is read from the disc information file 53, sent to the remote control 15, and displayed on the display portion 39 of the remote control 15. As shown in FIG. 10, the property data includes, for example, category 81, name 82, area 83 and contents 84 of the program, billing identifier 85a which indicates whether or not viewing the program requires payment, and link destination address 85 which indicates an address or URL of a web site for decoding and billing. In step 96f, the processing section 38 determines whether the program list is completed. If it is determined "Yes" in step 96f, the process proceeds to step 96j. In step 96j, the processing section 38 determines whether there is a request for displaying the next property data. If it is determined "Yes" in step 96j, the process returns to step 96b, and the operation of incrementing m by 1, reading out the m-th property data from the disc information file 53, and displaying the read out property data on the display portion 39 is repeated.

(Operation Linked with Other Machines)

In step 95r, the processing section 51 determines whether or not it is possible to connect to other machines or servers. If it is determined "No" in step 95r, the process proceeds to step 95u. In step 95u, the processing section 51 sends a message of "No data" or information indicating the message to the remote control 15 via the communication channel and displays the message or the information indicating the message on the display portion 39. If it is determined "Yes" in step 95r, in step 95s, the processing section 51 connects to another submachine 35a via the communication section 41, a communication channel 283 and a communication section 41a. The communication channel 283 may be wired or wireless, or may be the internet 284 as shown in FIG. 6. In step 95s, a processing section 51a of the submachine 35a searches a disc information file 53. In step 95t, the processing section 51a determines whether the disc information file includes the data corresponding to ID (n). If it is determined "Yes" in step 95t, the process proceeds to step 95v. In step 95v, the processing section 51 determines whether the remote control 15 has a capability to display the image, or there is an image display request from the remote control 15. If it is determined "Yes" in step 95v, in step 95w, the processing section 51 reads out the image data corresponding to ID (n) from the disc information file 53. In step 95x, the processing section 51 sends the read out image data to the master machine (i.e., the recording/reproduction apparatus 35 in FIG. 6) via the communication section 41a, the communication channel 283 and the communication section 41. Then, the process returns to step 95k.

If it is determined "No" in step 95v (i.e., if the remote control 15 cannot display the image), the process proceeds to step 96j' of FIG. 12, the processing section 51 reads out m-th property data corresponding to ID(n) from the disc information file 53. In step 95k', the processing section 51 sends the read out property data to the master machine (i.e., the recording/reproduction apparatus 35 in FIG. 6) via the communication section 41a, the communication channel 283 and the communication section 41. Then, the process proceeds to step 96e. In step 96e, the property data is finally sent to the remote control 15 from the master machine. Finally, the property data is displayed on the display portion 39 of the remote control 15.

(Method for Reducing Time Loss During Recording/Reproduction in Recording/Reproduction Apparatus)

Figure 18:
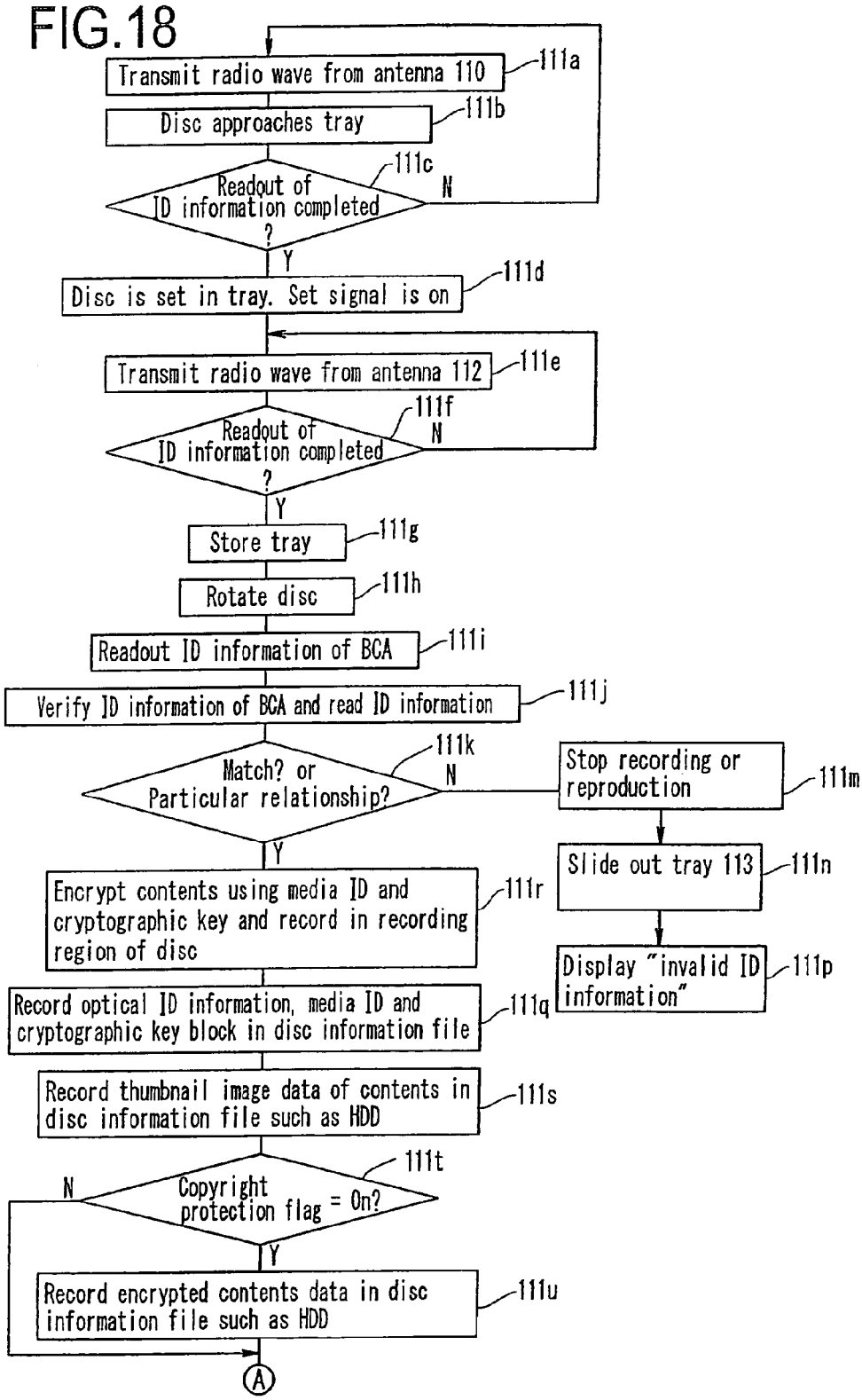
FIG. 18 is a flow chart showing a process procedure according to one embodiment of the present invention.

Next, with reference to the flowchart of FIG. 18, a procedure for creating a disc information file in the recording/reproduction apparatus 35 will be described.

As shown in FIGS. 15(a) and (b), a main unit antenna 110 is provided near a tray 113 in which the optical disc 1 is set. A tray antenna 112 is provided inside the tray 113.

The main unit antenna 110 transmits radio waves periodically or when the tray 113 is slid out (step 111a). Thus, when the optical disc 1 on which an ID chip is mounted is brought near the tray 113 (step 111b), ID information of the optical disc 1 is read out by radio waves transmitted from the main unit antenna 110. It is determined whether reading out the ID information of the optical disc 1 is completed (step 111c).

When the optical disc 1 is set in the tray 113, the set signal is turned ON (step 111d). When the set signal is turned ON, the tray antenna 112 transmits radio waves (step 111e). By the radio waves transmitted from the tray antenna 112, the ID information of the optical disc 1 is read out. It is determined whether reading out the ID information of the optical disc 1 is completed (step 111f).

At this step, it is recognized which of the optical discs 1 will be inserted into the recording/reproduction apparatus 35 for reproduction or recording. Thus, the reproduction or recording can be started using data in the disc information file 53 in the recording/reproduction apparatus 35.

Figure 17:
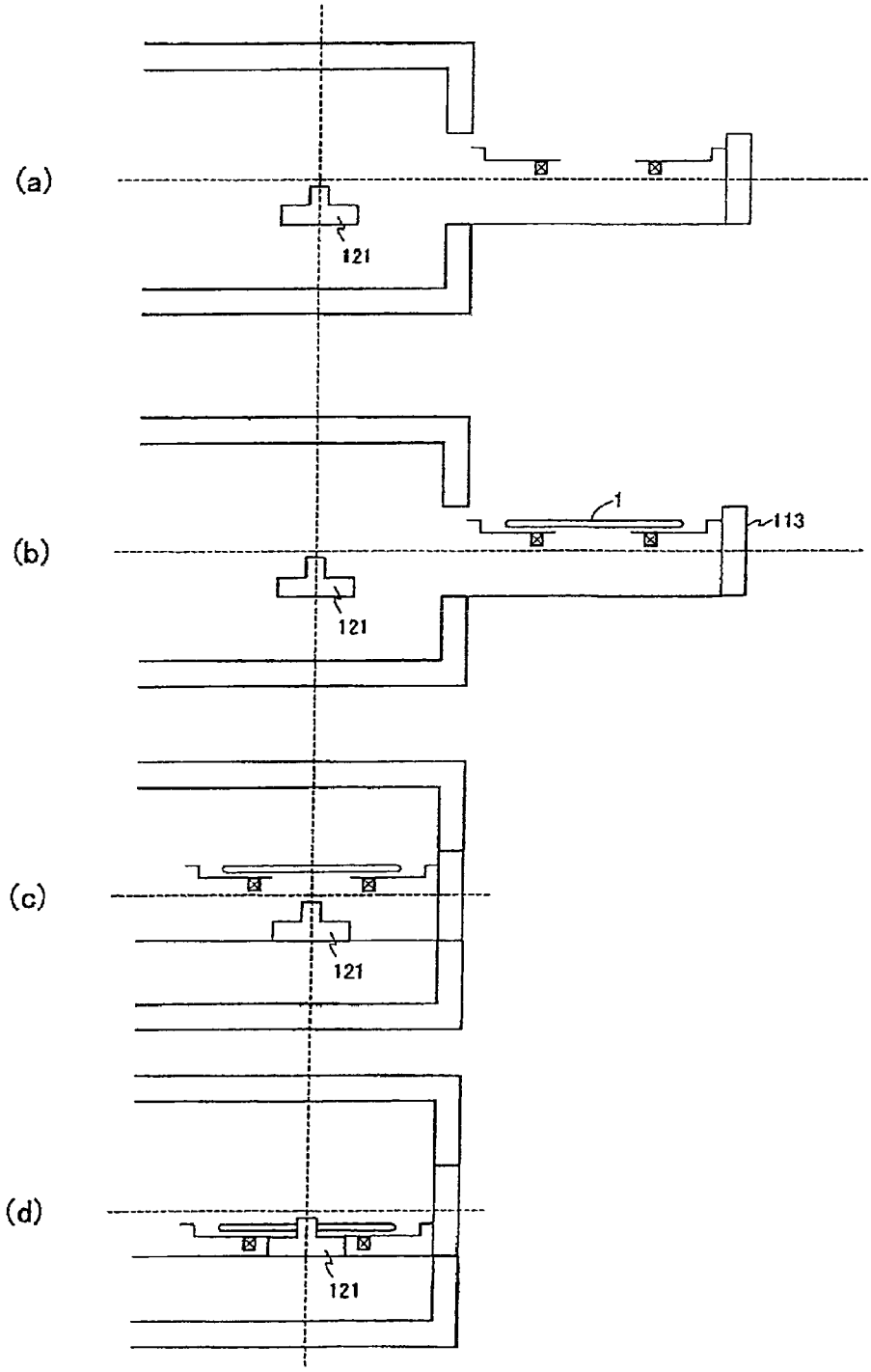
FIGS. 17(a)-(d) are diagrams showing an attachment operation of a disc according to one embodiment of the present invention.

After reading out the ID information is completed, the tray 113 is stored as shown in FIG. 17 (step 111g), and the optical disc 1 is attached to a rotation motor member 121. Rotation of the optical disc 1 is started (step 111h).

Figure 16:
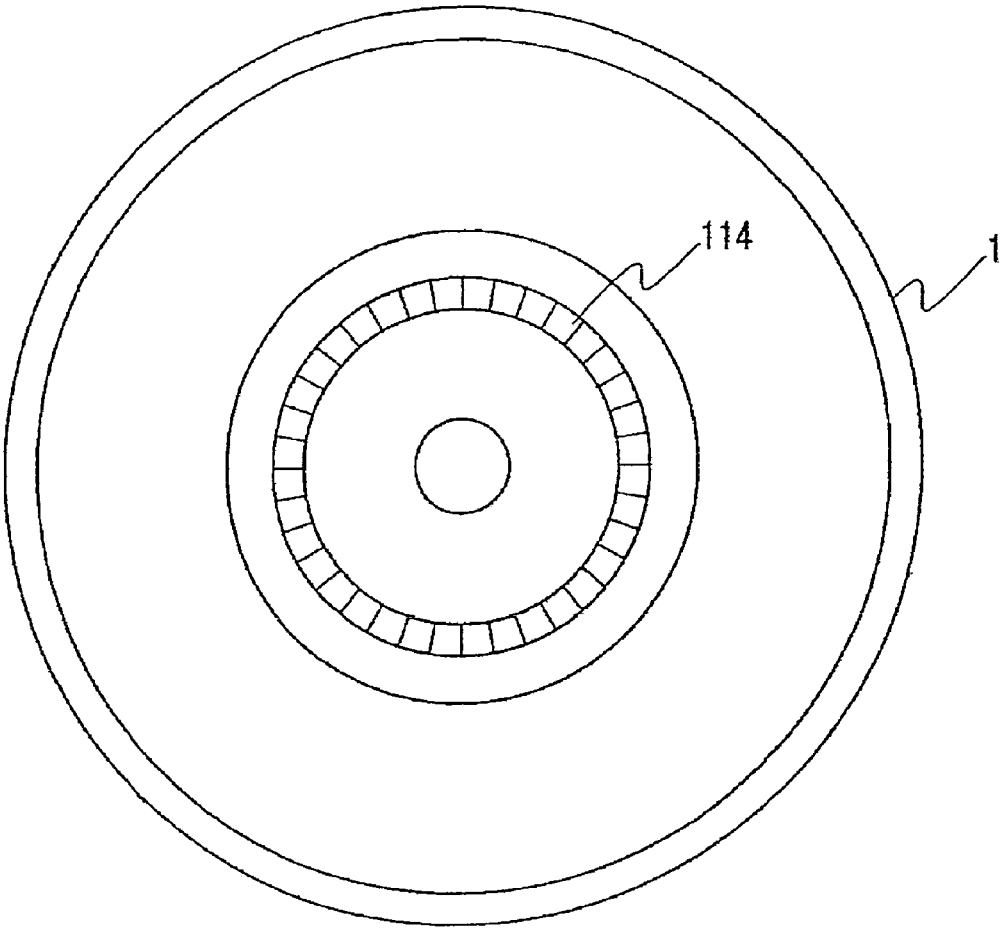
FIG. 16 is a top view of an optical disc according to one embodiment of the present invention.

As shown in FIG. 16, in an inner peripheral portion of the optical disc 1, bar codes 114 called BCA are formed circumferentially. The bar codes 114 record ID numbers which are different for every optical disc 1. In the factory, BCA information, which corresponds to the ID information stored in the transmission/reception IC 4 to be mounted on the optical disc 1 (hereinafter, referred to as the ID information of the IC), is recorded in the BCA. Of course, BCA information same as the ID information of the IC may be included. Hereinafter, ID information included in BCA information is referred to as ID information of the BCA. In the normal optical disc 1, the ID information of the IC and the ID information of the BCA match. The recording/reproduction apparatus 35 reads out the ID information of the BCA (step 111j), verifies the ID information of the BCA and the ID information of the IC (step 111j), and determines whether they match or have a particular relationship (step 111k). If it is determined "No" in step 111k, the recording/reproduction apparatus 35 regards the optical disc 1 as an invalid disc and stops recording or reproduction (step 111m). The tray 113 is slid out (step 111n), and "Invalid ID information" is displayed on a display potion 151 (FIG. 21) (step 111p). In this way, invalid use of a disc such as an unauthorized duplication, an unauthorized reproduction and the like can be prevented.

If the optical disc 1 is used in the recording/reproduction apparatus 35 for the first time, the ID information 37 read from the optical disc 1 by radio waves and optical ID information 115 optically read from the BCA are recorded in the disc information file 53 as shown in FIG. 9. Media ID 116 and a cryptographic key block 117 are recorded in the disc information file 53 as shown in FIG. 9 (step 111q). Further, in the case where the optical disc 1 is a writable-type disc, a key which is suitable for the machine is selected from the cryptographic key block 117 which is called MKB (Media Key Block) for copyright protection which limits duplication over multiple generations, and encodes the contents or the information corresponding the contents using the cryptographic key and the media ID 116 corresponding to the optical ID information 115 to record in the recording region of the optical disc 1 (step 111r).

In step 111s, a still picture image encoder 131 (FIG. 21) compresses the first still picture of each scene in the contents input from an input section 130. A thumbnail processing section 135 records still pictures compressed by the still picture image encoder 131 in the disc information file 53. A low-definition image encoder 132 (FIG. 21) creates thumbnails of low-definition image such as MPEG 4 based on contents input from the input section 130 for a particular amount of time (for example, 20 seconds). The thumbnail processing section 135 records thumbnails of low-definition image created by the low-definition image encoder 132 in the disc information file 53. Further, a normal quality image is compressed by an image encoder 133 and recorded in the disc information file 53. If it is determined that a copyright protection flag is ON in step 111t, contents encrypted by an encryption encoder 134 is recorded in the disc information file 53 (step 111u).

Figure 15:
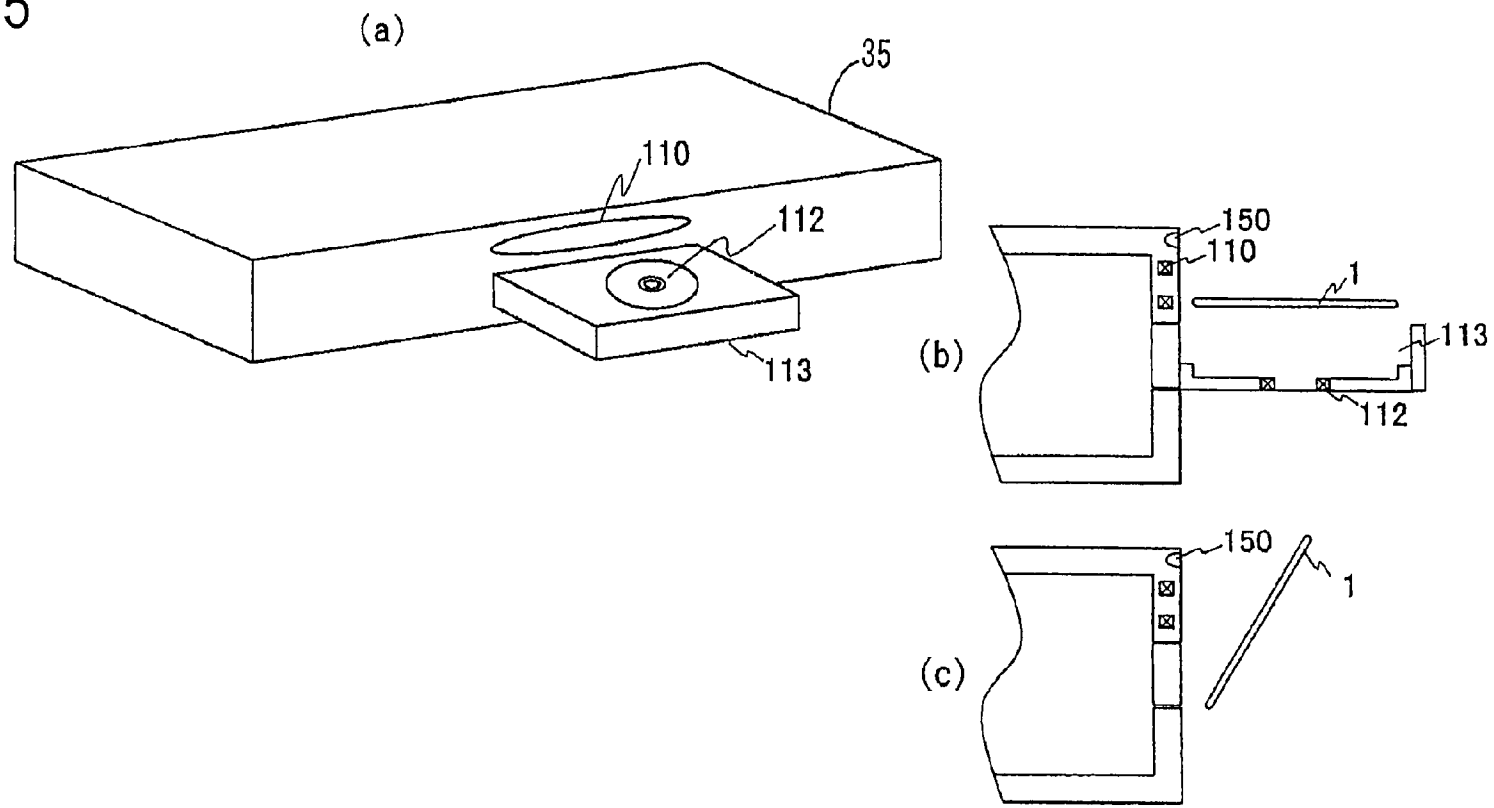
FIGS. 15(a)-(c) show an operation of a tray of a recording/reproduction apparatus according to one embodiment of the present invention.
Figure 21:
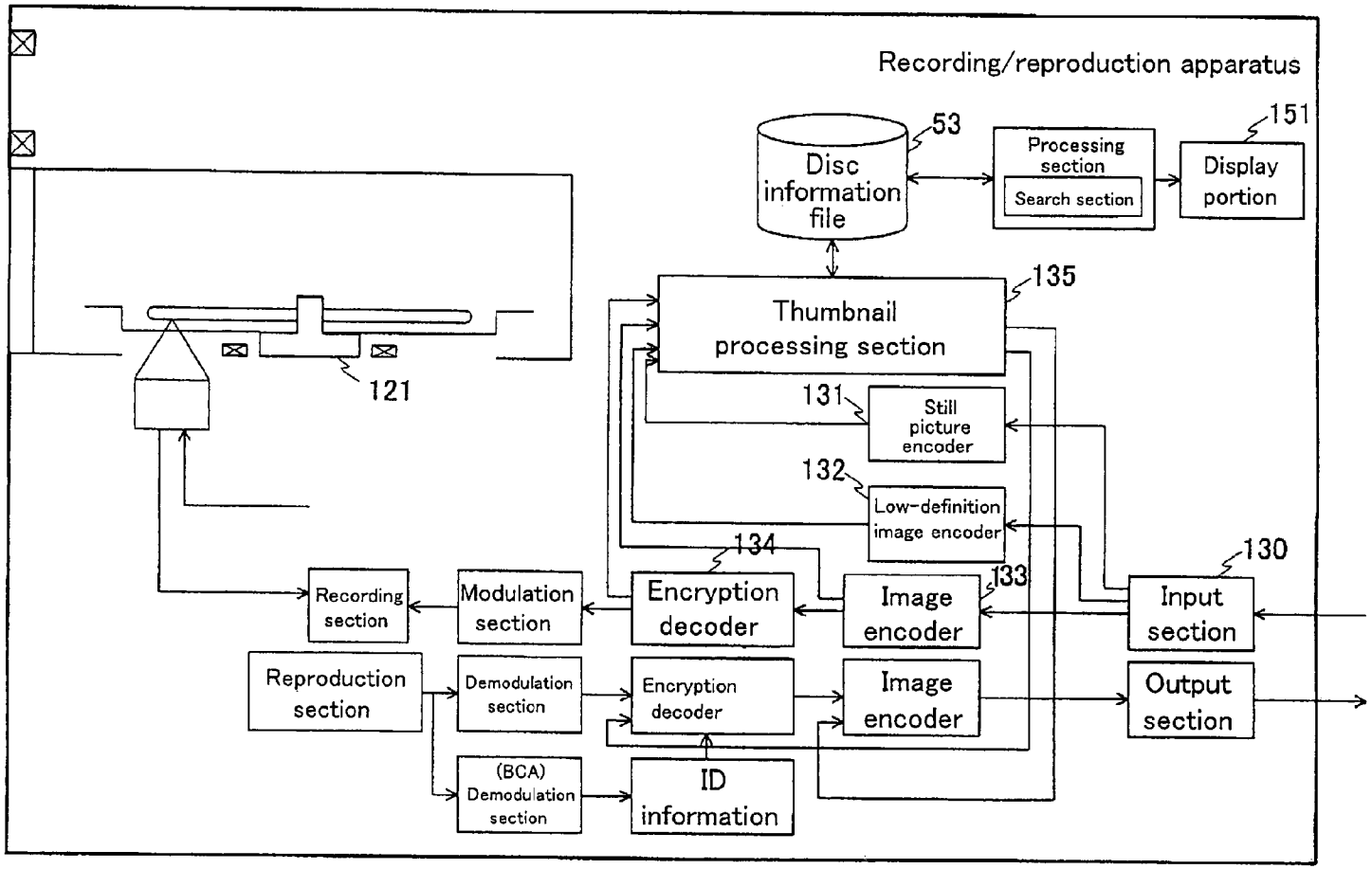
FIG. 21 is a block diagram showing a structure of a recording/reproduction apparatus according to one embodiment of the present invention.

With reference to a flow chart of FIG. 19, the procedure continued from the flow chart of FIG. 18 will be described. In step 119a, when an optical disc 1 is brought close to the tray 113, detection signal is ON because an approach sensor 150 is provided in front of the tray 113 as shown in FIGS. 15 and 21. In step 119b, the antenna 110 transmits radio waves for detection. In step 119c, a response signal including the ID information is sent back from the optical disc 1. Thus, reading out the ID information is completed. In step 119d, when the optical disc 1 is set in the tray 113, a set signal is ON and the antenna 112 transmits radio waves to the optical disc 1 (step 119e). If it is determined that reading out the ID information is completed in step 119f, in step 119g, the ID information or the property information of the optical disc 1 (for example, the remaining capacity of the optical disc 1) is displayed on the display portion 151. If it is determined that there is a disc information file 53 regarding the optical disc 1 in step 119o, a latency time for reproduction or recording can be reduced. If it is determined that reproduction start button is pressed in step 119h, the tray 113 is stored and the optical disc 1 is rotated (step 119j). In step 119k, the media ID, the cryptographic key block such as MKB and the like are read out from the disc information file 53 recorded in the recording/reproduction apparatus 35. In step 119m, contents information recorded in HDD or the like in the recording/reproduction apparatus 35 is read out. In the case where the contents are encrypted, the process proceeds to step 119p, and a cryptographic key for decoding is created by using the media ID and cryptographic key block to obtain plaintext by decoding the encrypted contents. In step 119q, the plaintext is decoded by an AV decoder to output a digital audiovisual signal. The data is read out from the contents recording section of the disc information file.

Next, the data read out from the optical disc 1 is output. More specifically, in step 119r, the tray 113 is stored and the reproduction of the optical disc 1 is started. The optical ID information of the optical disc 1 is optically read out from the optical disc 1, and, in step 119t, it is verified whether the optical ID information and the radio wave ID information match or have a particular relationship. If it is determined "No" in step 119t, the optical ID information is given a higher priority, and, if there is a disc information file corresponding to the optical ID information, a thumbnail therein is output. If there is no disc information file corresponding to the optical ID information, the process is held until a signal from the optical disc 1 is obtained (step 119u). In step 119v, it is determined whether the reproduction of the optical disc 1 is started. In step 119w, it is prepared for the switching an output signal from the signal read out from the disc information file to the reproduction signal from the optical disc 1. Switching of the output signal is performed so that a time stamp of the signal read out from the disc information file matches a time stamp of the reproduction signal from the optical disc 1. In step 119x, the output signal is switched at the same time and at an interval of GOPs (step 119y). The reproduction is started in a normal reproduction mode (step 119z).

Figure 19:
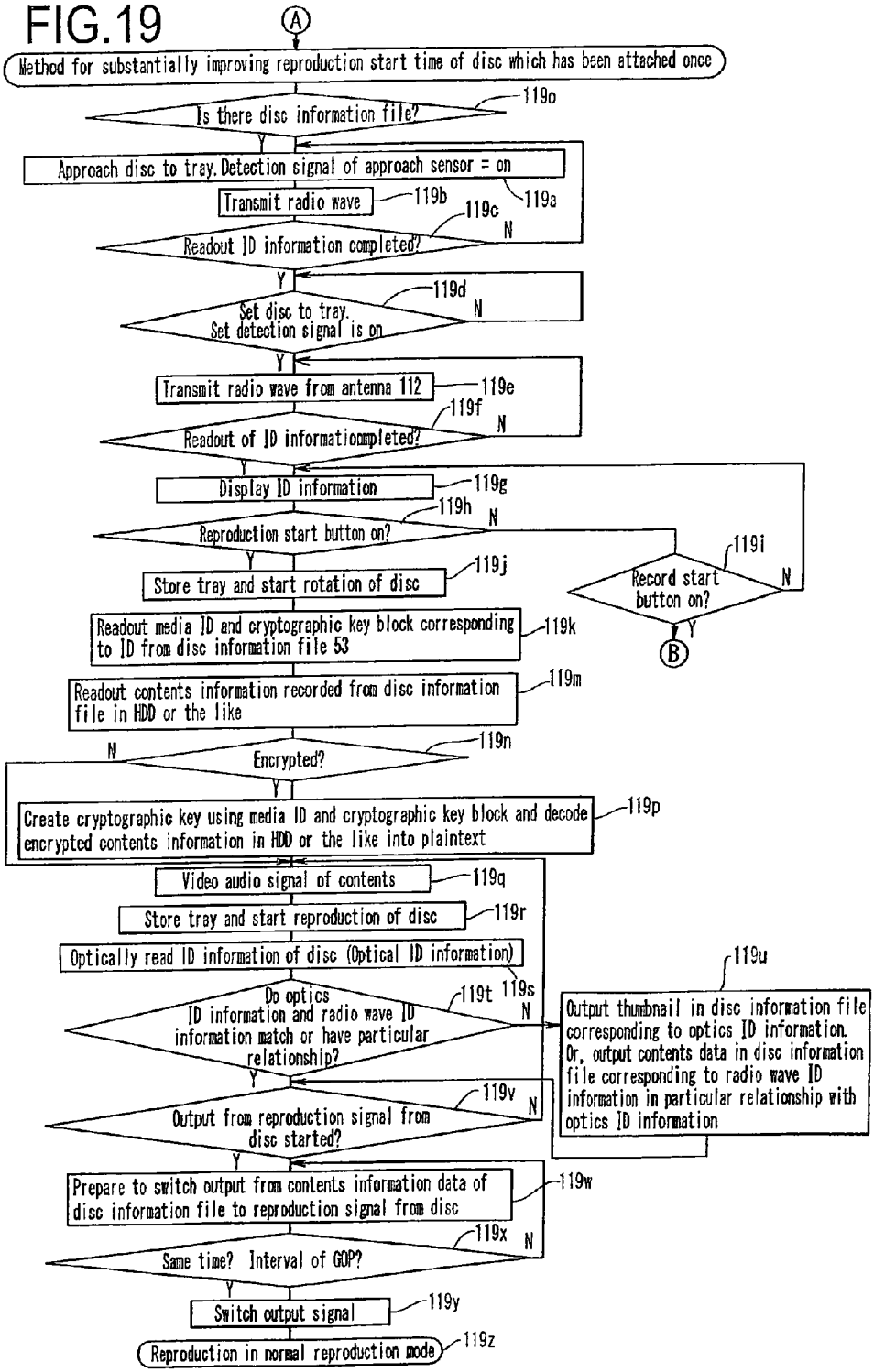
FIG. 19 is a flow chart showing a process procedure according to one embodiment of the present invention.
Figure 20:
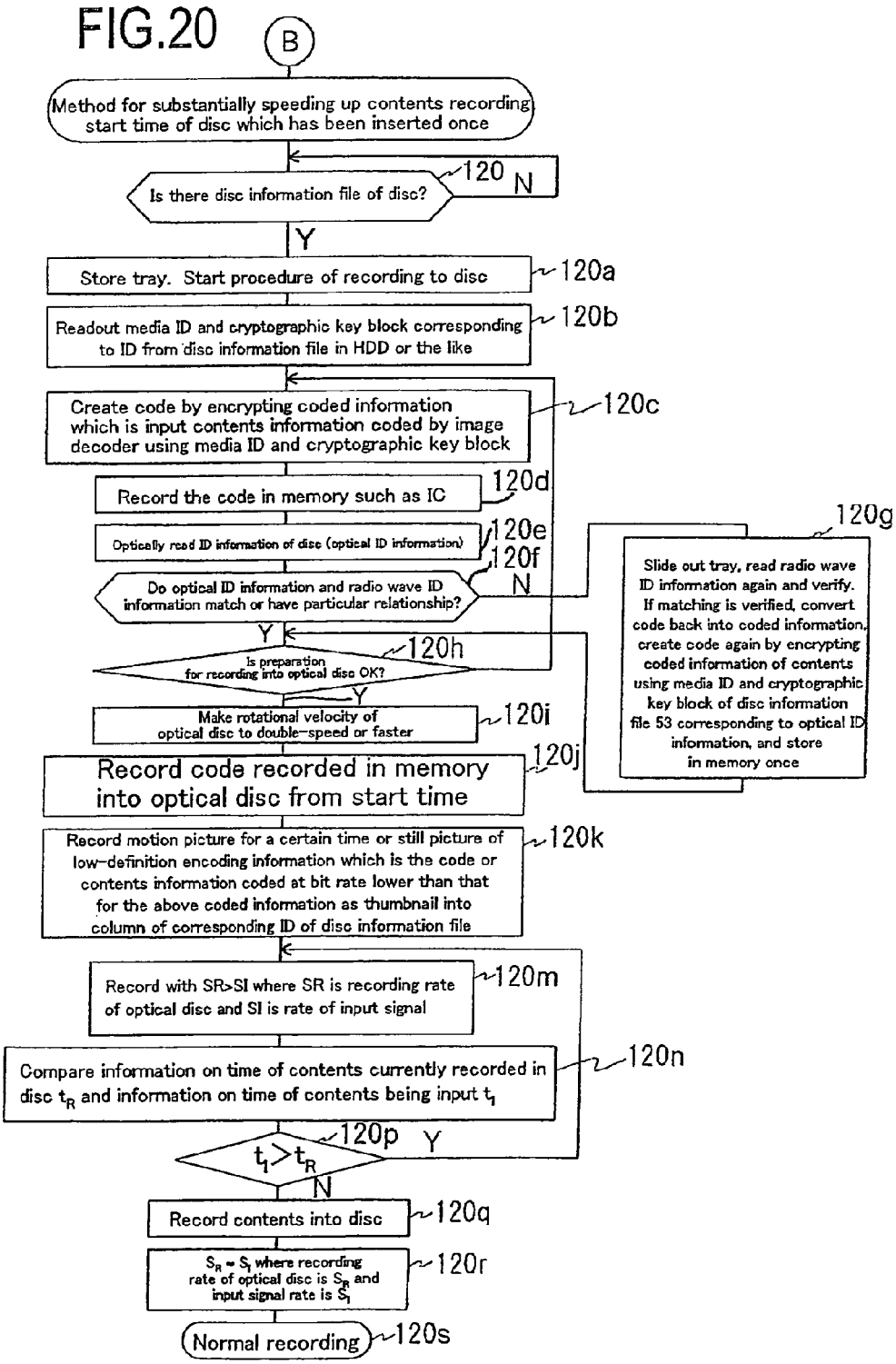
FIG. 20 is a flow chart showing a process procedure according to one embodiment of the present invention.

If it is determined "No" in step 119h in FIG. 19 (i.e., when the reproduction start button is not pressed), it is determined whether a recording start button is pressed in step 119i. If it is determined "Yes" in step 119i, the process proceeds to step 120 of FIG. 20.

In step 120, it is determined whether the optical disc 1 has been recorded one time or more, and thus, the disc information file has already been obtained. If it is determined "Yes" in step 120, in step 120a, a procedure of storing the tray 113 and recording to the optical disc 1 is started. In step 120b, the media ID and the cryptographic key block corresponding to the ID is read out from the disc information file. In step 120c, coded information, which is coded contents information, is encrypted using the media ID and the cryptographic key block read out from the disc information file to create a code. In step 120d, the code is temporarily recorded in a memory other than the optical disc, such as an IC. In other words, the code is recorded in an IC or HDD during a preparation time (normally, 30 seconds to 1 minute) for recording to the optical disc 1. In step 120e, the ID information of the optical disc 1 (referred to as optical ID information) is optically read. In step 120f, it is determined whether the optical ID information and the radio wave ID information matches or have a particular relationship. If it is determined "No" in step 120f, the process proceeds to step 120g and the optical ID information is used in precedence. The tray 113 is slid out and the radio wave ID information is read out again. Then, the optical ID information and radio wave ID information are verified. If the verification result is satisfactory, the code is restored to the original coded information, and, by using the media ID and the cryptographic key block of the disc information file 53 corresponding to the optical ID information, the coded information of the contents is encrypted again to create a code. If it is determined "Yes" in step 120f, it is determined whether preparation for recording to the optical disc is finished or not in step 120h. If it is determined "Yes" in step 120h, the rotational velocity of the optical disc 1 is set to be double-speed or higher in step 120i. In step 120j, the code recorded in a memory such as an IC or the like is recorded to the optical disc 1 from the start time.

(Method for Creating Thumbnails of Disc Information File)

In step 120k, an image for a certain amount of time or a still picture of low-definition coded information which is contents coded at a bit rate lower than that for the above coded information is recorded in the disc information file as a thumbnail.

In step 120m, when the recording rate to the optical disc 1 is $S_R$ and the rate of input signal is $S_I$, recording is performed for a certain amount of time with $S_R>S_I$ maintained. In step 120n, time information $t_R$ of the contents currently recorded in the optical disc 1 and time information $t_I$ of the contents which are currently being input are compared. If $t_I>t_R$ in step 120p, the process returns to step 120m. If $t_I=t_R$, approximately (i.e., a difference between $t_I$ and $t_R$ is 1 to 2 frames), in step 120q, the contents are directly recorded to the optical disc 1. In step 120r, when recording rate of the optical disc is $S_R$ and the rate of the input signal is $S_I$, $S_R \approx S_I$. Then, normal recording is performed in step 120s.

(Method for Searching Corresponding Disc ID)

Next, a method for searching desired disc ID information and further physically locating the disc by using property information of the disc information file will be described.

Figure 22:
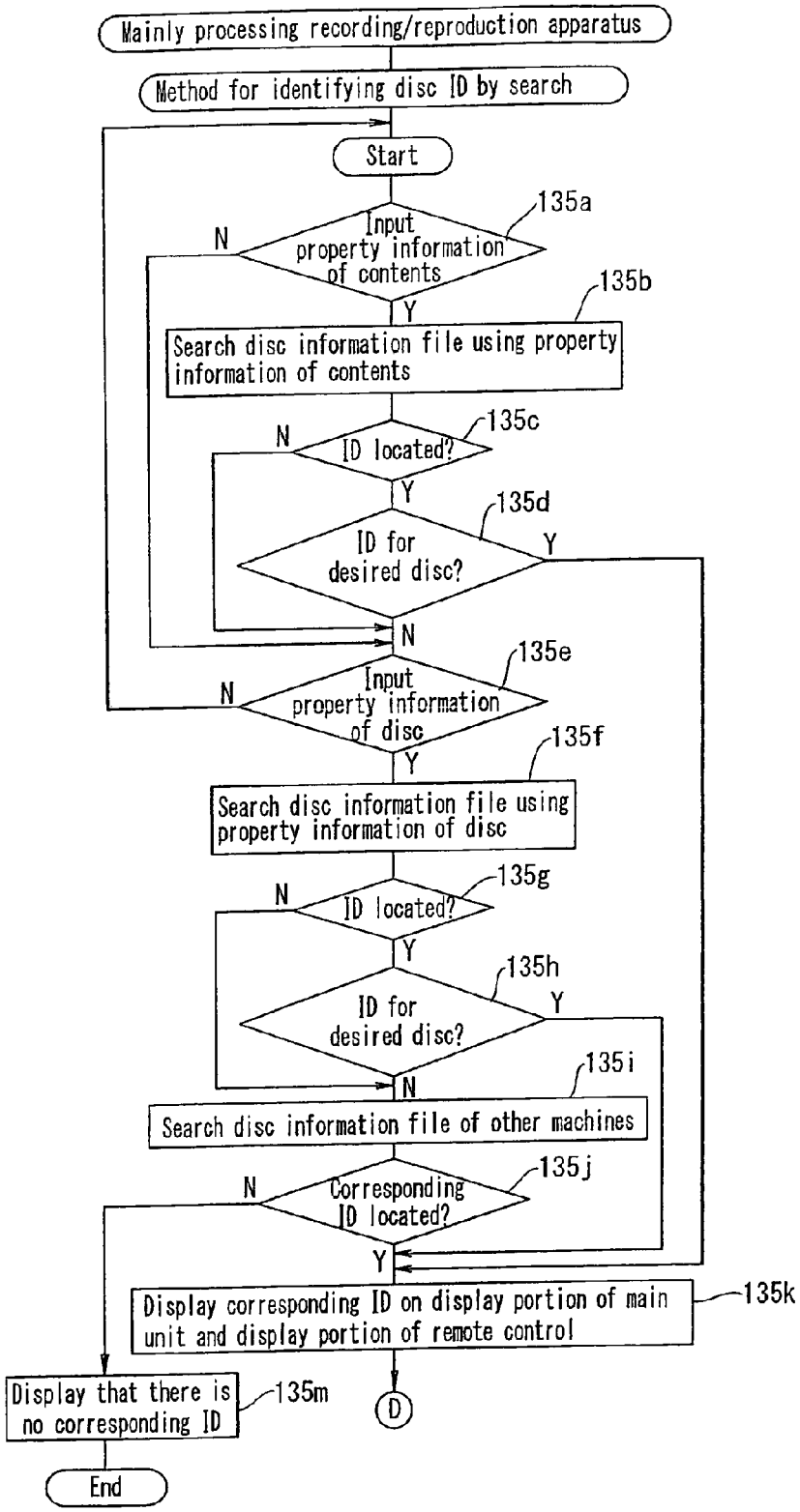
FIG. 22 is a flow chart showing a procedure according to one embodiment of the present invention.

First, in step 135a of FIG. 22, property information of the contents is input. Physical information such as a disc capacity, a remaining capacity and the like, and property information of the contents such as a name of an actor featured in the program, trade name, place name and the like. In step 135b, the disc information file is searched using the property information of the input contents as keywords. If the ID corresponding to the property information of the contents is located in step 135c, it is determined whether the optical disc of the ID is the desired optical disc in step 135d. If it is determined "Yes" in step 135d (i.e., when the optical disc of the ID is the desired disc), the process proceeds to step 135k and a termination process is performed. If it is determined "No" in step 135d, the property information of the disc (for example, remaining capacity or the like) is input in step 135e. In step 135f, the input property information of the disc is used as keywords to search the disc information file. If the ID corresponding to the property information of the disc is located in step 135g, it is determined whether the optical disc of the ID is the desired disc in step 135h. If it is determined "Yes" in step 135g, the process proceeds to step 135k and the termination process is performed. If it is determined "No" in step 135g, the process proceeds to step 135i and access to other machines (for example, a server connected to a network) is made using the communication means and the disc information file is searched. In this case, if the corresponding ID is located in step 135j, the process proceeds to step 135k and the corresponding ID is displayed on the display portion of the recording/reproduction apparatus and the display portion of the remote control. If it is determined "No" in step 135j, the process proceeds to step 135m and the display portion displays that there is no corresponding ID. Then, the process ends.

(Method for Physically Searching Optical Disc)

Figure 23:
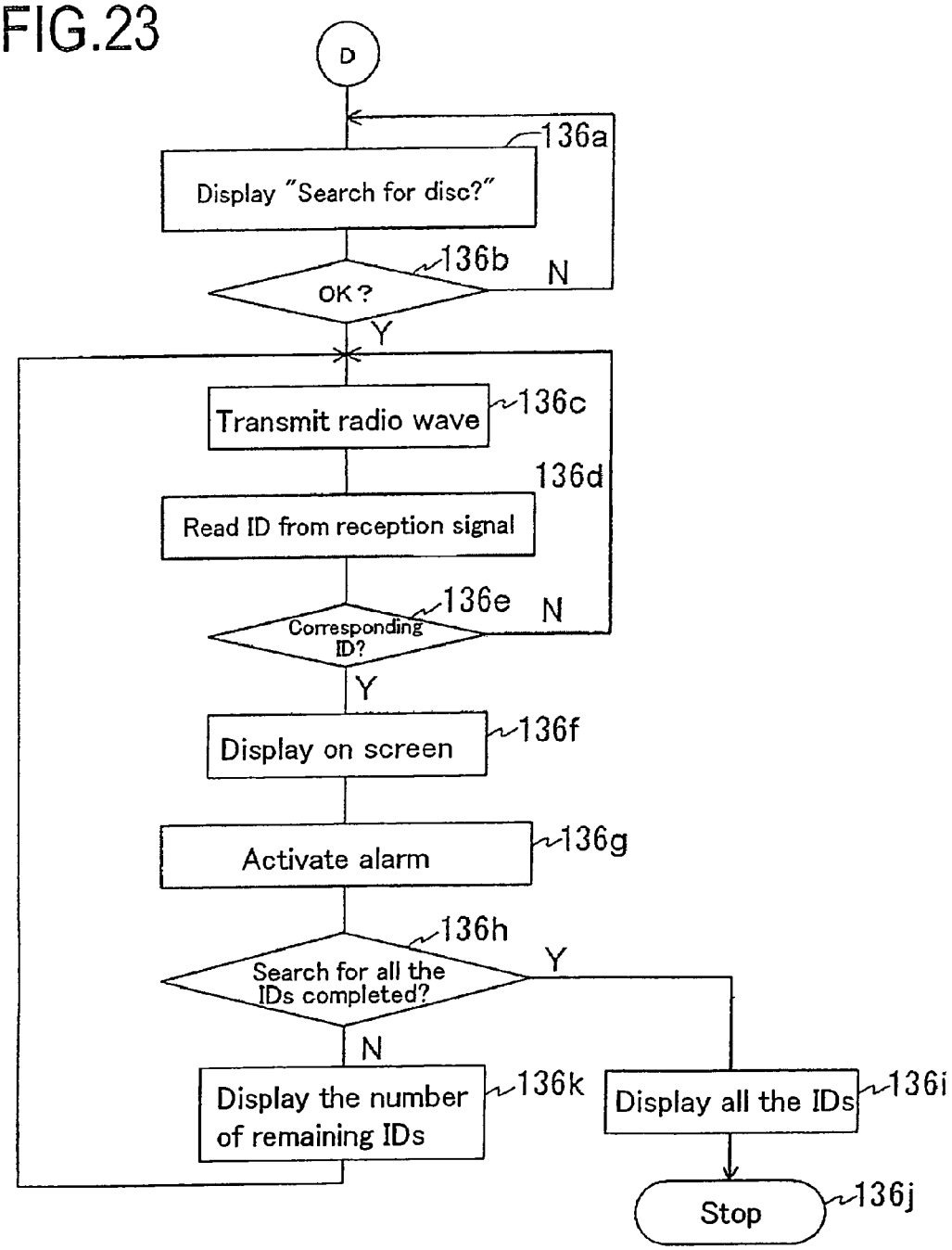
FIG. 23 is a flow chart showing a procedure according to one embodiment of the present invention.

With reference to the flow chart of FIG. 23, the procedure continued from the flow chart of FIG. 22 will be described. The ID number of the optical disc to be searched for is specified in step 135k. Next, a method for searching for an optical disc having a specified ID number will be described.

Figure 24:
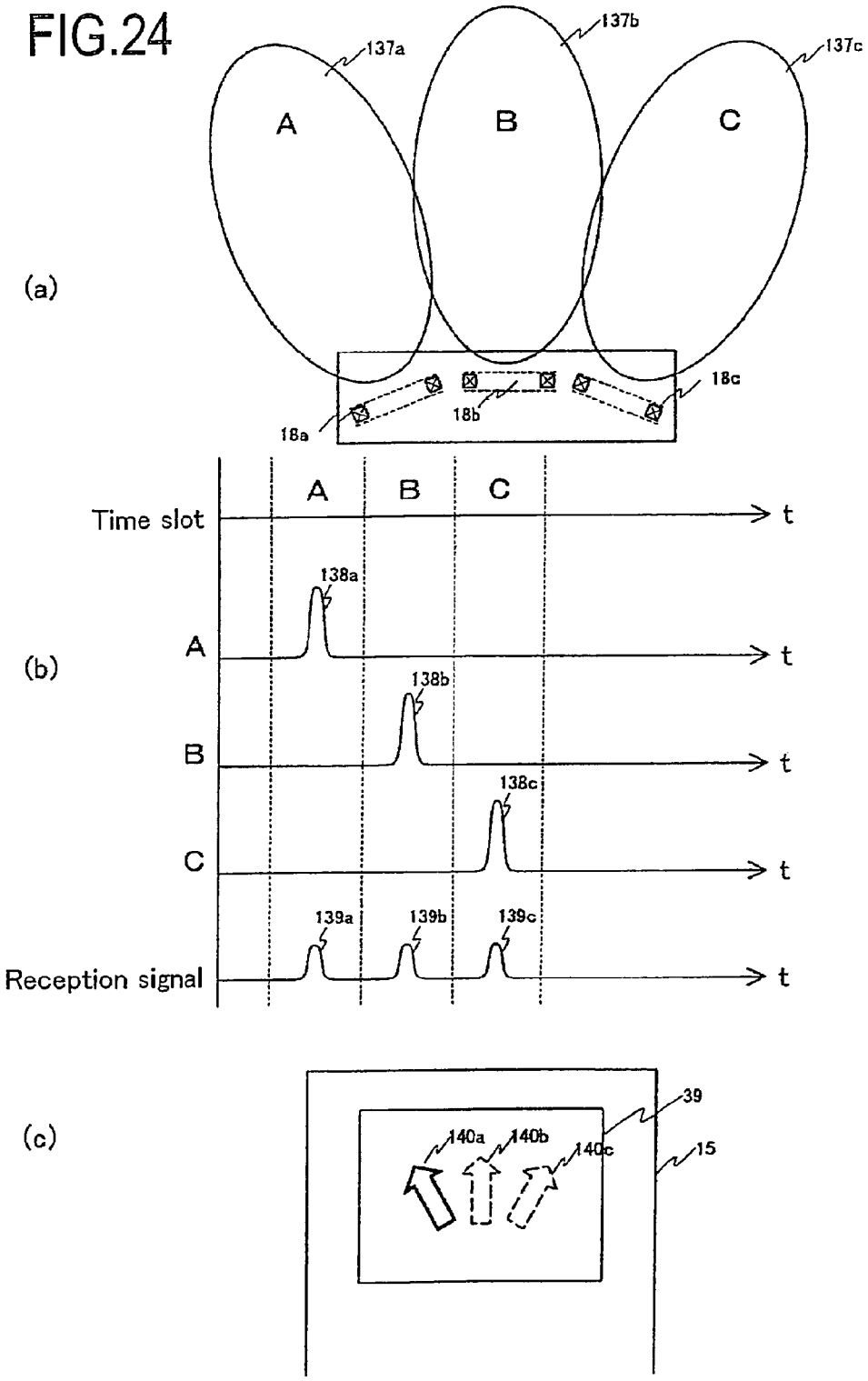
FIGS. 24(a)-(c) are diagrams showing a method for detecting ID information according to one embodiment of the present invention.

In step 136a, a question "Search for disc?" is displayed on the display portion. In the case of searching for a disc (i.e., when it is determined "Yes" in step 136b), radio waves for a search are transmitted in step 136c. For example, as shown in FIG. 24(a), the radio waves for a search are transmitted from transmitting antennas 18a, 18b, and 18c in three directions in a time-division manner. As shown in FIG. 24(b), response signals from optical discs are time-divided into time slots A, B and C, and thus, they can be readily separated. IDs are read from each of the reception signals 139a, 139b in step 136d, and determined whether each of them is a corresponding ID or not in step 136e. If there is a corresponding ID, the corresponding ID is displayed in step 136f. For example, as shown in FIG. 24(c), an arrow 140a is displayed on the displaying portion 39 of the remote control 15. The arrow 140a indicates that the optical disc which is being searched for is in the direction of the arrow. An alarm sound is activated in step 136g. The alarm sound may be activated at the same time as displaying the corresponding ID in step 136f. In step 136h, it is determined whether the search for all the optical discs which are being searched for is completed. If it is determined that the search has been completed, all the IDs are displayed (step 136i) and the process stops (step 136j). If it is determined that the search is not completed yet, the number of remaining IDs is displayed (step 136k) and the process returns to the step 136c.

(Method for Updating Disc Information File)

A method for updating a disc information file in the case where a plurality of recording/reproduction apparatuses are used in one household.

Figure 25:
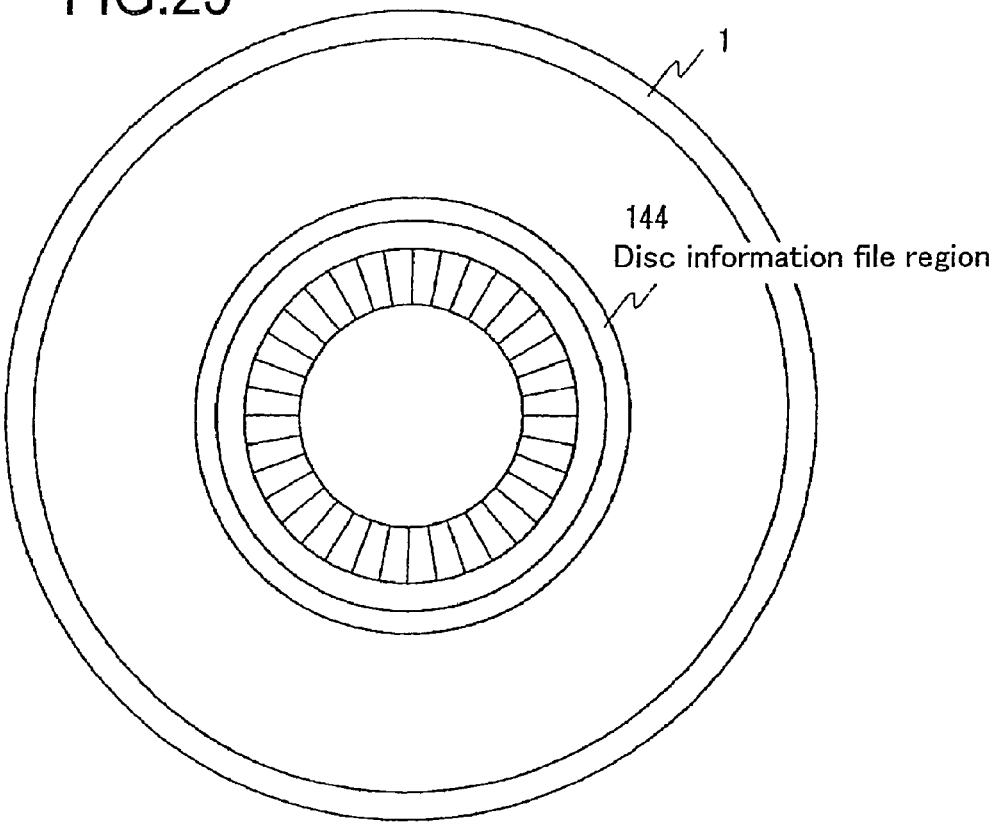
FIG. 25 is a top view of an optical disc according to one embodiment of the present invention.

As shown in FIG. 25, in an inner peripheral portion of the writable-type optical disc 1 according to the present invention, a disc information file region 144 is provided. The recording/reproduction apparatuses respectively access to this portion, compare the disc information file with those of themselves and update only new information.

Figure 26:
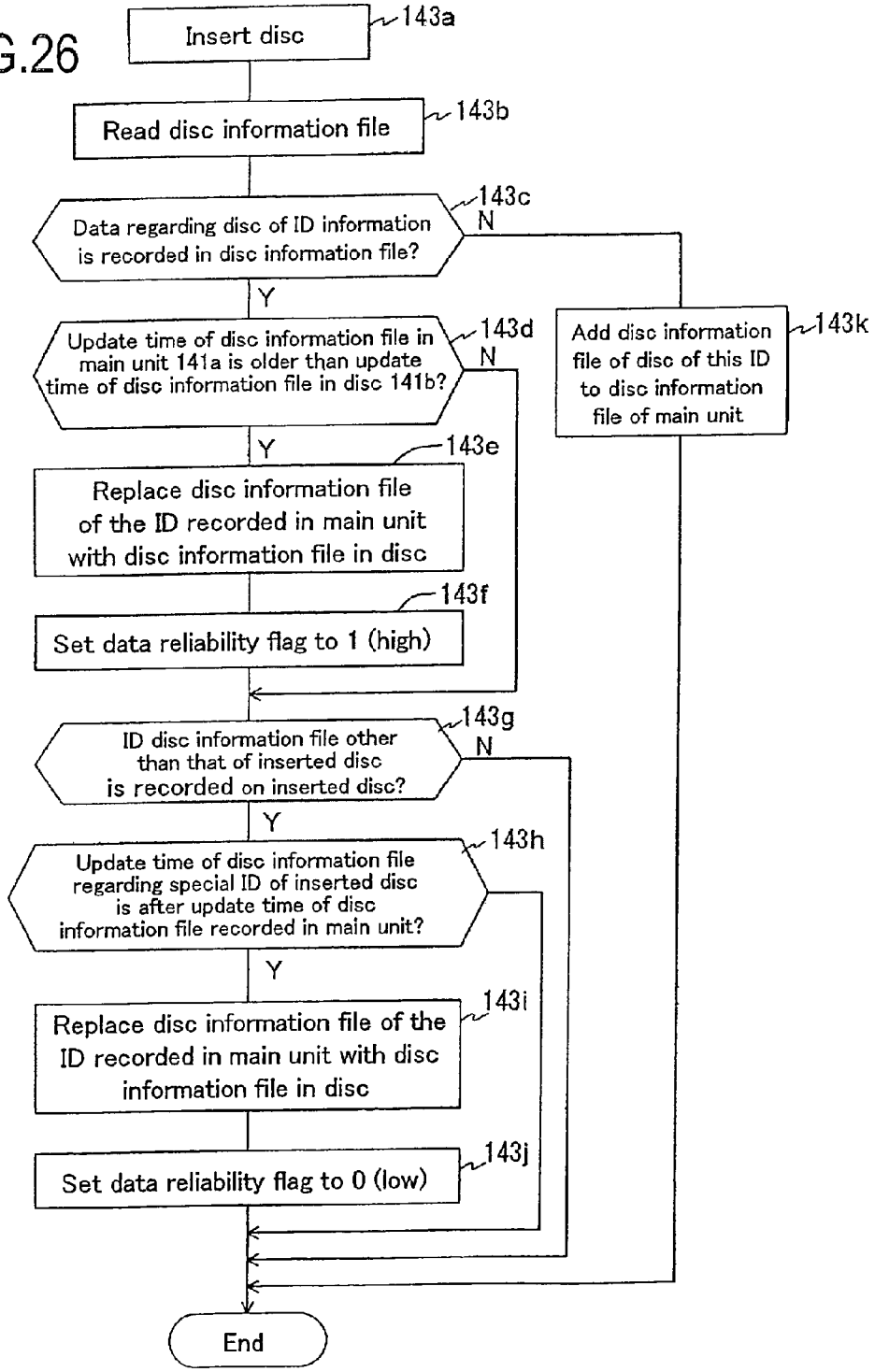
FIG. 26 is a flow chart showing a procedure according to one embodiment of the present invention.

More specifically, in step 143b of FIG. 26, the recording/reproduction apparatuses read the data in the disc information file region 144 shown in FIG. 25. In step 143c, it is determined data regarding the inserted optical disc is recorded in the disc information file in the recording/reproduction apparatus. If it is determined "No" in step 143c, the disc information file of the optical disc is created and added to the disc information file 53 of the recording/reproduction apparatus (main unit) in step 143k. If it is determined "Yes" in step 143c, the process proceeds to step 143d. It is determined whether the update time 141 of the disc information file of the main unit (FIG. 9) is older than the update time of the disc information file of the optical disc. If it is determined to be old (i.e., it is determined "Yes" in step 143d), the data of the main unit is replaced with the corresponding data of the disc (step 143e). In this case, the reliability of data is high. Thus, a data reliability flag 142 (FIG. 9) is set to 1 (high) (step 143f).

In step 143g, it is determined whether data of disc information files of discs different from the inserted optical disc are recorded in the disc information file region 144. If it is determined "Yes" in step 143g, it is determined whether the disc information files regarding the discs are new compared with the disc information file of the main unit (step 143h). If it is determined "Yes" in step 143h, the data of the main unit is replaced with data of the disc for only a disc information file of a disc of a particular ID (step 143i). The data reliability flag of the disc information file of another disc replaced in step 143i is set to 0 (low) (step 143j). In this way, every time a disc is inserted into apparatuses, data of the disc information file is updated.

(Method for Fabricating Antenna)

A method for fabricating an antenna according to the present invention includes a first method of first creating an IC module, in which an IC, antennas, components such as capacitors or the like and wiring are integrated, and then fixing the IC module onto a disc substrate by adhesion or the like, and a second method for directly forming antennas or wiring, or a capacitor on a disc substrate. First, the module method is described.

(Method for Fabricating Antenna in Module Scheme)

A skin depth of an antenna will be 8 μm and 0.6 μm when transmitting/receiving frequency is 13.5 MHz or 2.5 MHz, respectively. In order to efficiently receive radio waves of 13.5 MHz, the thickness of the antenna has to be 8 μm or greater. Thus, forming an antenna portion by a thick film process such as an electrolytic plating used in the normal fabrication process of a print substrate is suitable for this application, which requires sensitivity. The process is as follows. First, a substrate 7 which has an embedding hole for embedding an IC module is created. The substrate 7 may be used as a substrate for an optical disc. Separately, an IC module 201 is created and the IC module 201 is embedded in the embedding hole in the substrate 7. In the case of an optical disc of a type in which two substrates are bonded, after the two substrates are bonded, a label printing is performed to complete the optical disc.

Figure 27:
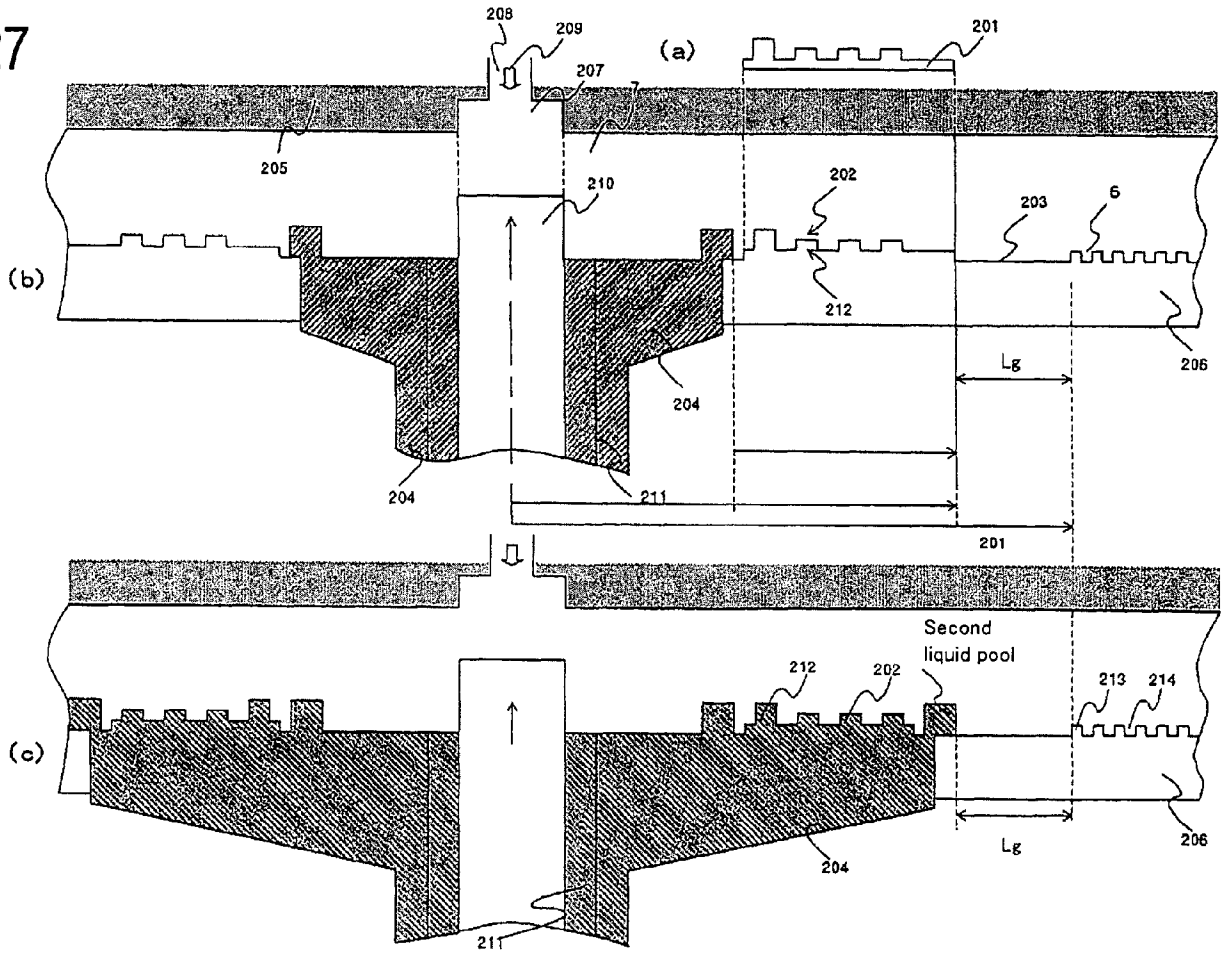
FIGS. 27(a)-(c) are cross-sectional views illustrating a step of forming a substrate with an embedding hole according to one embodiment of the present invention.

With reference to FIG. 27, the method will be described in detail. FIG. 27(a) shows a shape of an IC module with an adhesive layer added therein. For forming an embedding hole 202 for embedding the IC module 201 on a side of the substrate 7, an embedding protrusion 212 is provided in a stamper 206. A guard band 203 is provided across a distance Lg from one end of the embedding protrusion 212. In a peripheral portion of the stamper 206, outside the guard band 203, protrusions for forming an information layer 6, on/from which information can be recorded/reproduced. The guard band 203 is provided for preventing disturbances in the flow of the adhesive layer due to presence of the embedding hole 202 from affecting the information layer 6 in the later bonding step. When a width of the guard band 203 is Lg, the width is set to be Lg≥1 mm. This allows the adhesive layer to be formed stably on the information layer 6 in a bonded disc. Therefore, degradation in optical property of the adhesive layer in the case of a two-layer disc can be prevented. Further, in a single-layer disc, since there is no gap in a bonded portion, degradation of the information layer in an environment of after a long amount of time has elapsed is prevented.

FIG. 27(b) shows an entire process of an injection molding process. First, the stamper 206 is attached to a stamper holder 204 and fixed so as to oppose a fixed mold 205. A resin 208 is injected from an injection hole for resin 207 in a direction of an arrow 209 into the fixed mold 205. A cutting punch 210 punches a central hole. Then, the resin 28 is separated from the stamper 206 by an ejector 211. Thus, a substrate 7 formed of the resin 28 can be removed. The embedding hole 202 having a doughnut-shape is formed in the substrate 7. Thus, the IC module 201 shown in FIG. 27(a) can be accommodated without a gap.

FIG. 27(c) shows an example in which the embedding protrusion 212 of the IC module 201 is formed in the stamper holder 204 instead of the stamper 206. In this example, it is sufficient if protrusions of pits 213 or tracks 214 of the information layer 6 are formed in the stamper 206. This provides an effect of simplifying the fabrication of the stamper 206.

The IC module 201 is formed on the substrate 7 on a side of the information layer 6.

Figure 29:
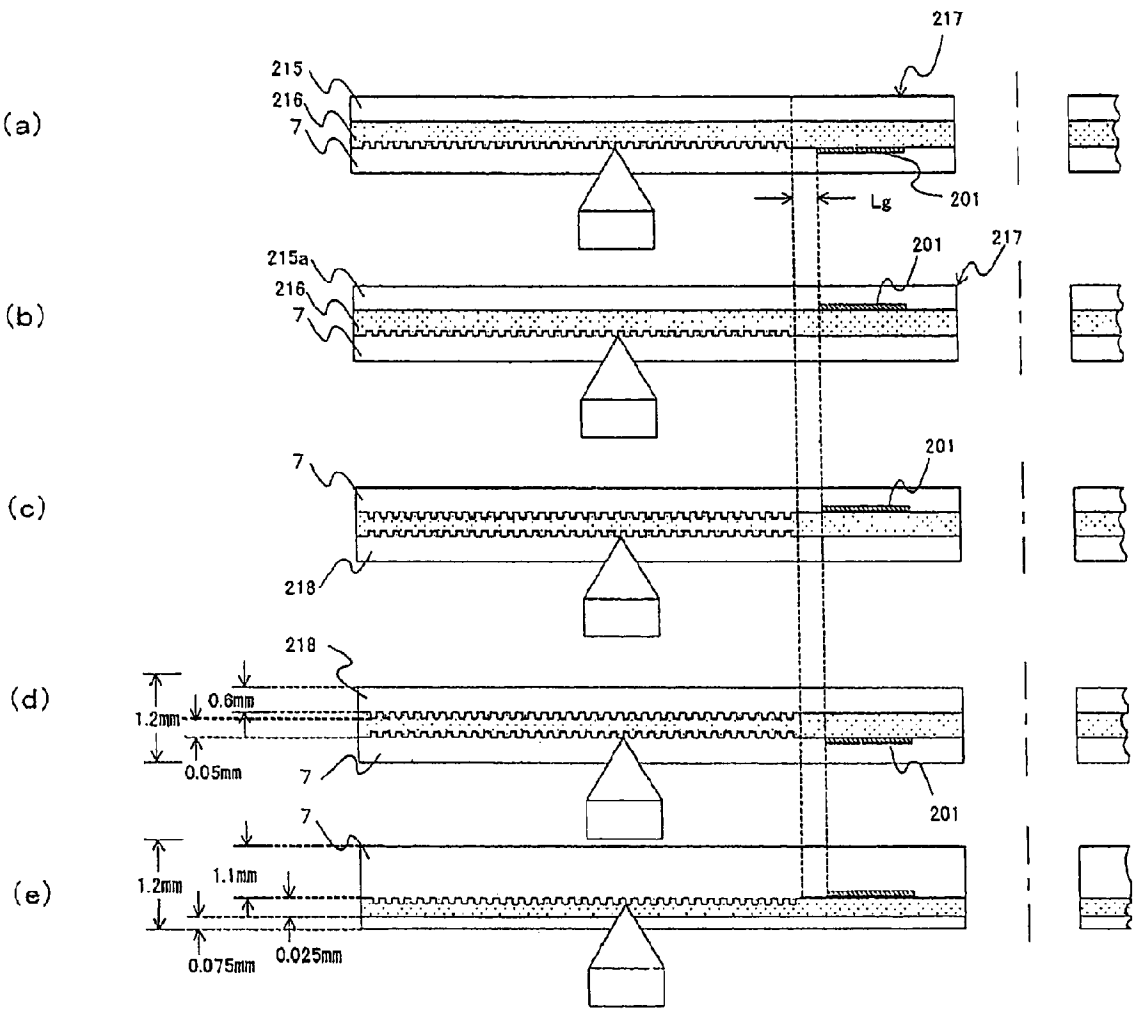
FIGS. 29(a)-(e) are diagrams showing a positional relationship between an IC module and an information layer in a substrate according to one embodiment of the present invention.

As shown in FIG. 29(a), by bonding a substrate 215 which does not have an information layer and the substrate 7 which has the information layer 6 with an adhesive layer 216, a single optical disc 217 is completed. In this example, the IC module 201 is protected by the adhesive layer 216, providing a significant effect that a step of forming a protection layer can be omitted.

FIG. 29(c) shows an example in which the substrate 7 is formed on a side away from the side to be read from, while the information layer and the IC module 201 are formed in the substrate 7 on the side to be read from. In this example, an IC portion of the IC module 201 can be prevented from being seen from the label side, providing an effect of improving the design.

FIG. 29(d) shows an example in which the substrate 7 is formed on the side to be read from. In this example, by setting the thickness of two substrates within the range of 0.55 to 0.64 mm and the thickness of the adhesive layer 216 to 0.055±0.015 mm, an effect that the disc can be reproduced by a player of DVD standards can be achieved.

FIG. 29(e) shows an example in which a blue laser is used. The thickness of the substrate 7 is set to be 1.1 mm or smaller and the thickness of the adhesive layer is set to be 0.025 mm.

In an optical disc in which two substrates are bonded, if the information layer 6 is formed on only one substrate, the other substrate 215 does not have an information layer 6. In this case, as shown in FIG. 29(b), a substrate 215a, and, also, the IC module 201 are formed on the side of the optical disc 217 opposite to the side to be read from. The contents of the information layer are different for every title. In the methods shown in FIGS. 27(b) and (c), the optical disc 217 is defective in both of the cases where the IC module is defective and where the information layer 6 is defective, increasing the total number of possible defects. In the method shown in FIG. 29(b), defects of the substrate 215a and the defects of the substrate 7 can be separated from each other. By bonding only good substrates 215a to the substrate 7, an effect of reducing the number of defects of the completed optical disc 217 can be achieved.

Figure 28:
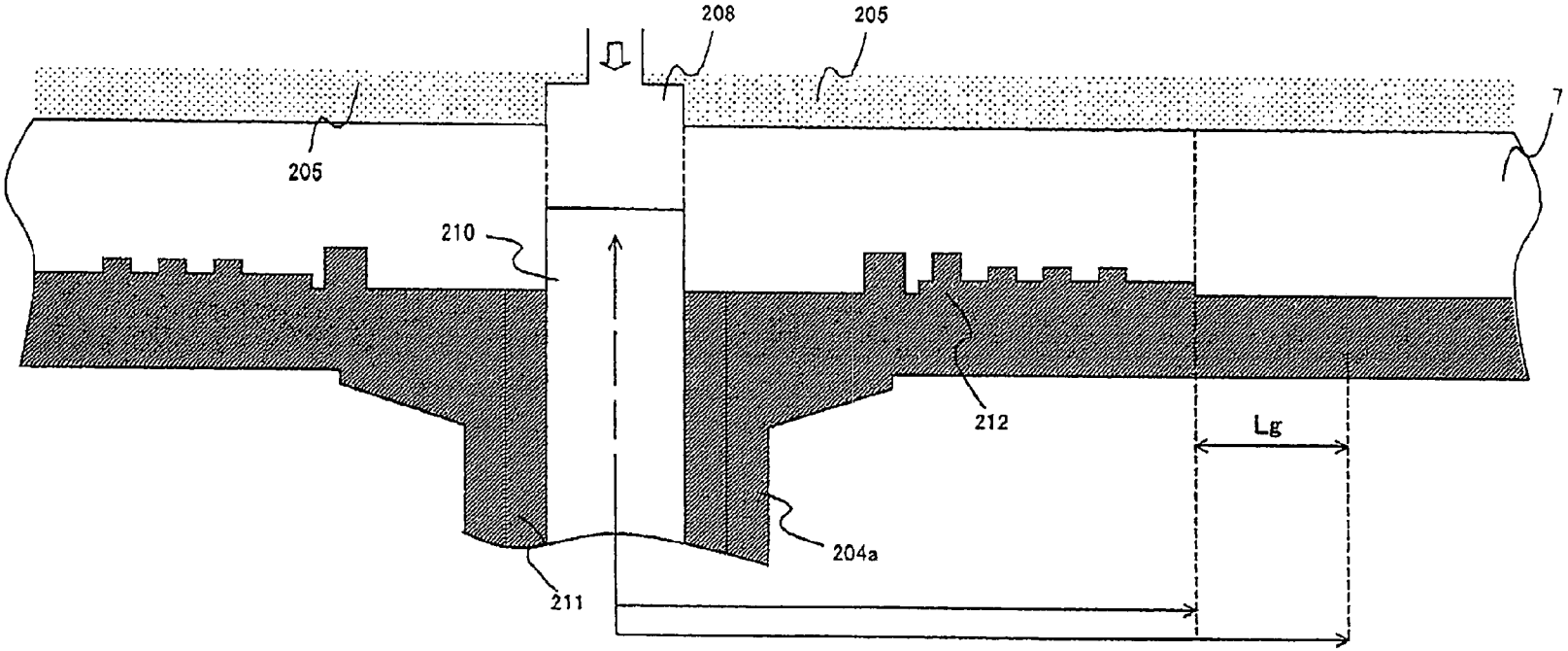
FIG. 28 is a cross-sectional view illustrating a step of forming a substrate with an embedding hole according to one embodiment of the present invention.

Next, a method for fabricating the substrate 215a will be described with reference to FIG. 28. First, a stamper holder 204a having the embedding protrusion 212 is fixed to the fixed mold 205. Then, the resin 208 is injected to form the substrate 7.

(Formation of Angle Identifying Mark)

Figure 30:
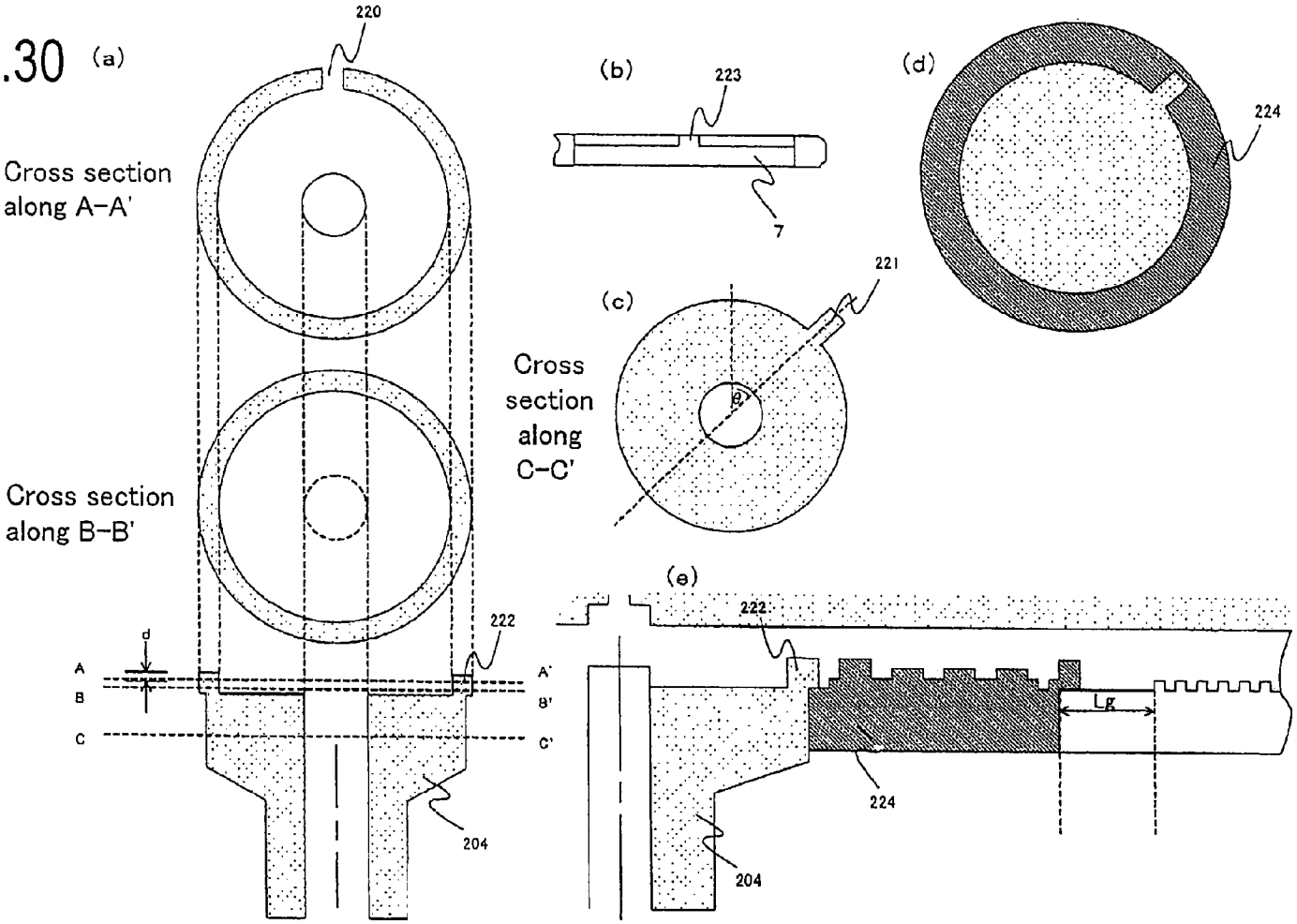
FIGS. 30(a)-(e) are diagrams showing a step of forming an angle identification mark according to one embodiment of the present invention.

In the conventional type optical disc, it is not necessary to specify the orientation of the substrate of the optical disc. Thus, the optical disc has no mark for identifying an angle and merely has means for recognizing characters and symbols on the substrate. Thus, a high precision for detecting an angular position cannot be achieved. In the present invention, in the case of mounting the IC, antennas or components on the substrate, the angular position has to be adjusted with high precision. Therefore, as shown in FIG. 30(a), a mechanical angle identifying recessed portion 220 is provided with high precision along an A-A' cross section of a liquid pool protrusion 222 of the stamper holder 204. The mechanical angle identifying recessed portion 220 is a notch having a depth of d mm. By providing the notch 220 as such, as shown in FIG. 30(b), an angle identifying mark 223 composed of a protrusion of height d is formed in a circumferential trench of the substrate 7 of the optical disc. By using the angle identifying mark 223, mounting and formation at a high precision become possible in later steps of attaching the IC module 201 and the like, directly forming antennas which will be described later, or mounting an IC.

As shown in FIG. 30(c), in a cross-section along C-C' of the stamper holder 204, an angle identifying protrusion 221 is provided at an angle of θ. As shown in FIG. 30(d), a corresponding angle identifying recessed portion is provided in an embedding protrusion 224. The angle identifying protrusion 221 and the angle identifying recessed portion are fitted into each other. The embedding hole 202 and the angular identifying mark 223 are formed on the substrate 7 in a relative position at a high angle. FIG. 30(e) is a cross-sectional view of the stamper holder 204 and the embedding protrusion 224.

(Description of IC Module)

FIG. 31(a) is a top view of the IC module 201 having a double-wound antenna 231, an IC 230, an insulating layer 232, and wiring 233. FIG. 31(b) shows a cross-sectional view along A-A' of FIG. 31(a).

A process for fabricating the IC module 201 will be described with reference to FIG. 31(b).

A wiring substrate 234 having a thin sheet shape of 10 to 20 μm, such as a flexible substrate is prepared. More specifically, a plurality of wirings are created together using a sheet having a large area, and then, after completion, the sheet is punched into doughnut-shapes as shown in FIG. 31(a). Thus, mass production is possible. A notch at a particular angular position is provided in an inner periphery or an outer peripheral portion at a particular angular position to forma similar angle identifying mark 223a. When the IC module 201 is adhered to the substrate 7 of the optical disc in a later step, relative positions in terms of angles with respect to each other can be precisely adjusted by corresponding the angle identifying mark 223a with the angle identifying mark 223 of the substrate 7. This provides an effect that the IC module 201 can be precisely embedded into the embedding hole in an angular direction. Since the optical disc is fabricated at a good precision in the circumferential direction inherently, it is not necessary to add special means for improving a precision of attaching in the circumferential direction.

Figure 31:
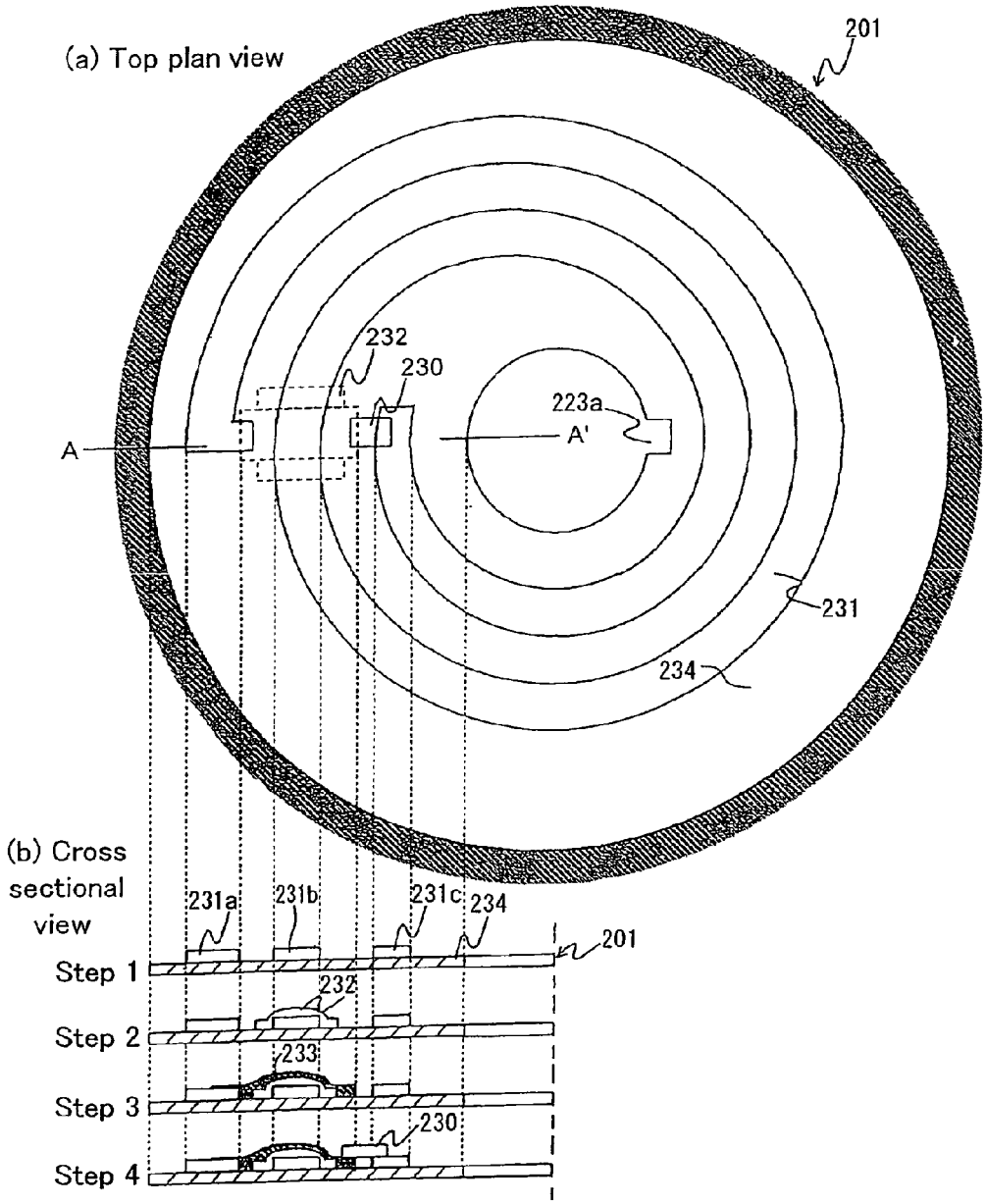
FIG. 31(a) is a top view of an antenna portion of an optical disc according to one embodiment of the present invention.
FIG. 31(b) is a cross-sectional view of an antenna portion of an optical disc according to one embodiment of the present invention.

With reference to FIG. 31(b), in step 1, the antenna 231 (231a, 231b and 231c) is formed. The antenna 231 of a thick film can be fabricated by, for example, an electroless plating or printing method. In step 2, the insulating layer 232 is formed. In step 3, the wiring 233 of a bridge-type is formed over the insulating layer 232 such that the bridge crosses over the antenna 231b. In step 4, the IC 230 is attached to two terminals of the antenna 231 by bonding. A bonding method can be, for example, a method using an anisotropic conductive sheet or the like. By using this method, a flat back surface of the print substrate 234 is obtained. Thus, a flow of an adhesive resin is not blocked during a step of boding substrates, thereby preventing deterioration in the optical property. By providing a capacitor for resonance which is not shown in FIG. 31 and will be described later with reference to FIG. 44, the antenna sensitivity can be substantially improved. Instead of forming the insulating layer 232, wiring 233 for a bridge may be formed at the back surface of the print substrate 234 and connected by providing two through holes in the print substrate 234.

(Method for Attaching IC Module)

Figure 32:
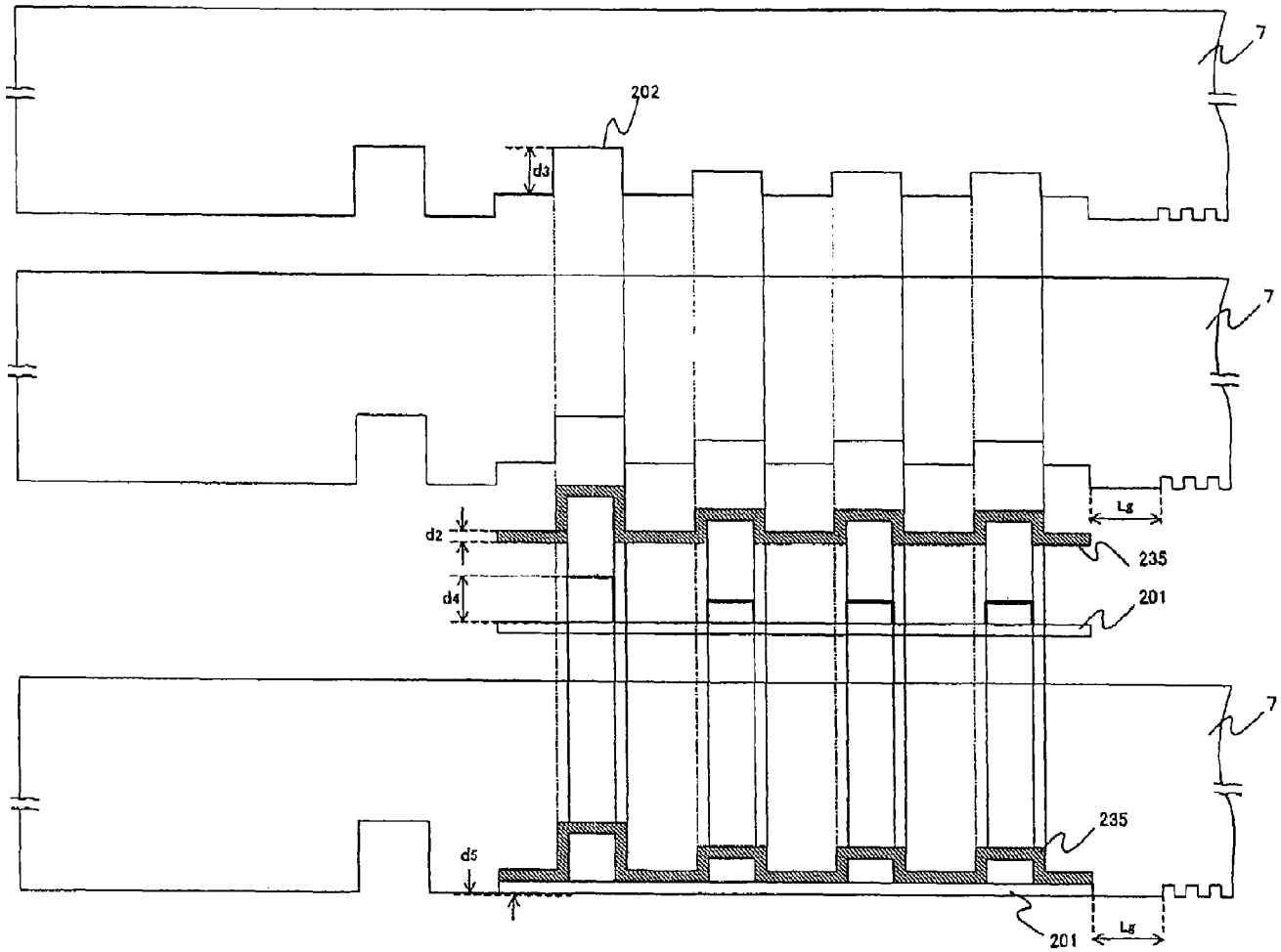
FIG. 32 is a cross-sectional view illustrating an IC module of an antenna portion of an optical disc according to one embodiment of the present invention.

A method for attaching the IC module 201 to the embedding hole 202 of the substrate 7 of the optical disc shown in step 1 of FIG. 32 will be described. As shown in step 2 of FIG.

Figure 33:
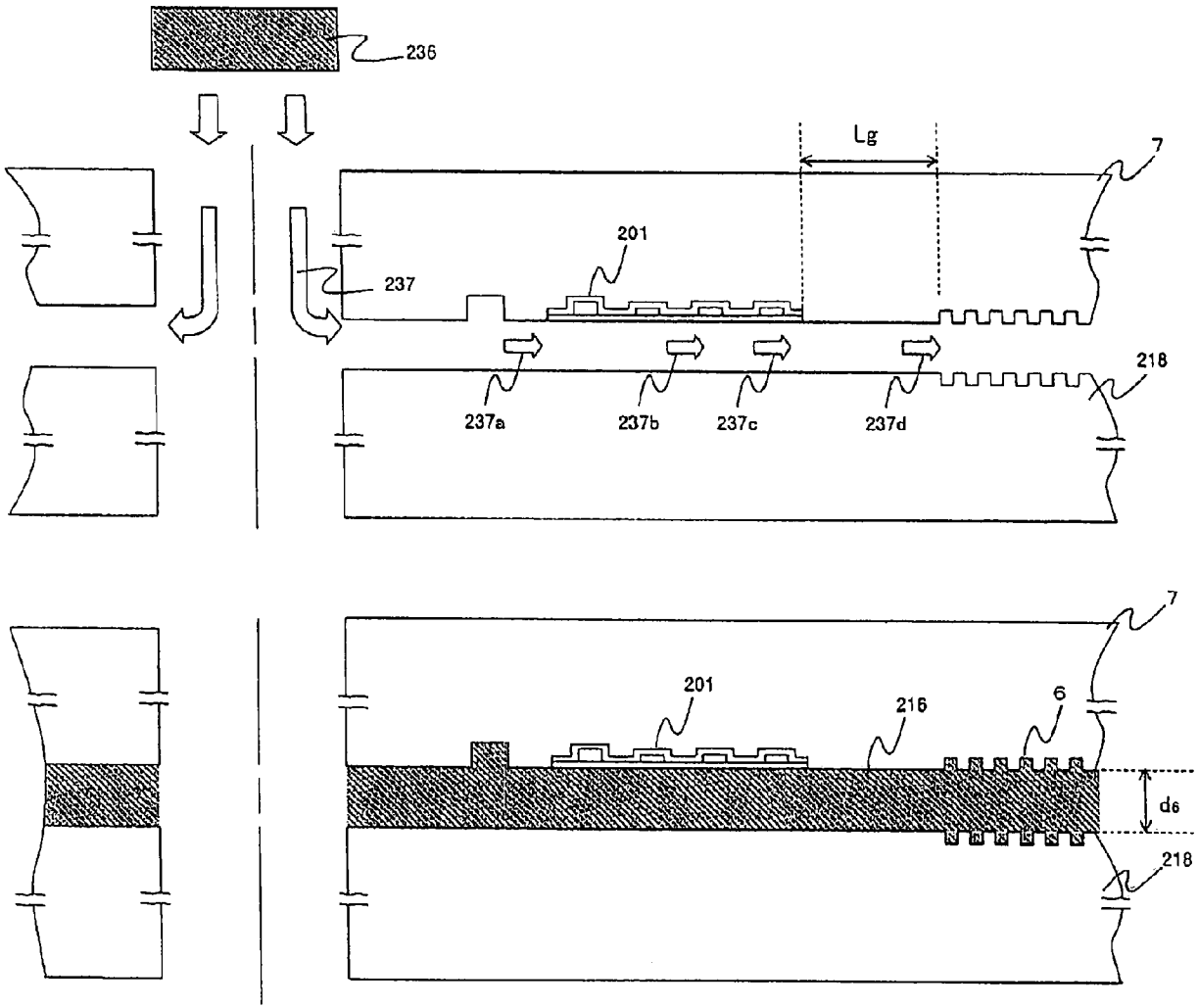
FIGS. 33(a) and (b) are cross-sectional views illustrating a step of bonding an antenna portion of an optical disc according to one embodiment of the present invention.

32, when a maximum height of the IC portion or the like of the IC module 201 is d4, the IC module 201 is attached to the substrate 7 by using an adhesive sheet 235 having a sheet thickness of d2 and a maximum depth of d4. In step 3, the adhesive sheet is cured by heating, ultraviolet rays, or the like and fixing of the IC module 201 to the substrate 7 of the optical disc is completed. As shown in FIG. 32, the IC module 201 is flat with respect to the surface of the substrate 7 of the completed disc. Between the IC module 201 and the information layer 6, a guard band having a distance of Lg is provided. In the optical disc of the type in which two substrates are bonded (for example, the optical disc as shown in FIG. 29(c)), the substrate 7 of the optical disc fabricated as shown in FIG. 33(a) and the other substrates 218 are opposed to each other with a gap of 0.025 mm to 0.05 mm therebetween and an adhesive 236 having a light transmittance is enclosed in the gap. The adhesive 236 flows in a direction of an arrow 237. In this case, if the IC module 201 has the structure shown in FIG. 32, the IC module 201 is flat at the same level as the surface of the substrate 7. Thus, a flow of the adhesive 236 is flat on an attaching portion of the IC module 201 as indicated by arrows 237a, 237b, and 237c. Thus, no disturbance is generated in the flow of the adhesive 236. Therefore, a precision in intervals between the gaps is achieved and the flow of the adhesive 236 is not affected, thereby causing a significant effect that optical properties such as birefringence or the like after the adhesive 236 is cured are not deteriorated. The height d5 as shown in step 3 of FIG. 32, which is a difference in levels of the IC module 201 and the surface of the substrate, is maintained within the range of ±0.015 mm. Thus, the optical disc can meet the standards for DVD or the like. In the case where an ultra-ray curable resin is used as the adhesive 236, the adhesive 236 is irradiated with ultra rays and cured to form the adhesive layer 216 (FIG. 33(b)). In this way, an optical disc of the type in which two substrates are bonded is completed. By providing a guard band having the width Lg of 1 mm or greater, an effect on an optical property of the adhesive layer of the information layer 6 by adding the IC module 201 can be eliminated.

(Method for Mounting Non-Flat IC Module)

Figure 34:
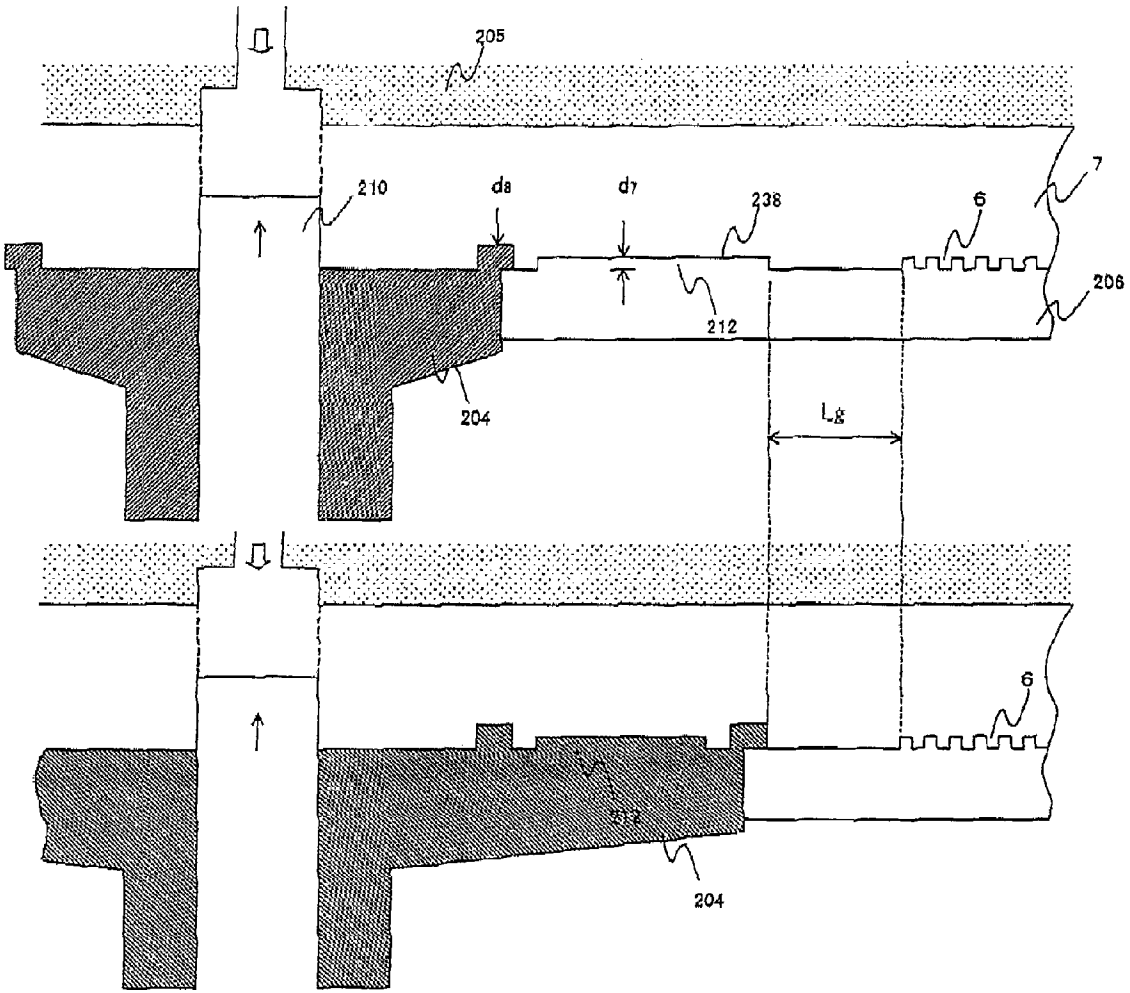
FIGS. 34(a) and (b) are cross-sectional views illustrating a step forming an inner peripheral portion of an optical disc according to one embodiment of the present invention.

A method for making the substrate surface flat after embedding by previously providing an embedding hole having protruded and recessed portions on the substrate 7 side has been described above. Hereinafter, a method of forming a flat embedding hole 238 in the substrate 7 will be described. As shown in FIG. 34(a), the embedding protrusion 212 having a height of d7 is provided in the stamper 206 and injection molding is performed. Thus, the substrate 7 having a flat embedding hole 238 of a depth of d7 can be obtained. In this case, an effect of preventing deterioration in optical properties such as birefringence or the like of the transparent substrate 7 of the information layer 6 or the adhesive layer 216 can be achieved by providing a guard band, which satisfies Lg≥1 mm, between the information layer 6 and the embedding hole 238. Further, as shown in FIG. 34(b), instead of providing the embedding protrusion 212 in the stamper 206, the embedding protrusion 212 may be provided in the stamper holder 204. This structure provides an effect of reducing a time for fabricating the stamper 206.

Figure 35:
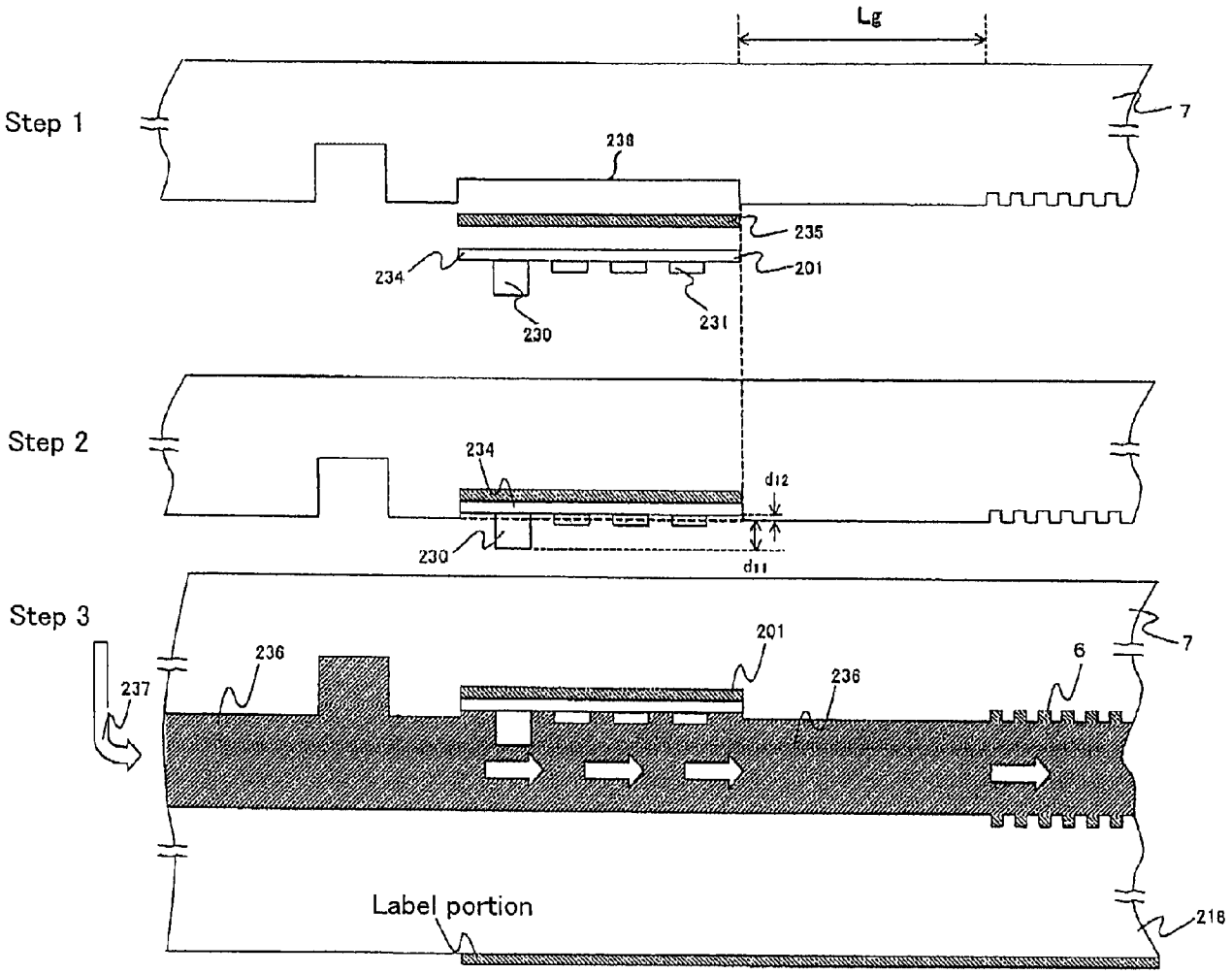
FIG. 35 is a diagram illustrating a step of producing an IC module according to one embodiment of the present invention.

FIG. 35 shows a method for mounting the IC module onto the substrate. In step 1, the IC module 201 is mounted into the embedding hole 238 of the substrate 7, described above, via an adhesive sheet 235 from the print substrate 234 side opposite to the side on which the IC 230 is attached. Step 2 shows the IC module 201 being embedded into the embedding hole 238. In this case, when a height of the IC 230 from the substrate surface is d11, and a height of the print substrate 234 from the substrate surface is d12, by maintaining the sum of d11+d12 within the rage of ±0.015 mm, i.e., 0.03 mm, the disc will meet the standards for the optical disc and thus have the compatibility.

Furthermore, the IC 230 and the antenna 231 are formed on the print substrate 234 such that the volume of the IC module 201 within the range of d11 (i.e., a total sum of the volume of a portion of the IC module 201 protruding from a surface of the substrate 7 to be bonded) and the volume of a gap portion except for an antenna or IC within the range of d12 (i.e., a total sum of the volume of a gap portion which is recessed with respect to the surface on which the substrate 7 is bonded) are about the same. With such a structure, if an adhesive 236 is enclosed in a step of bonding the substrate 7 and the substrate 218 shown in step 3, when the volumes are averaged, they are even out to be zero. Thus, the embedding portion of the IC module 201 can be regarded equivalently that it has the same height as the surface on which the substrate 7 is bonded. Since they have equivalently the same heights, the same volume of the adhesive is enclosed in the IC module region, the substrate portion, and the portion of the information layer 6. Thus, the adhesive 236 is distributed with a uniform thickness. This provides an effect that the thickness of the adhesive layer 216 becomes uniform. In such a structure, an alignment in an angular direction is not necessary. This eliminates not only the need for an angle identifying mark but also a step for aligning in an angular direction.

(Method for Attaching IC to IC Module on Disc Substrate Side)

FIG. 36 shows an embodiment in which the IC 230 and the bridge wiring 233 are provided on a side of the embedding hole of the substrate, and the antenna 231 is provided on the side opposite to the embedding hole of the substrate 7.

As shown in FIG. 36(a) the double-wound antenna 231 is formed on a top surface (surface) of the print substrate 234. As shown in FIG. 36(b), the bridge wiring 233, the wiring 239 and the IC 230 are formed on a back surface of the print substrate 234. By forming the components on the top surface and the back surface of the print substrate 234 as such, the IC module is fabricated.

FIG. 36(c) shows a cross-section along A-A' of the IC module shown in FIG. 36(b). The thickness d17 of the antenna 231 is 8 μm of skin depth for 13.5 MHz as described above. When the thickness d13 of the print substrate 234 is 15 through 20 μm, the thickness d14 of the wiring 239 is 8 μm, the thickness d19 of the IC 230 is 50 μm, the thickness d16 of an adhesive layer is 15 μm, and the maximum thickness d22 is 100 μm. Thus, if there is no embedding hole, the adhesive layer 216 of the bonded portion cannot fall within the range of 55±15 μm.

FIG. 36(e) shows a cross-section of the substrate 7. The maximum depth d20 of the embedding hole 202 of the substrate 7 is about 90 μm, and the minimum depth d21 is about 30 μm.

FIG. 36(f) shows the IC module (FIG. 36(c)) being adhered onto the substrate 7 (FIG. 36(e)) via the adhesive layer (FIG. 36(d)). As shown in FIG. 36(e), the IC module is adhered onto the substrate 7 via the adhesive layer such that the antenna 231 is on the opposite side to the embedding hole of the substrate 7 and the bridge wiring 233, the wiring 239 and the IC 230 are on the side of the embedding hole of the substrate 7. As can be seen in FIG. 36(f), the print substrate 234 and the IC 230 are suitably accommodated below a surface of the substrate 7 and only the antenna 231 protrudes from the surface of the substrate 7. The protruded height d22 of the antenna 231 is 8 μm for 13.5 MHz. Thus, an effect is that the embedding hole allows the adhesive layer 216, to be maintained within the thickness range of 55±15 μm.

As described with reference to step 2 of FIG. 35, by embedding the IC module 201 more deeply so that the level of the IC module 201 is equivalently the same as the level of the substrate surface, the flow of the adhesive 236 during the bonding step is improved. This provides an effect that the optical property is not deteriorated and the thickness of the adhesive layer 216 becomes more uniform. Further, since the angle identifying mark 223a is provided in the IC module, the embedding hole of the substrate and the IC module can be mounted with a high precision in an angular direction.

The IC module produced as described above is mounted into the embedding hole on the side on which the substrate is bonded and the substrates are bonded. Firstly, the IC module can be protected by the adhesive layer without providing a special step for forming a protection layer, and thus, the effects that the number of steps for forming a protection layer can be reduced and the reliability of an environmental resistance is improved, are obtained. Furthermore, since the IC module is at about 0.6 mm or 1.1 mm inside the disc, the effect that the IC module is prevented from being destroyed by a mechanical contact from outside the completed bonded disc, is provided. Similar effects can be obtained by a method for directly forming an antenna which will be described below.

(Method for Directly Forming Antenna: Single-Wound Type)

Figure 37:
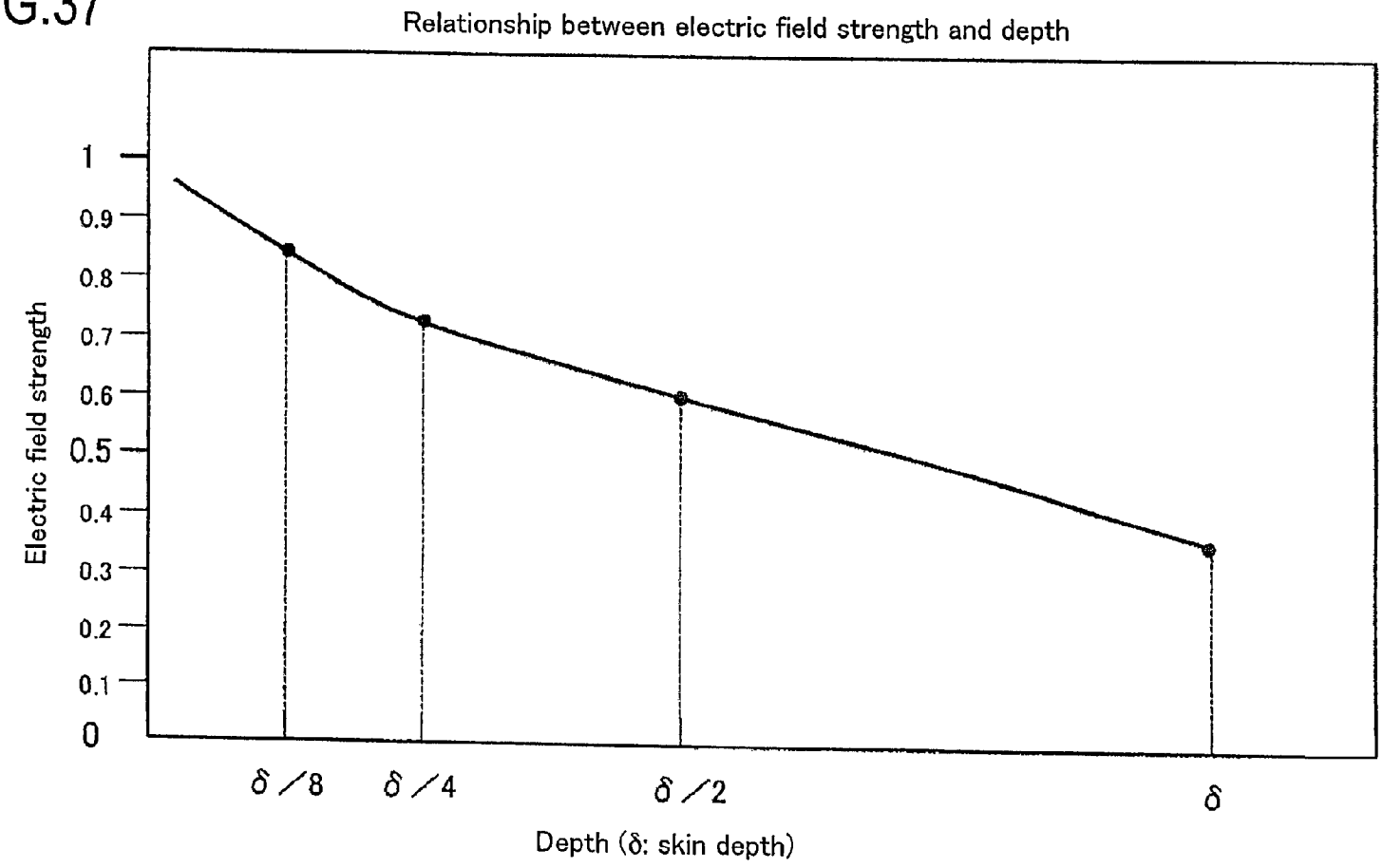
FIG. 37 is a diagram showing an efficiency of an antenna according to one embodiment of the present invention.

A method for producing an IC module and attaching the IC module to an embedding portion of the substrate has been mainly described above. Hereinafter, a method for forming an antenna directly on a disc substrate will be described. A skin depth of an antenna will be 8 μm and 0.6 μm for 13.5 MHz or 2.5 MHz, respectively. Thus, for 2.5 GHz, an antenna can be formed by a thin-film method such as sputtering or the like. For 13.5 MHz, as shown in FIG. 37, an electric field of the antenna is decreased exponentially as the depth of a metal film increases. The energy is the integrated value of a square of the electric field. Thus, for a film thickness of about 1 μm, the sensitivity is not deteriorated that much and only the reception distance is shortened. Therefore, a thin-film method can be applied to both if the application is selected. The same is also true of 2.5 MHz, and the method can also be applied to the case of about 0.07 to 0.1 μm. Thus, a process of forming silver alloy or aluminum alloy on an optical disc substrate of polycarbonate has already been used for many years in mass-production factories and the reliability has been established. Therefore such a method can be used.

Figure 38:
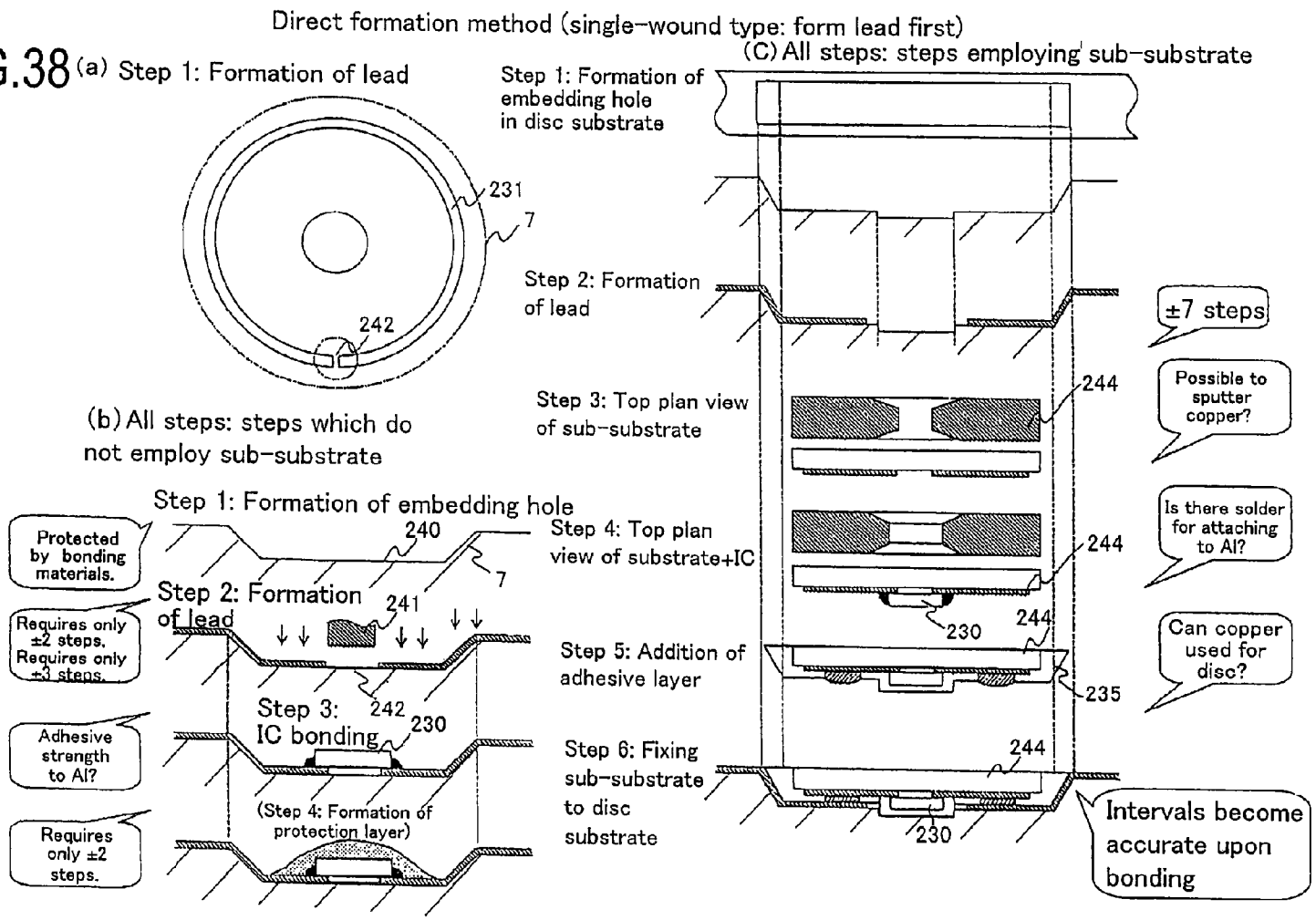
FIG. 38(a) is a diagram showing a directly-formed antenna.
FIG. 38(b) is a diagram illustrating a step of directly bonding an IC according to one embodiment of the present invention.
FIG. 38(c) is a diagram illustrating a step of mounting an IC using a sub-substrate according to one embodiment of the present invention.

With reference to FIG. 38, a method for forming a single-wound antenna will be described.

In step 1 of FIG. 38(a), the antenna 231 is formed along a circumferential direction of the substrate 7 of the optical disc.

With reference to FIG. 38(b), a step of directly attaching a bare IC chip on the substrate 7 will be described. In step 1, an embedding hole 240 which has a shape elongated in the circumferential direction is pre-formed on the substrate 7 by an injection molding. In step 2, the antenna 231 is formed by sputtering with a notch 242 locally formed using a mask 241. In step 3, the IC 230 is bonded to a portion of the notch 242 of the antenna 231. The IC 230 is fixed by bonding or the like using wire bonding or an anisotropic conductive sheet. Then, in the case of an optical disc in which two substrates are bonded, as shown in step 3 of FIG. 35, another substrate is provided to oppose and the adhesive 236 is enclosed therebetween to complete an optical disc. In this case, the IC 230 is enclosed within the adhesive 236. Thus, a step of forming a protection layer is not necessary. During the process from the bonding of the IC chip to the step of boding the substrates, if a step of sputtering a record layer or the like is performed, the protection layer 243 is provided over the IC 230 as shown in step 4 in FIG. 38(b). Thus, an effect on the IC by the sputtering in later steps can be eliminated.

In step 3 of FIG. 38(c), a sub-substrate 244 is formed. In step 4, a small IC block 247 is formed by attaching the IC 230 to the sub-substrate 244. In step 5, the adhesive sheet 235 is attached. In step 6, the small IC block 247 is attached to an embedding hole 240 of the substrate. In this step, the IC 230 is protected by the sub-substrate 244. This provides an effect that the sputtering step can be performed after this step. As will be described later, in the case where a capacitor or the like is formed by a method for forming a recording layer, sputtering is required. Thus, the effect is significant because the influence of the sputtering on the IC can be prevented.

In a method for forming a thin film by sputtering or the like, an antenna conductor having a thin thickness in the order of sub-micron is formed. Thus, when a low frequency is used, the thickness of the antenna conductor does not reach the skin depth and the transmission/reception efficiency of the antenna may be deteriorated. In the case where such a low frequency is used, for example, the antenna conductor may be treated with electrolytic plating or electroless plating without electrodes. The electrolytic plating may be performed by, for example, attaching electrodes to the antenna conductor and covering other metal portions, and/or recording film portions with a protection film, and immersing the antenna conductor into an electrolytic solution and then placing it into an electrolytic plating bath. By treating the antenna conductor with electrolytic plating or electroless plating without electrodes, a thickness of the antenna conductor can be increased and the thickness of the antenna conductor will become close to the skin depth. By adding such a plating step after the step of forming a thin film, the thickness of the antenna conductor can be increased. As a result, it becomes possible to improve the transmission/reception efficiency of the antenna.

(Method for Forming Antenna after Attaching IC)

Figure 39:
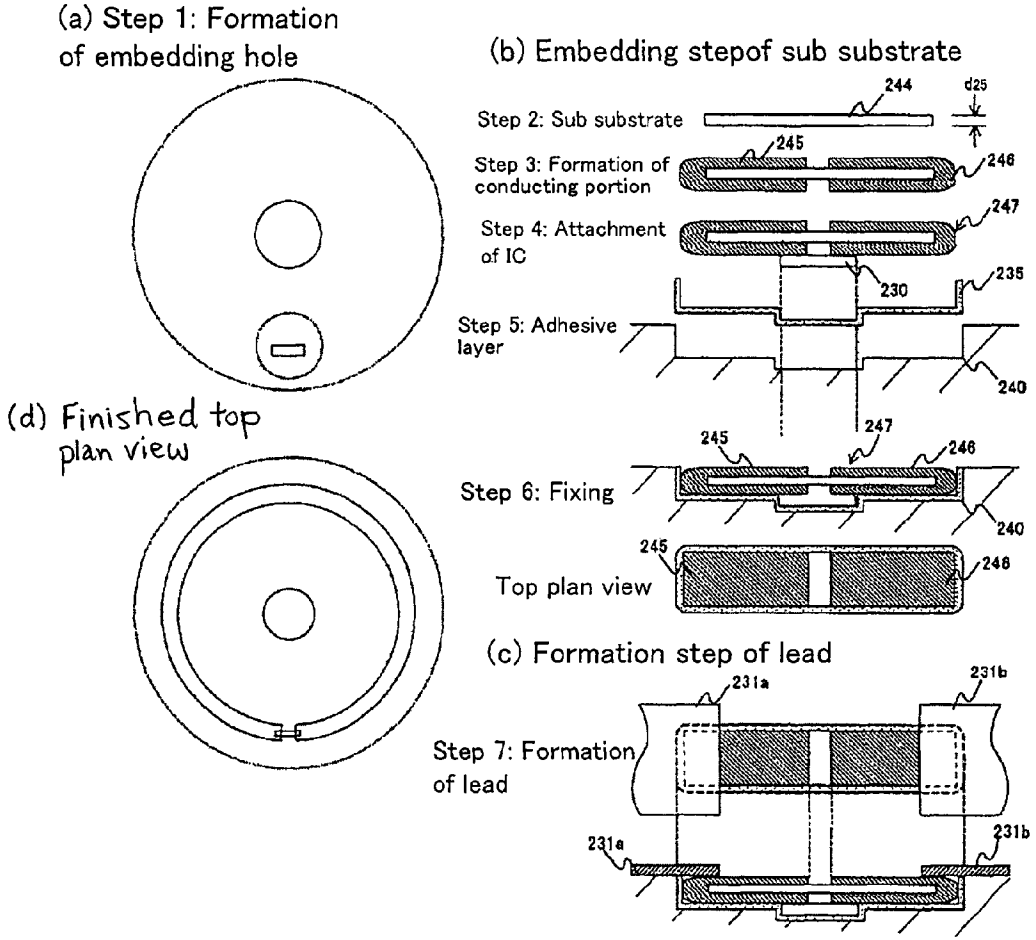
FIGS. 39(a)-(d) are diagrams illustrating a step of mounting a single-wound antenna and an IC.

FIG. 38 shows a method in which the antenna 231 is first formed and then the IC is mounted. With reference to FIG. 39, a method in which the antenna 231 is formed after the IC 230 is mounted will be described.

As shown in FIG. 39(a), a rectangular embedding hole 240 which is elongated in the circumferential direction is formed at the time of the injection molding in step 1, similarly to the method shown in FIG. 38. In step 2 of FIG. 39(b), the sub-substrate 244 of thickness d5 is formed. In step 3, electrodes 245 and 246 which are divided into two are formed around the sub-substrate 244. In step 4, the IC 230 is attached. In step 5, the adhesive sheet 235 is attached. In step 6, the sub-substrate 244 is attached into the embedding hole 240. As shown in a top view, the electrodes 245 and 246 are exposed. In step 7 of FIG. 39(c), terminals 231a and 231b of the antenna 231 are formed by sputtering or the like. Thus, the antenna 231 and the IC 230 are electrically connected. In this case, the IC 230 is protected by the sub-substrate 244. Thus, a sputtering step can be performed in later steps. Further, the electrodes 245 and 246 and the substrate surface have the same level of height and they are continuous. Therefore, even when the antenna 231 is formed using a thin-film process and connected, the possibility of later destruction is reduced, thereby providing an effect of improving reliability. Moreover, the sub-substrate with electrodes in step 3 can be produced on a mass-production basis by only providing two electrodes in both ends of a long sheet of the substrate and cutting the sheet into strips. Thus, a sub-substrate can be implemented at an extremely low cost. A step of forming a metal film on an aluminum alloy or a silver alloy, by sputtering, is carried out in a production process of an optical disc of a RAM type or a ROM type. In the present invention, such a step of forming a metal film is utilized to form the antenna. Thus, the antenna and/or wiring can be formed in the inner peripheral portion of the optical disc without increasing the steps of forming a film. This provides a significant effect that the IC of RF-ID (Radio Frequency-Identification) and the antenna can be formed in the optical disc without increasing the cost, except for the cost for the IC.

(Method for Directly Forming Multiple-Wound Antenna)

In the previous section, an embodiment of the single-wound antenna has been described. For 2.5 GHz, the single-wound antenna does not cause any problem. In the case of 13.5 MHz, the sensitivity is deteriorated. For an application which requires a higher sensitivity, a multiple-wound type antenna wound for n times is required.

Figure 40:
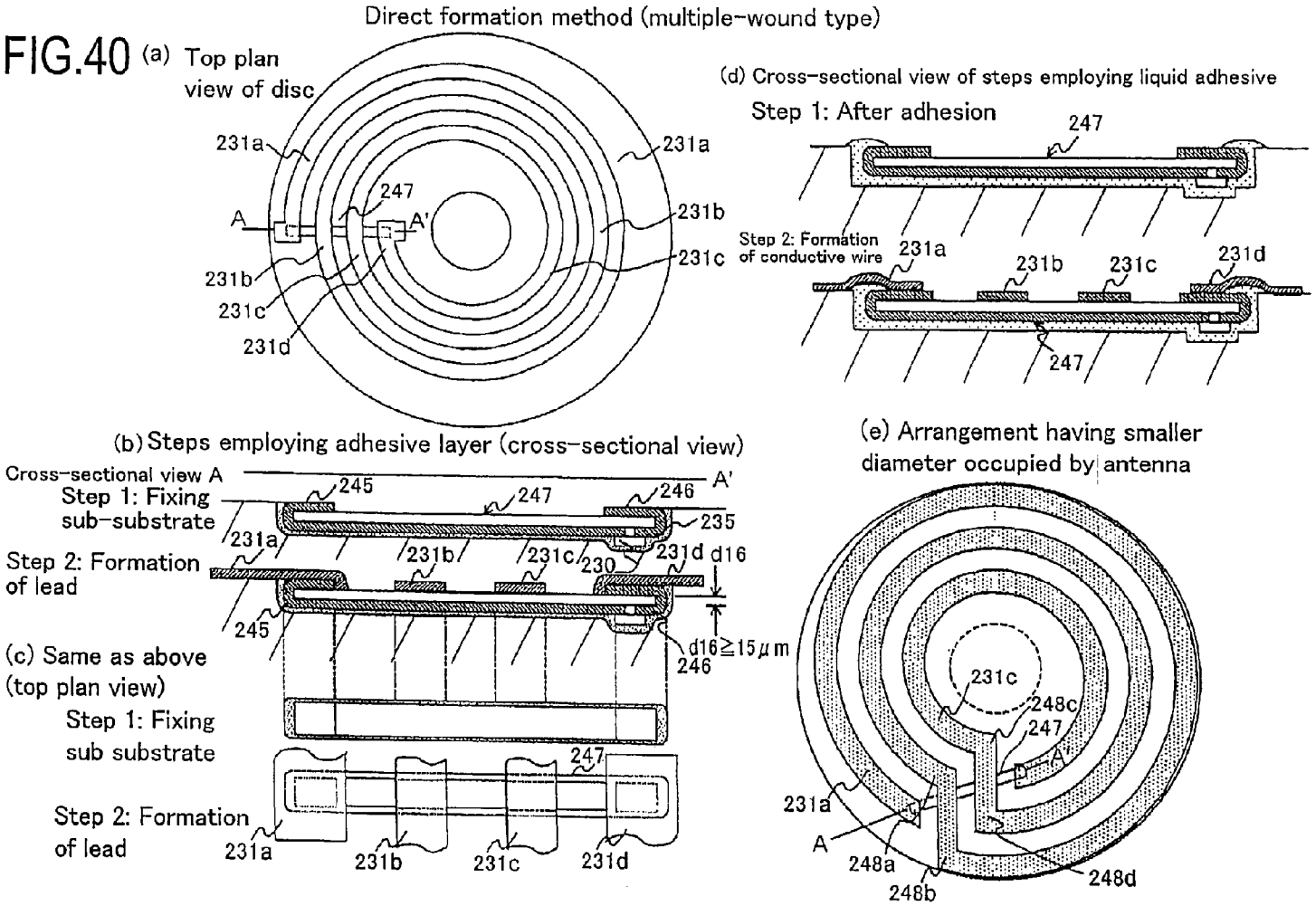
FIGS. 40(a)-(e) are diagrams illustrating a step of mounting a multiple-wound antenna and an IC.

FIG. 40(a) is atop view of an optical disc provided with a multiple-wound antenna. An IC block 247, which has the positions of electrodes shifted from those in the rectangular IC block 247 described with reference to FIG. 39(b), is embedded into the rectangular embedding hole 240 of the substrate 7. Two terminals of the three-time-wound antenna 231 are formed at both ends thereof by sputtering.

The method is described in more detail with reference to the cross-sectional views shown in FIG. 40(b). In step 1, the IC block 247 is fixed into the embedding hole 240 with the adhesive sheet 235. The electrodes 245 and 246 are exposed on the substrate surface. In step 2, on the exposed electrodes 245 and 246, both ends of the antenna 231 are formed by sputtering. Thus, the electrodes 245 and 246 and the terminals 231a and 231d at both ends of the antenna 231 are electrically connected respectively.

FIG. 40(c) shows steps 1 and 2 described above, when viewed from the top. FIG. 40(d) is a cross-sectional view when a liquid adhesive is used for adhesion. Some rises of adhesive are observed between the substrate 7 and the electrodes 245 and 246 of the IC block 247, but bonding therebetween become more firm. Thus, in the case where the terminals of the antenna 231 are formed by sputtering as shown in step 2, the possibility of a break in wire can be reduced.

FIG. 40(e) shows an example in which four bent portions 248a, 248b, 248c, and 248d are provided in the wiring of the antenna 231 of FIG. 40(a). In this example, the wiring of the antenna 231 has a spiral shape with a diameter decreasing as the spiral extends from the outer periphery to the inner periphery of the optical disc. The bent portions of the wiring of the antenna 231 are formed in order of the bent portions 248b, 248a, 248d, and 248c from the outer periphery to the inner periphery of the optical disc. At each of the bend portions 248b, 248a, 248d, and 248c, the diameter of the wiring (winding) of the antenna 231 changes. In the example shown in FIG. 40(e), in an interval between the end of the outer periphery and the bent portion 248b, the diameter of the wiring (winding) of the antenna 231 increases. In an interval between the bent portion 248b and the bent portion 248a, the diameter of the wiring (winding) of the antenna 231 decreases once. In an interval between the bent portion 248a and the bent portion 248d, the diameter of the wiring (winding) of the antenna 231 increases. In an interval between the bent portion 248d to the bent portion 248c, the diameter of the diameter of the wiring (winding) of the antenna 231 decreases once. In an interval between the bent portion 248c and the end of the inner periphery, the diameter of the wiring (winding) of the antenna 231 increases. A bridge portion (the IC block 247 or a metal conductor) which bridges over the wiring of the antenna 231 between the bent portions 248b and 248a and the wiring of the antenna 231 between the bent portion 248d and 248c is provided. The bridge portion is connected to the end of the inner periphery of the wiring of the antenna 231 and the end of the outer periphery of the wiring of the antenna 231.

Such a winding arrangement of the antenna provides an effect that the antenna can be accommodated within a smaller circle. In an optical disc, the recording region starts at a diameter of about 23 mm. Thus, only a narrow region from the inner periphery to a central hole can be utilized as an antenna area. Thus, forming bent regions provides a significant effect for an optical disc because an antenna having a larger number of windings can be accommodated.

(Method for Forming Circuit or Part of Components by Utilizing the Step of Formation of Recording Disc)

In a recording-type disc, a recording region is formed by film formation steps for 6 to 8 layers. These layers include a metal layer which reflects a light and has a high electric conductivity. There is also a plurality of layers for adjusting absorption of light. These layers are insulators having low electric conductivity. Further there is a semiconductor layer. The semiconductor layer is formed by a sputtering method. The semiconductor layer can also be formed by evaporation. The present invention is characterized in that an antenna, capacitor, resistance, and wiring are formed in the same step by utilizing film formation steps of the metal layer, dielectric, and semiconductor. Thus, production in a short time and at a low cost can be implemented by omitting a part or all of the steps for an antenna, wiring and the like.

For example, at least a part of an antenna can be formed by utilizing a film formation step for a metal reflection film included in an information layer on/from which information can be recorded/reproduced. In this case, a metal reflection film and an antenna are formed such that the thickness and the composition of the metal reflection film are substantially the same as the thickness and the composition of at least a part of the antenna.

With reference to FIG. 41, an example of the structure of an information layer of a current recording-type disc. The lowermost layer in FIG. 41 is the substrate 7, which is composed of a transparent layer of polycarbonate and has a thickness of 0.6 mm, 1.1 mm, or 0.75 mm for the case of the bonded disc, and 0.8 mm or 1.2 mm for the case of a single plate. On the substrate 7, an interface layer 252 composed of a dielectric having a thickness of few nm, a recording layer 253, an interface layer 254, a dielectric layer 255 having a thickness of 30 nm, a light absorption layer 256 having a thickness of 10 nm, and a reflection layer composed of Ag alloy or Al alloy having the thickness of 100 nm, are formed. In the case where the information is read out from the side of the substrate 7, the films are formed in the above-mentioned order. In the case where the information is read out from the side of reflection of the substrate 7, naturally, films are formed in the reversed order, i.e., the reflection layer 257 is formed on the substrate 7, the light absorption layer 256 is formed thereon, and so on. Such a case can be implemented by performing the steps of the present invention in the reversed order.

(Fabrication Step of Multiple-Wound Antenna and Capacitor)

Figure 42:
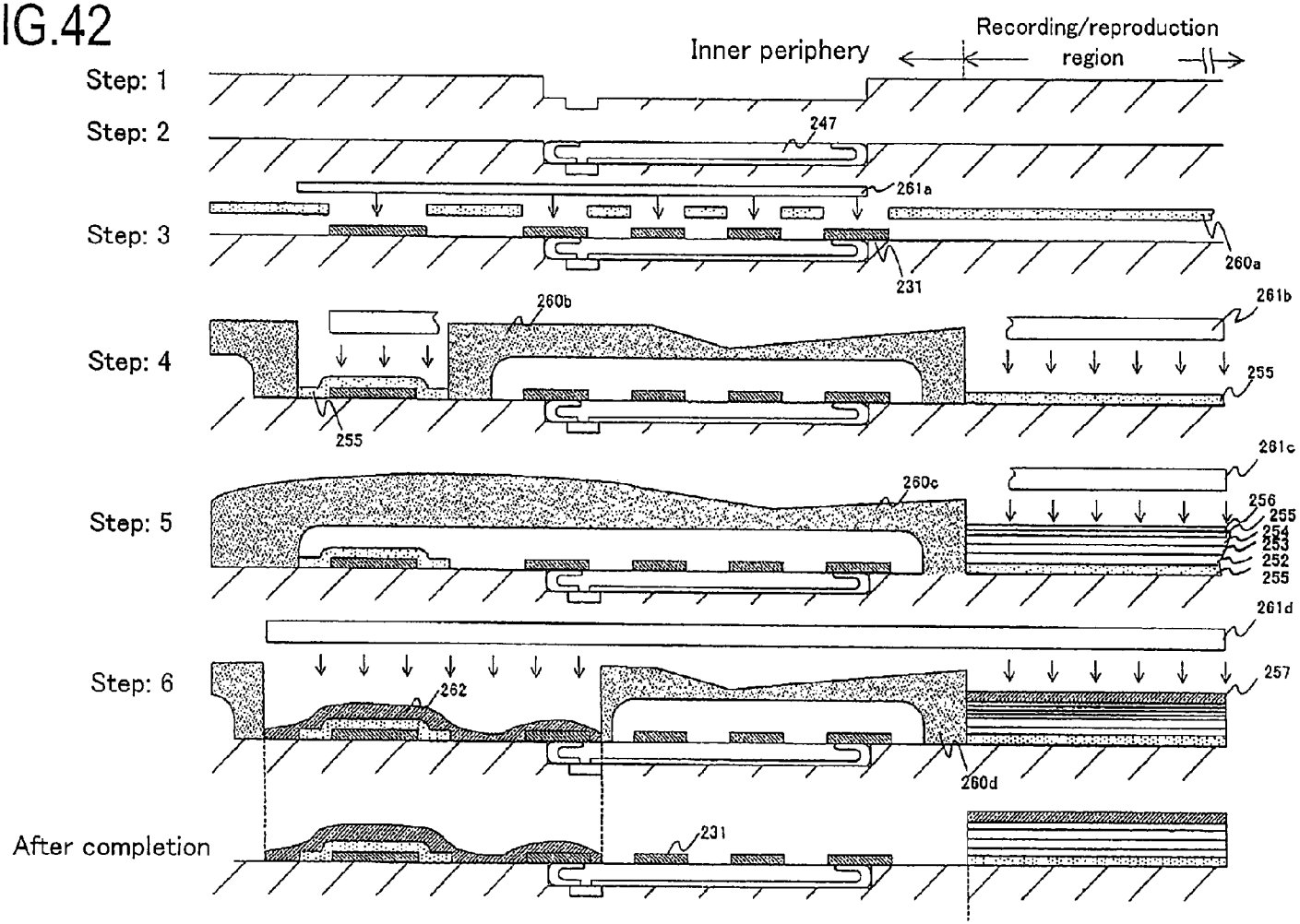
FIG. 42 is a diagram illustrating a step of forming antenna wiring, capacitor during a film formation step for an information layer according to one embodiment of the present invention.
Figure 43:
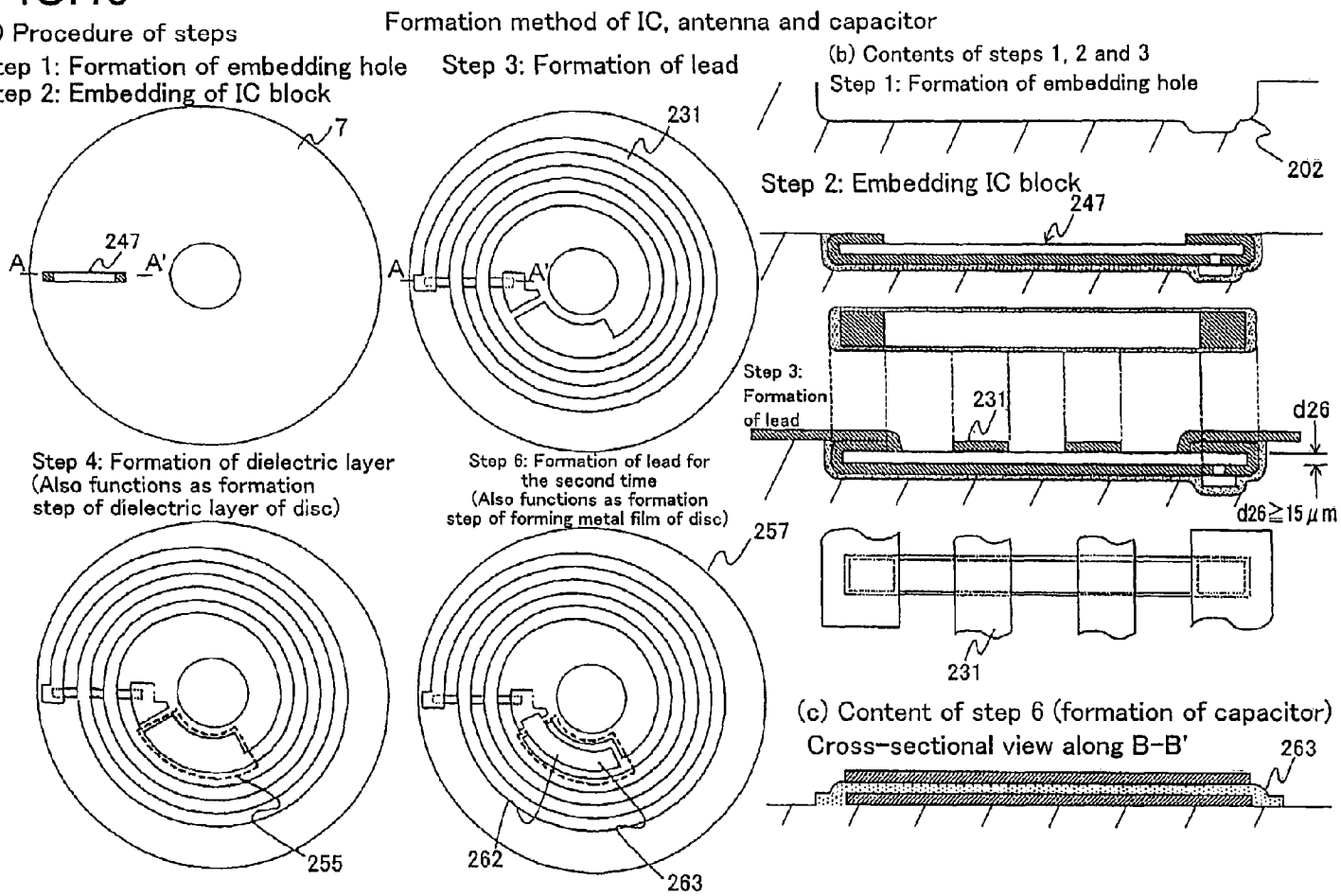
FIGS. 43(a)-(c) are diagrams illustrating a step of forming an IC, an antenna, and a capacitor according to one embodiment of the present invention.

With reference to FIGS. 42 and 43, a method for fabricating an antenna and a capacitor, by utilizing a film formation step for an information layer of an optical disc, will be described.

As shown in FIGS. 42 and 43(a), in step 1, the embedding hole 202 is provided on the substrate 7. In step 2, the IC block 247 is attached. As shown in step 3 of FIG. 42, sputtering by metal targets 261a using a mask 260a is used to form the antenna 231 as shown in FIG. 43. In step 4, sputtering by a dielectric target 261a is performed to form a dielectric layer 255 in the recording region and the region of the capacitor by the mask 260b. Step 4 of FIG. 43 shows a top view. In step 5, the region of the antenna 231 and the capacitor 263 are covered with the mask 260c and the interface layer 254 and the recording layer 253, as shown in FIG. 41, are sequentially formed in the recording region by sputtering. In step 6, sputtering is performed by a metal target 261 of an aluminum or silver alloy, after the mask 260d is formed, on at least a part of the antenna 231 to form the reflection layer 257 and the electrode 262.

In this way, at least a part of the antenna 231 is formed by utilizing film formation steps of metal reflection films included in the information layer. In this case, the metal reflection film and the antenna are formed such that the thickness and the composition of the metal reflection film are substantially the same as the thickness and the composition of at least a part of the antenna 231. Further, at least a part of the capacitor 263 is formed by utilizing the film-formation step for a dielectric film included in the information layer. In this case, the dielectric film and the capacitor 263 are formed such that the thickness, and the composition of the dielectric film, are substantially the same as the thickness and composition of at least part of the capacitor 263.

(Capacitance of Capacitor)

The capacitor 263 is formed for producing a resonance circuit as shown in FIGS. 44(a), (b), and (c) when an inductance of the antenna is L. Setting $f=\frac{1}{2\pi}$ (Route LC) as a frequency for transmission/reception provides an effect of improving a total antenna sensitivity.

(Fabrication Method of Antenna Portion)

FIG. 45(a) is a top view of the mask 260b used for step 3 shown in FIG. 42. The antenna 231 is formed by sputtering using the mask 260b. In a mass-production process of optical discs, formation of a reflection film of an Ag alloy having a thickness of 0.05 μm takes 1 second. Thus, in order to improve the sensitivity, it takes nearly 10 seconds to form a skin depth of 0.6 μm for 2.5 GHz even if it is cooled. In order to shorten a cycle time for sputtering in factories, four discs are put in a chamber of sputtering at the same time as shown in FIG. 45(b). Thus, the cycle time becomes one fourth the original length, 2-3 seconds for each disc. The step can be introduced in a mass-production line in view of the cycle time. Implementing the skin depth of 8 μm for 13.5 MHz is difficult to be intruded into a mass-production line in view of the cycle time. The mass-production step can be implemented by improving the substantial sensitivity by making the film thickness about 1-2 μm, lowering the antenna sensitivity, and introducing a resonance circuit in the capacitor of the present invention. The fabricated thin film antenna is placed into an electrolytic bath to allow electrical conduction resulting in electrolytic deposition to occur so as to form an electroplating layer. As a result, an antenna with a thickness of 1-10 μm can be formed. Thus, an antenna with thickness of equal to or greater than the skin depth of the antenna can be formed, this antenna corresponding to low frequencies.

(Fabrication Method for Another Resonance Circuit)

Figure 46:
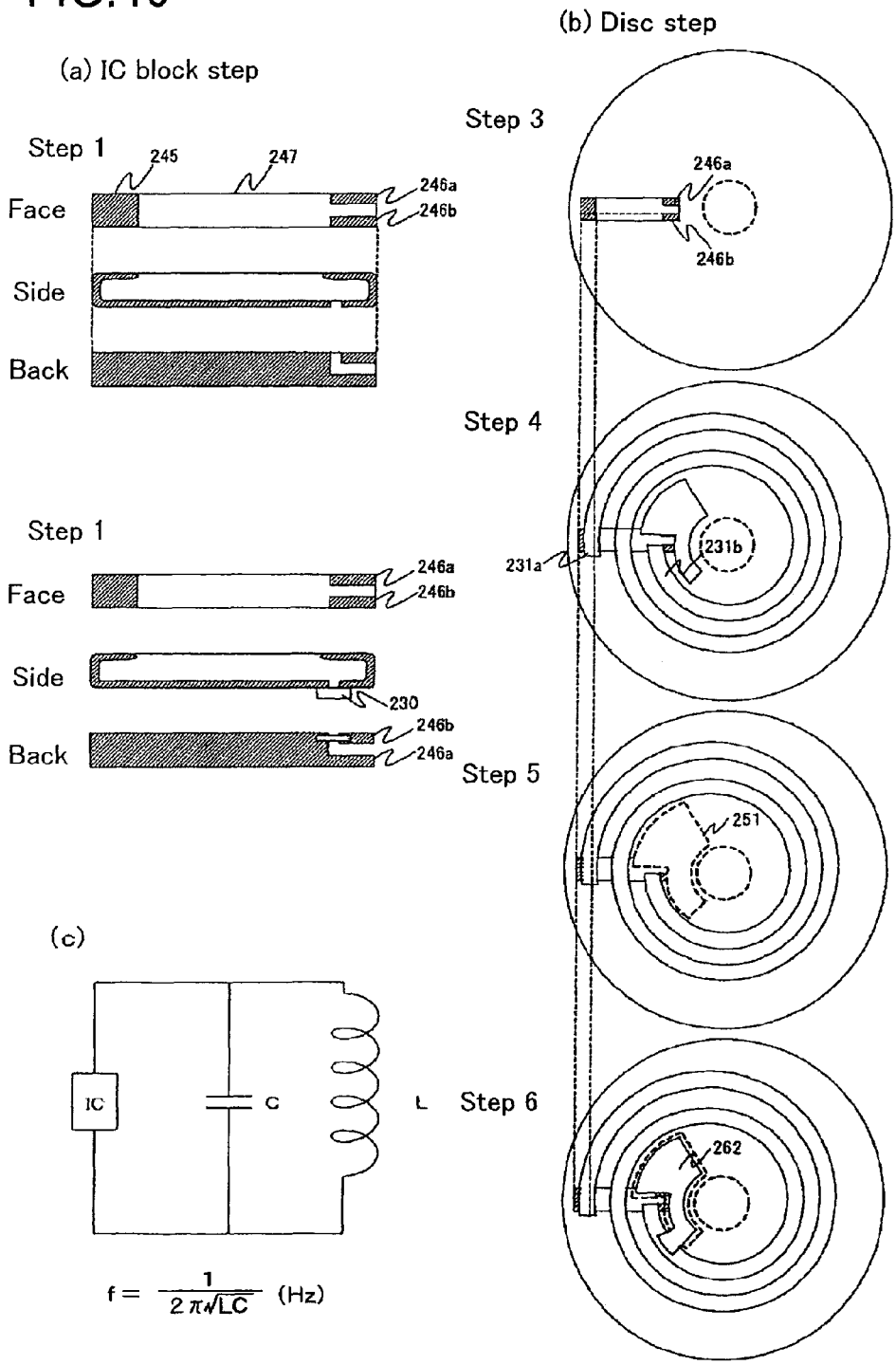
FIG. 46(a) is a diagram showing a step of producing an IC block according to one embodiment of the present invention.
FIG. 46(b) is a diagram showing a step of producing a disc according to one embodiment of the present invention.
FIG. 46(c) is a diagram showing an equivalent resonance circuit according to one embodiment of the present invention.

By using the structure shown in FIG. 43, the resonance circuit of FIG. 44(a) is obtained. Hereinafter, a method for fabricating the resonance circuit having a shape shown in FIG. 44(b) will be described with reference to FIG. 46. A first difference is the structure of the IC block 247. As shown in FIG. 46(a), one electrode 246 is separated into an electrode 246a and an electrode 246b. In step 2, the IC 230 is connected to the electrode 246a. In step 3, the IC block 247 is mounted. In step 4, the antenna 231 is formed such that one terminal 231b of the antenna is electrically coupled to the electrode 246b. In step 5, the dielectric layer 251 is formed. In step 6, the reflection layer 257 is formed by sputtering such that the electrode 262 is electrically coupled to the terminal 231b of the antenna 231. In this way, a step of fabricating the antenna and IC portion having a resonance circuit as shown in FIG. 46(c) can be performed while also serving as a film formation step of the recording film.

(Method for Fabricating Antenna and Reflection Film in the Same Step)

With reference to FIG. 42, an example of fabricating the antenna 231 and the reflection film in the same step has been described. By using a mask 260e as shown in FIG. 47(a), the antenna 231 and the reflection layer 257 can be formed in the same film formation step. For the ROM disc, there are only two steps for the reflection film and the protection film. Thus, the effect caused by this method is significant.

By using the mask 260f as shown in FIG. 48(a), sputtering is performed by a target 260 of Al or Ag. A single-wound antenna 231 and the reflection film 257 as shown in FIG. 48(b) are formed. By only providing the embedding hole 240 and bonding the IC 230, a disc with an antenna and IC can be formed. This is achieved by only adding one step of IC bonding, there is an effect that the disc can be fabricated extremely easily at a low cost. This method can be applied to both a RAM disc and a ROM disc. Further, two discs are bonded with the IC 230 inside to form one disc. The antenna and IC are protected from the external environment. Thus, a high reliability can be achieved. The simplest method is to use an IC with an antenna for RF-ID, embed the IC in the embedding hole 240 of the substrate 7, and bond the disc with the IC inside. If the cost of such an IC is reduced, a disc with a high reliability can be readily fabricated with this method.

(Fabrication Method for Thin Film Antenna)

Figure 49:
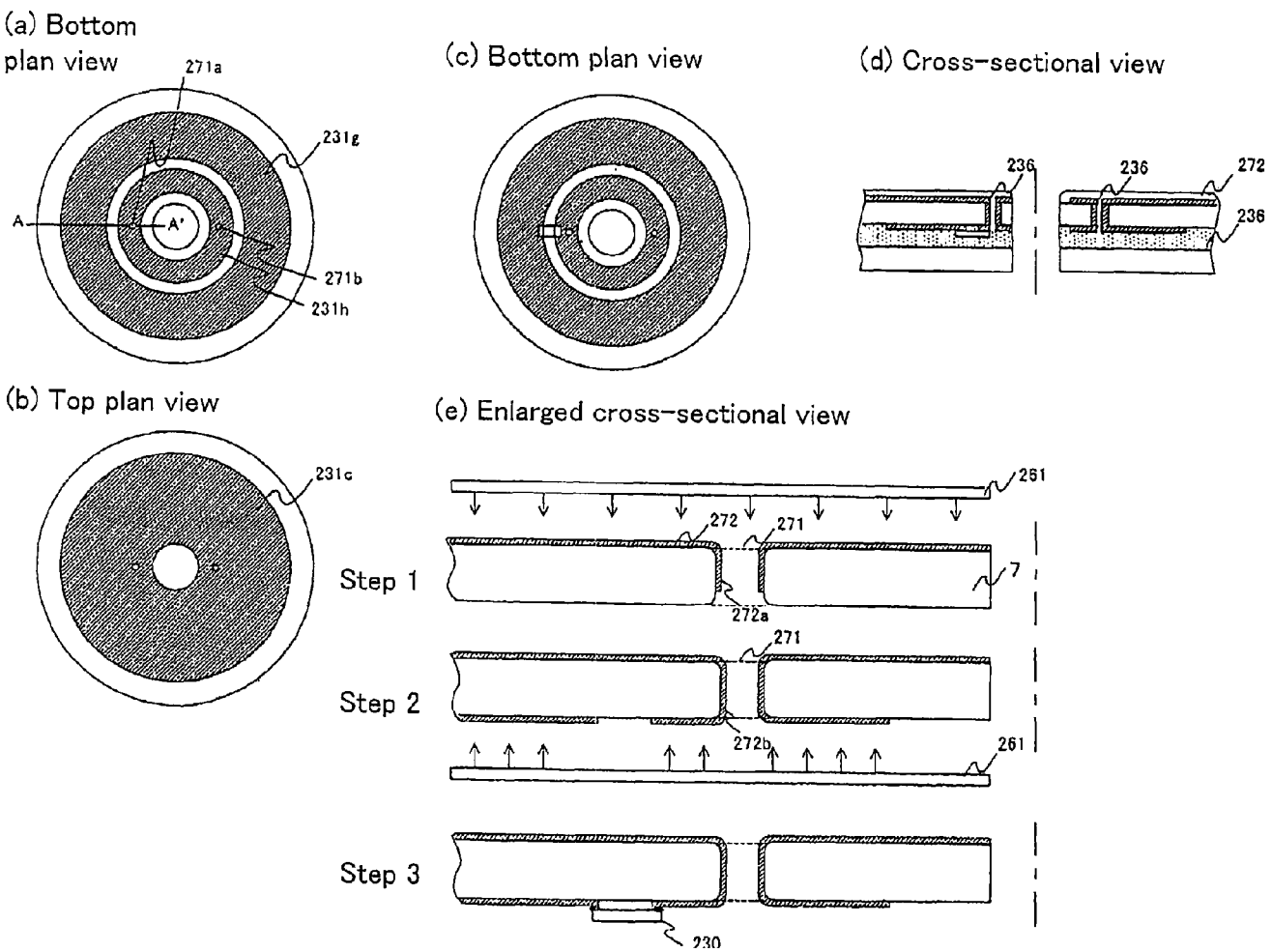
FIG. 49(a) is a view of a back surface of an antenna according to one embodiment of the present invention.
FIG. 49(b) is a top view of an antenna according to one embodiment of the present invention.
FIG. 49(c) is a view of a back surface of an antenna according to one embodiment of the present invention.
FIG. 49(d) is a cross-sectional view of an antenna according to one embodiment of the present invention.
FIG. 49(e) is an enlarged cross-sectional view according to one embodiment of the present invention.

FIG. 49(a) is a diagram showing a back surface of a thin film antenna 231g. Through holes 271a and 271b are provided in an antenna 231h on the inner peripheral portion. FIG. 49(b) is a top view showing the antenna 231d formed. With reference to FIG. 49(e), a fabrication step of a through hole will be described. In step 1, sputtering is performed using the metal target 261 from a surface to the through hole 271 of the substrate 7 to form a metal layer 272a on the upper half part of the through hole 271. In step 2, a metal layer 272b is formed on the lower half part of the through hole 271 from the back surface side. The metal layer 272a on the surface side and the metal layer 272b on the back surface side are electrically coupled. In step 3, the IC 230 is bonded on the back surface to complete the antenna and the IC portion. As shown in FIG. 49(d), this disc is bonded with another disc to complete one disc. In this case, the adhesive 236 for bonding flows into the through hole and fills the hole. Thus, the IC and the like inside is not affected by the external environment. For protecting the antenna 231c on a top surface, a protection layer 272 is formed. The antenna has two poles of surface and the back surface. Thus, it also serves as a dipole antenna.

(Structure and Operation of Remote Control)

The structure of the remote control 15 which is described with reference to FIG. 5 will be described in more detail.

Figure 50:
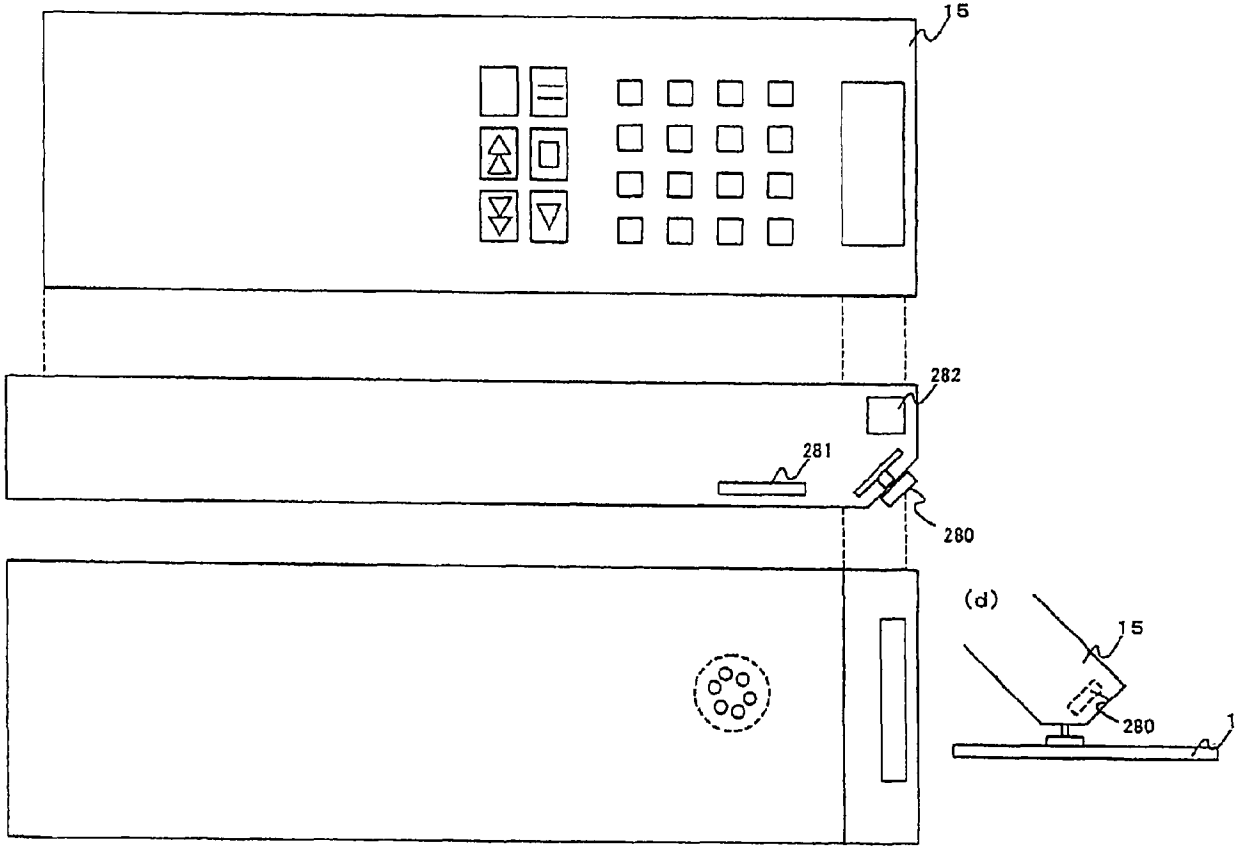
FIG. 50(a) is a top view of a remote control according to one embodiment of the present invention.
FIG. 50(b) is a side view of a remote control according to one embodiment of the present invention.
FIG. 50(c) is a view of a back surface of a remote control according to one embodiment of the present invention.
Figure 51:
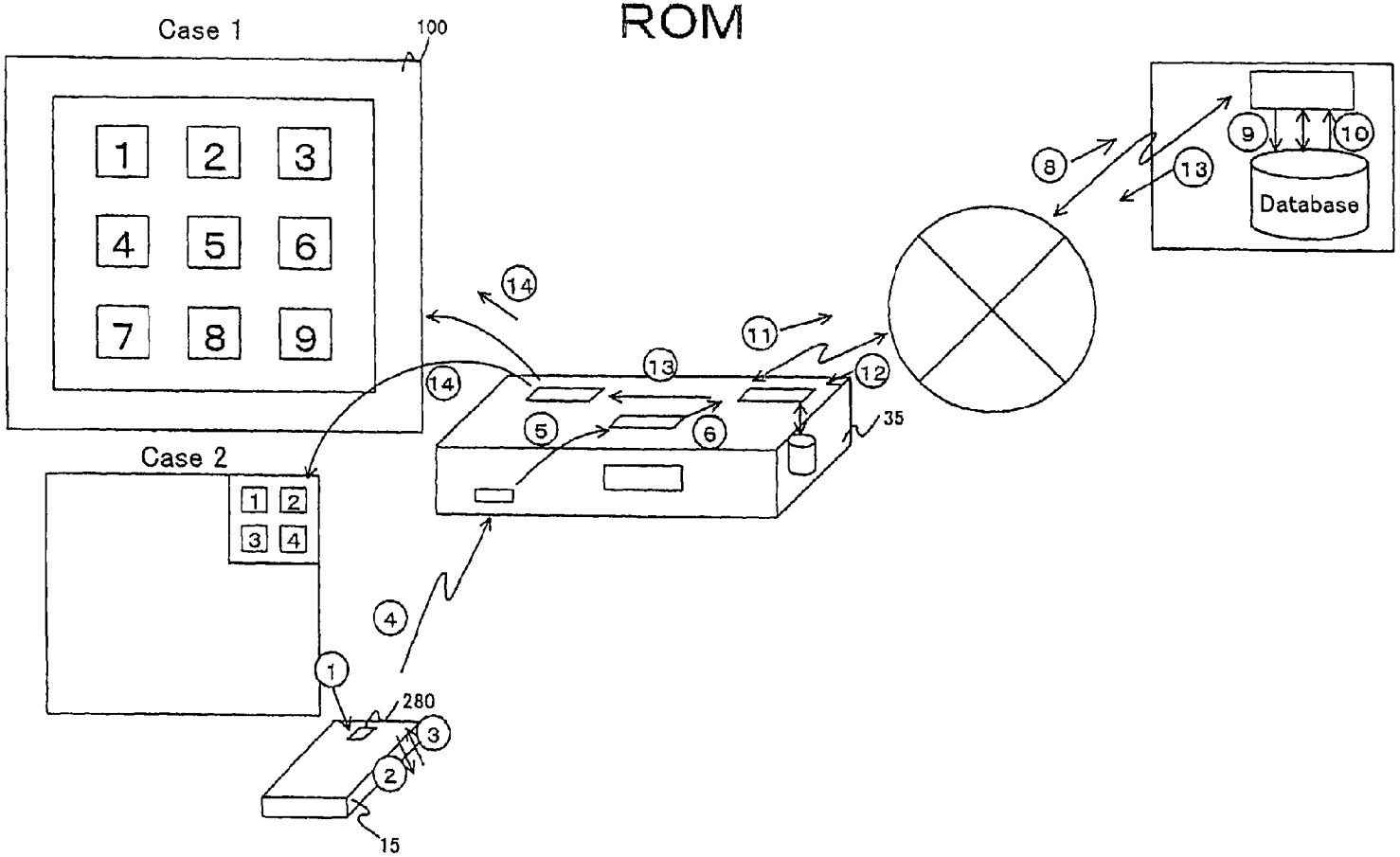
FIG. 51 is a diagram showing a communication flow of a remote control and a reproducing apparatus according to one embodiment of the present invention.
Figure 52:
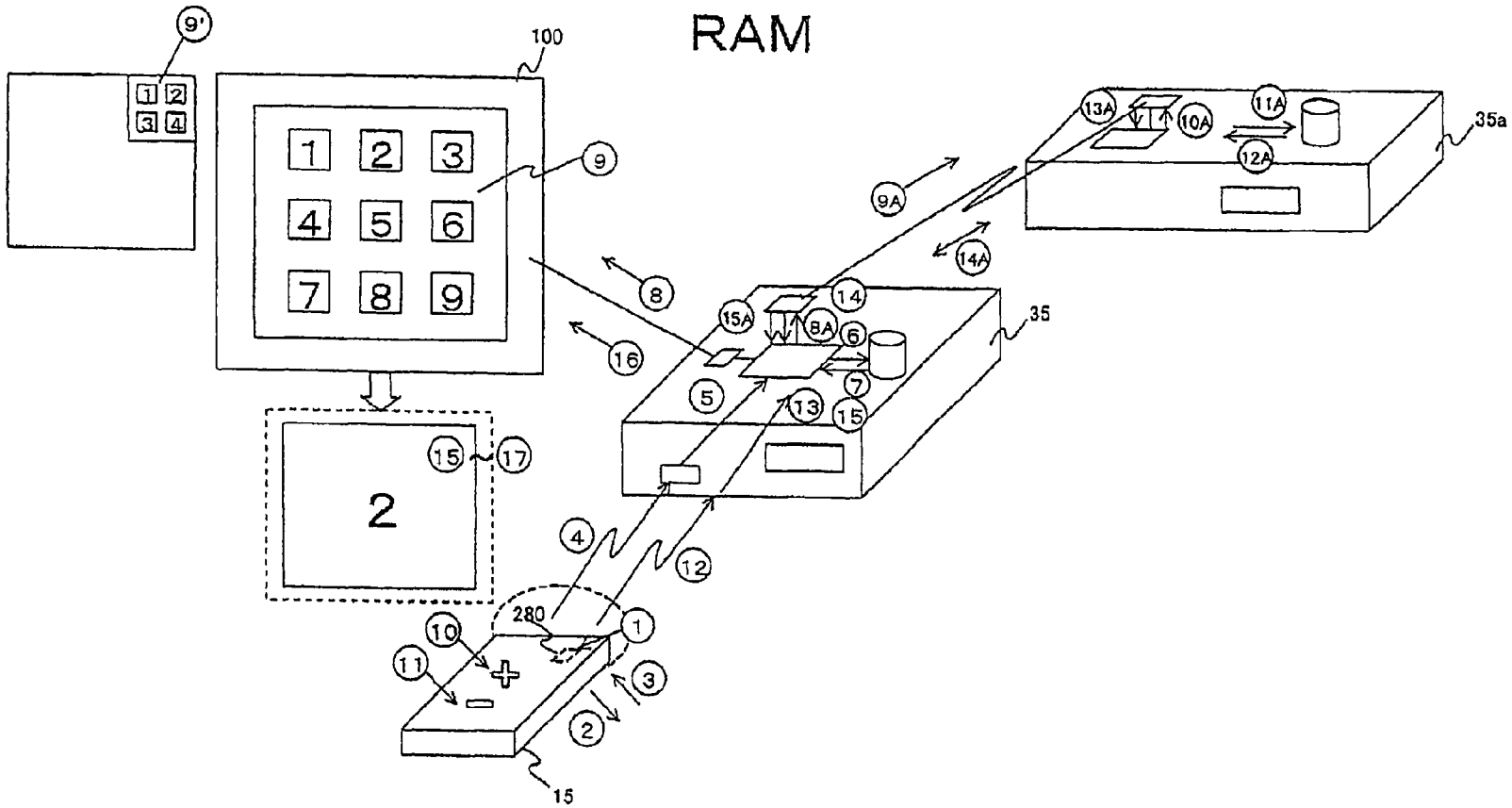
FIG. 52 is a diagram showing a communication flow of a remote control and a recording/reproduction apparatus according to one embodiment of the present invention.

FIG. 50(a) is a top view of the remote control 15. FIG. 50(b) is a side view thereof. The remote control 15 incorporates an antenna 282, an activation switch 280, and a speaker 281. As shown in FIG. 50(b), when the remote control 15 is horizontally placed in a usual manner, the activation switch 280 is not pressed and thus it is not activated. As shown in FIG. 50(d), when the remote control is inclined and pressed against the optical disc 1, as shown in FIGS. 51 and 52, the activation switch is turned on and the RF signal is transmitted and received by the antenna 231 of the optical disc 1, and the IC 230 transmits a response signal including an ID from the antenna 231. The signal is received by the antenna 282 and a confirmation sound is produced from the speaker 281 to notify the operator. After a certain amount of time has elapsed, power supply to the transmission circuit is stopped.

Since the remote control 15 is mounted with a battery of a small capacity, it is necessary to limit an operation of the circuit for transmitting an RF signal as small as possible. The method shown in FIG. 50 provides an effect of reducing power supply consumption and extending the lifetime of the battery of the remote control since the power supply is turned on, the RF signal is transmitted, and the ID is detected for a certain amount of time when the switch 280 is pressed against the disc 1.

(Application to Multi-Layer Disc)

An embodiment in which the present invention is applied to a multi-layer disc will be described.

Figure 53:
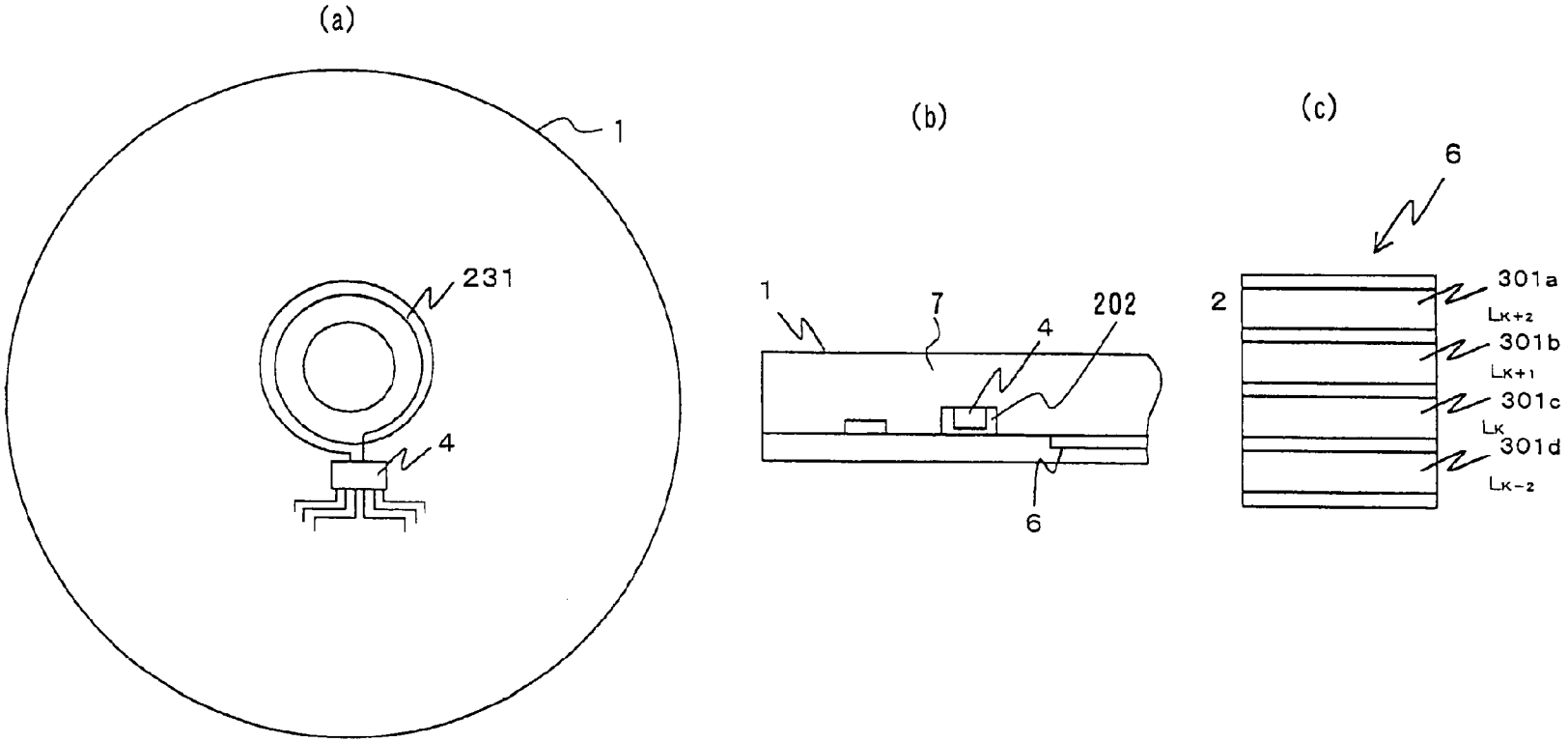
FIG. 53(a) is a top view of a disc according to one embodiment of the present invention.
FIG. 53(b) is a sectional-view of a disc according to one embodiment of the present invention.
FIG. 53(c) is a sectional-view of an information layer of a disc according to one embodiment of the present invention.

FIG. 53(a) is a top view of a disc 1. FIG. 53(b) is a sectional-view of the disc 1. In this example, the disc 1 includes an antenna 231, an IC 4 and an information layer 6. A coil (i.e. antenna 231) having a function of receiving at least one of a radio wave and power is provided in an inner peripheral portion of the disc 1. The IC 4 is embedded into an embedding hole 202 formed in a substrate 7. The information layer 6 includes m number of multi-layer films $L_{k+n}$, etc., shown in FIG. 53(c). The multi-layer films $L_{k+n}$ include recording layers 301a-301d, etc., for recording information.

The antenna 231 is connected to the IC 4. The IC 4 is connected to conducting layers 303a, 303b, 303c, 303d, 303e contained in the information layer 6, respectively via wirings 302a, 302b, 302c, 302d, 302e, etc., shown in FIG. 54(b). Respective conducting layers are provided in a step formation at a connection point between the wirings and the conducting layers in FIG. 54(b).

Each of the conducting layers 303a-303e is provided adjacent to at least a corresponding one of the plurality of recording layers 301a-301d, therefore each recording layer is sandwiched by the conducting layers provided immediately above and immediately below it. The wirings and the films are required to be disposed in a precise angular direction in order to manufacture the optical disc 1. In order to achieve the manufacturing, a high positional precision for the angular direction can be obtained by using an angle identifying recessed portion 220 and an angle identifying protrusion 221 shown in FIG. 30 at the manufacturing step of the present invention. In the case where a particular layer, for example, the recording layer 301a, is put in a state where it is capable of recording/reproduction information, a voltage is applied between the conducting layer 303a and the conducting layer 303b. Then, absorption or reflection of a particular wavelength increases at the material forming the recording layer 301a. At the other layers to which no voltage is applied, the absorption or reflection does not increase with respect to the wavelength λ for a recording light or a reproducing light.

Figure 55:
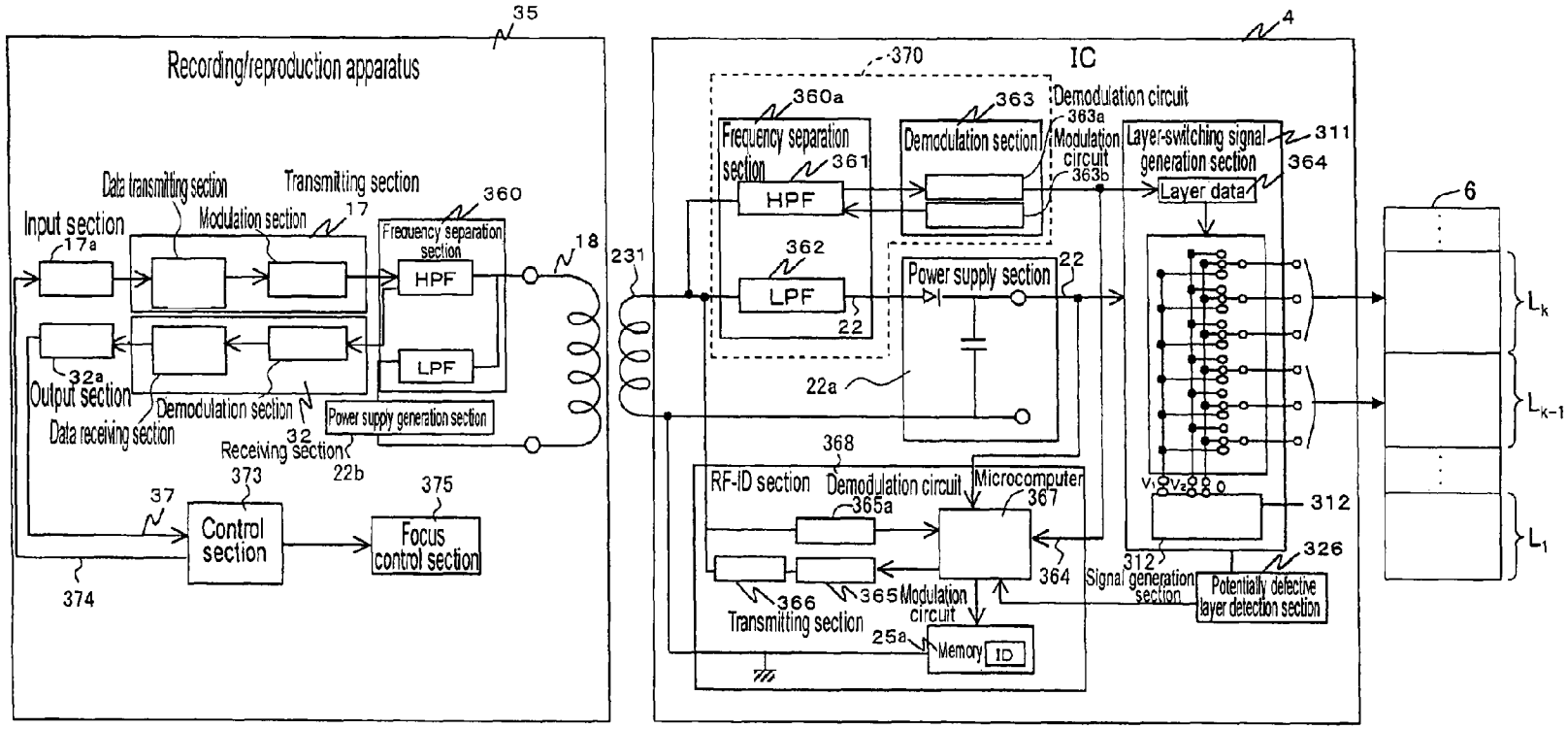
FIG. 55 is a block diagram of an IC embedded into a recording medium and a recording/reproduction apparatus according to one embodiment of the present invention.

FIG. 55 shows the inside of the IC (integrated circuit section) 4 shown in FIG. 53(a). The IC 4 shown in FIG. 55 includes a receiving section 370, a power supply section 22a, a layer-switching signal generation section 311, a potentially defective layer detection section 326 and an RF-ID section 368. The receiving section 370 receives a switching instruction for switching a target layer among the plurality of recording layers. The target layer is targeted for recording or reproducing information. The receiving section 370 receives the switching instruction through radio communication from outside the optical disc (for example, recording/reproduction apparatus 35). The receiving section 370 includes a frequency separation section 360 and a demodulation section 363. The layer-switching signal generation section 311 acts as a switching section for switching a target layer among the plurality of recording layers based on the switching instruction received by the receiving section 370. The layer-switching signal generation section 311 adjusts a voltage (activation signal) applied to each of the plurality of the conducting layers so as to switch the target layer. The demodulation section 363 includes a demodulation circuit 363a and a modulation circuit 363b.

The recording/reproduction apparatus 35 includes a control section 373, a focus control section 375, a transmitting section 17, a receiving section 32, an input section 17a, an output section 32a, a frequency separation section 360, a power supply generation section 22b and an antenna 18. A switching instruction 374 output from the control section 373 is transmitted to the IC 4 via the input section 17a, the transmitting section 17, the frequency separation section 360 and the antenna 18. A communication system between the recording/reproduction apparatus 35 and the IC 4 may be an electrical wavelength communication or may be an optical communication. In the case where the communication is an the optical communication, the recording/reproduction apparatus 35 and the IC 4 respectively include a light emitting section and a light receiving section for the optical communication.

(Method for Switching a Target Layer)

A signal (activation signal) for switching multi-layer films, where m number of films are present, the multi-layer films being applied with a voltage, is supplied to the multi-layer films from the layer-switching signal generation section 311 (FIG. 55). When voltages $+V_1$ and 0V are respectively applied to arbitrary conducting layers, for example, the conducting layer 303c (FIG. 54(a)) and the conducting layer 303d as an activation signal, the voltage $+V_1$ is applied to the recording layer 301c. Instead of direct current, alternating current can be applied to the conducting layers. Also, three activation signals respectively including voltages $V_1$, $V_2$ and 0 are generated at the signal generation section 312, and the voltage $V_1$ can be applied to a particular layer among m number of multi-layer films and the voltages $V_2$ can be applied to each of layers adjacent to the particular layer. Layers contained in the multi-layer films are formed with materials whose optical properties are changed due to electrochromic, electrodeposition or application of electric field by ferroelectric material or etc. Thus, a voltage is applied to a predetermined portion of a particular multi-layer film including a target layer, so that the optical characteristic of only the particular multi-layer film can be changed. For example, optical changes (such as absorption rate, reflectivity, refractive index and Kerr rotating angle) of a particular wavelength for the laser light occur. In a state where no voltage is applied, absorption rate and reflectivity of a particular wavelength for the laser light is set to be lower at layers included in multilayer films. Accordingly, in this example, the laser light reaches the target layer with almost no attenuation, thereby allowing the recording of information on the target layer or the reproducing of information from the target layer in an active state.

In the present embodiment of the present invention, a voltage is applied to the target layer so as to activate the target layer. However, energy for switching between the activation and non-activation for each layer is not limited to power (voltage). For example, optical energy can be used. In this case, each layer is formed with materials which are activated when the optical energy is supplied thereto. In the embodiment of the present invention, a state of a layer on which recording or reproducing information can be performed depending on whether external energy (for example, power (voltage) and light) is applied or not is referred to as an active state. A state of layer on which recording or reproducing information can not be performed regardless of whether external energy is applied or not is referred to as a non-active state. In the present embodiment, at least a portion of the plurality of recording layers is switched between the active state and the non-active state in response whether an activation signal is applied thereto or not.

A method of switching a target layer will be described in further detail as an example when the information layer 6 includes solid electrolytes with reference to FIG. 56.

Figure 56:
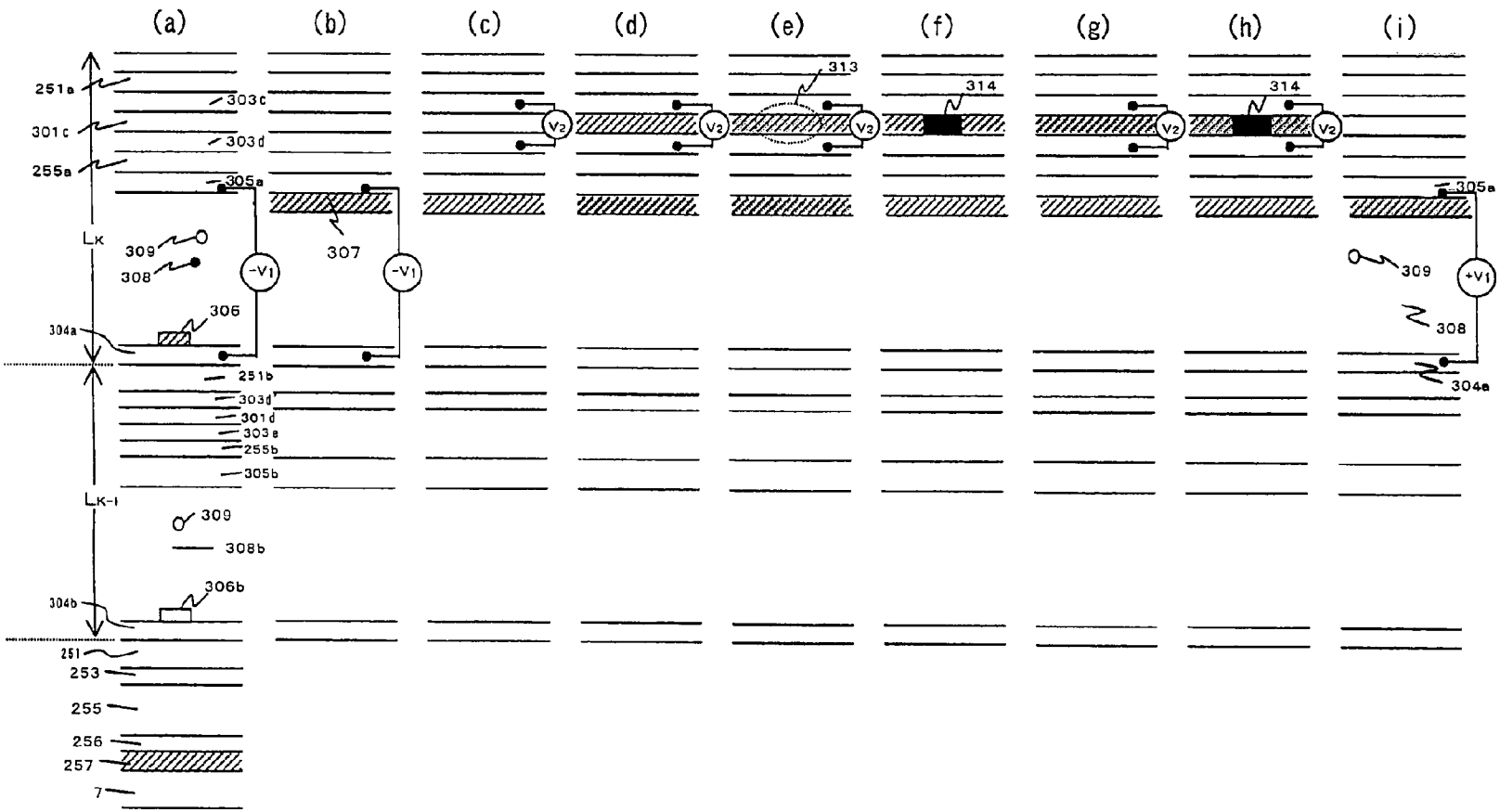
FIG. 56 is a diagram of procedural principle for recording information on a multi-layer disc according to one embodiment of the present invention.

FIG. 56 is a cross sectional-view showing a portion of the information layer 6. FIG. 56(a) shows an initial state of the information layer 6. Hereinafter, a plurality of the multi-layer films are respectively denoted as a layer $L_{K+n}$ ($K+n^{th}$ layer).

A layer $L_K$ ($K^{th}$ layer) which is one of the plurality of the multi-layer films includes, from the top of FIG. 56(a), a dielectric layer 251a, a conducting layer 303c, a recording layer 301c, a conducting layer 303d, a dielectric layer 255a, a conducting layer 305a, a solid electrolyte layer 308, a metal electrode 306 (such as Ag) and a conducting layer 304a. The solid electrolyte layer 308 includes a material (for example, iodine compound containing Ag) containing a metal ion 309 (such as Ag). Similar to the layer $L_K$, a layer $L_{K-1}$ ($K-1^{th}$ layer) includes a dielectric layer 251b, a conducting layer 303d', a recording layer 301d, a conducting layer 303e, a dielectric layer 255b, a conducting layer 305b, a solid electrolyte layer 308b, a metal electrode 306b (such as Ag) and a conducting layer 304b. The multi-layer film right below the layer $L_{K-1}$ shown in FIG. 56 includes a dielectric layer 251, a recording layer 253, another dielectric layer 255, a light absorption layer 256 and a reflection layer 257. The multi-layer films (including the plurality of recording layers) are provided on the substrate 7. Herein, FIG. 56(b) shows a step of forming a reflection layer. FIG. 56(c) shows a step of activating the layer $L_K$. FIG. 56(d) shows a step of applying a voltage to the layer $L_K$. FIG. 56(e) shows a step of recording information on the layer $L_K$. FIG. 56(f) shows a step of reproducing the information from the layer $L_K$. FIG. 56(g) shows a step of deleting a mark formed on the layer $L_K$. FIG. 56(h) shows a step of re-recording the information on the layer $L_K$. FIG. 56(i) shows a state in which a voltage $V_2$ applied to the layer $L_K$ is brought to zero.

In a state of FIG. 56(b), a voltage $-V_1$ is applied between the conducting layer 305a and the conducting layer 304a as an activation signal from the layer-switching signal generation section 311 (FIG. 55) Thus, the metal ion 309 which is of a plus ion is educed as a metal after receiving an electron at the conducting layer 305a which is of negative polarity. As a result, the reflection layer 307 as shown in FIG. 56(b) is formed. The recording layer 301c is formed with a GeSbTe compound shown in FIG. 41. The recording layer 301c is set so as to be put in a low light absorption state (no-activation state) when no activation signal is applied and in a high light absorption state (activation state) when an activation signal is applied. In a state depicted by FIG. 56(b), i.e., in a state where the reflection layer 307 is formed, the thickness and the refractive indexes of the dielectric layers 251a, 255a are adjusted such that the light absorption becomes maximum at the recording layer 301c. Specifically, a Fabry-Perot resonator is formed. In this state, a voltage $V_2$ is applied to the recording layer 301c via the conducting layers 303c, 303d as shown in FIGS. 56(c) and 56(d) so as to activate the recording layer 301c. In this state, when a laser light for recording converges on the reflection layer 307, heat concentrates on the recording layer 301c and a recording mark 314 is formed at the range of a heated portion 313 as shown in FIG. 56(e), so that the information is recorded thereon. Since the recording mark 314 absorbs light, the reproduction can be performed thereon by the laser light for reproduction as shown in FIG. 56(f). Also, the intensity of the laser light is increased as shown in FIGS. 56(g) and 56(h), so that the mark can be deleted, or the re-recording can be performed on the recording mark 314.

Figure 57:
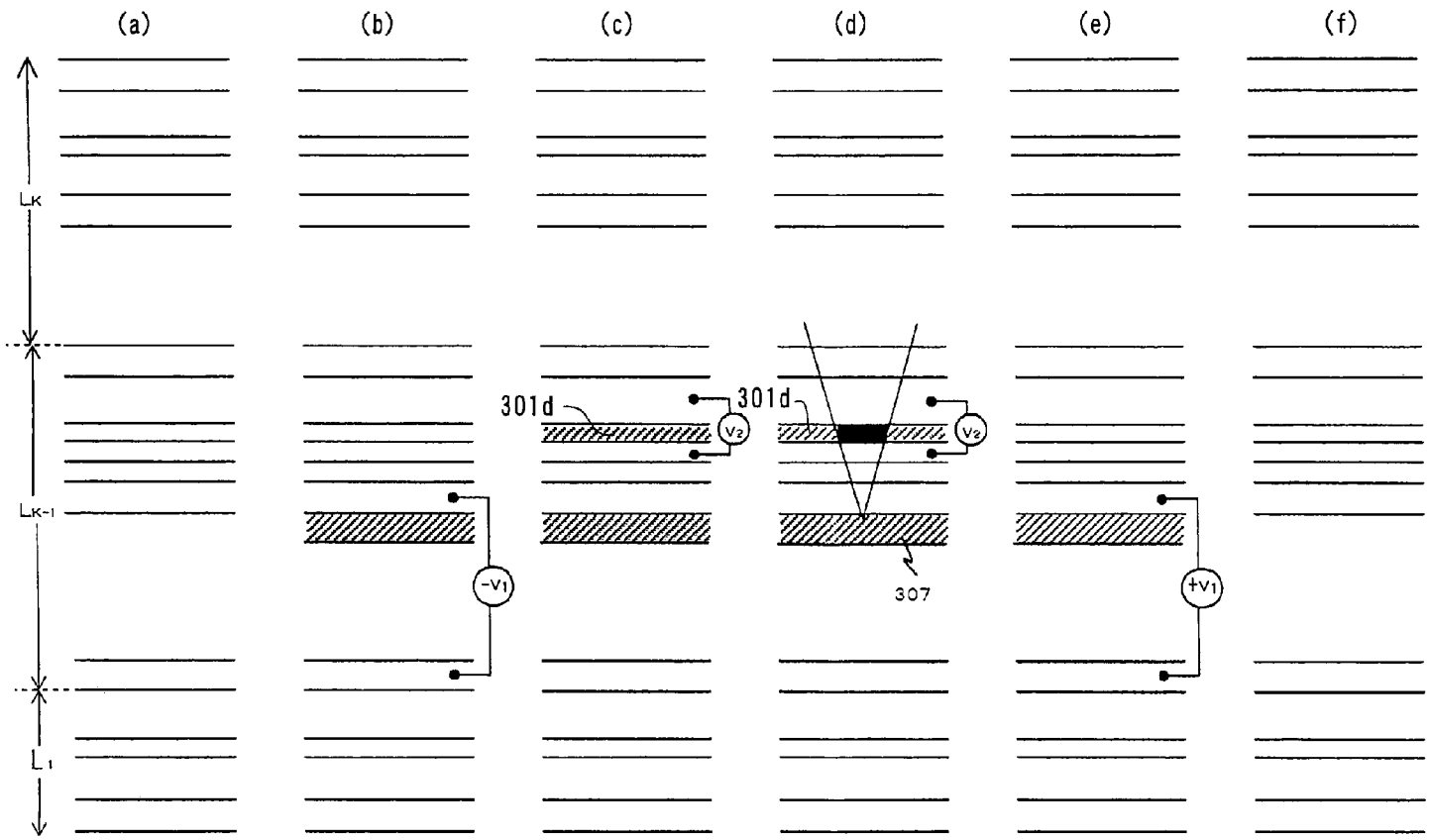
FIG. 57 is a diagram of procedural principle for recording information on a multi-layer disc according to one embodiment of the present invention.

The mark 314 in the layer $L_K$ indicates a strong absorption and the other recording layers indicate a weak absorption. This is because since the Fabry-Perot resonator is formed due to the presence of the reflection layer 307 and the light repeatedly passes through the recording layer 301c, an amount of light absorption by the recording layer 301c is increased. If there is the absence of the reflection layer 307, the amount of the light absorption by the recording layer 301c significantly decreases since the Fabry-Perot resonator is not formed. When an inverse voltage, i.e., a plus voltage $+V_1$ (activation signal) is applied between the conducting layer 305a and the conducting layer 304a as shown in FIG. 56(i), the Ag forming the reflection layer 307 becomes the metal ion 309 (such as Ag++) and dissolves into the solid electrolyte layer 308. Thus, the reflection layer 307 vanishes as shown in FIG. 57(a). Consequently, since there is the absence of the reflection layer 307, the light absorption for a reproduction wavelength λ by the recording layer 301c in a non-active state is reduced. The absorption at the mark 314 is also decreased. Therefore, when information is recorded on the layer $L_{K-1}$ (FIG. 57(d)), the light reaches the layer $L_{K-1}$ with almost no attenuation due to the small amount of absorption of the recording light at the recording layer of the layer $L_K$. Thereby, recording can be performed on a multi-layer. Herein, FIG. 57(a) shows a state in which the layer $L_K$ is deactivated. FIG. 57(b) shows a step of forming a reflection layer in the layer $L_{K-1}$. FIG. 57(c) shows a step of activating a recording layer included in the layer $L_{K-1}$. FIG. 57(d) shows a step of recording information on a recording layer included in the layer $L_{K-1}$. FIG. 57(e) shows a state in which a voltage $V_2$ applied to the layer $L_{K-1}$ is brought to zero and a voltage $+V_1$ is applied to a solid electrolyte layer. FIG. 57(f) shows a state in which the layer $L_{K-1}$ is deactivated.

Figure 58:
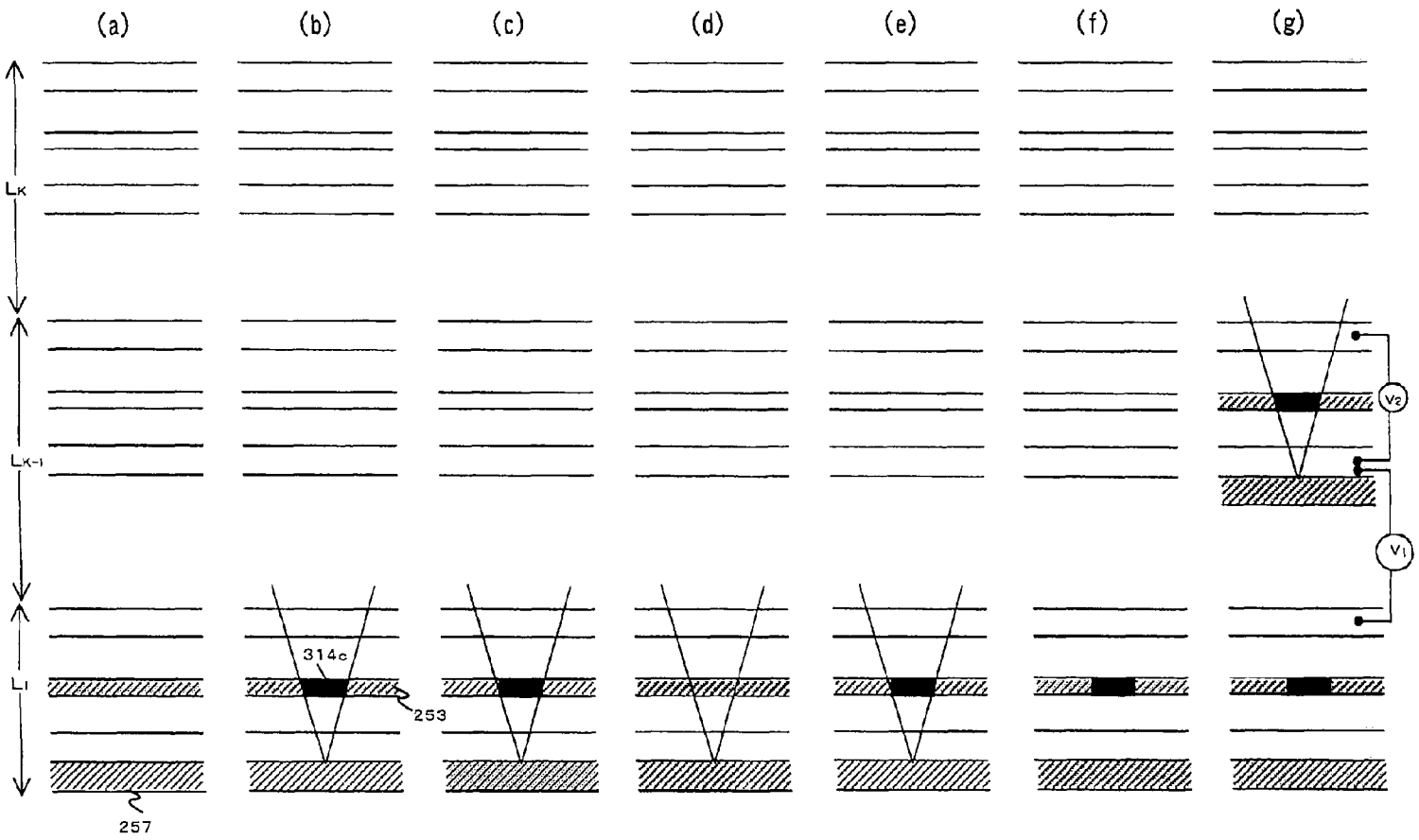
FIG. 58 is a diagram of procedural principle for recording information on a multi-layer disc according to one embodiment of the present invention.

When both the layer $L_K$ and the layer $L_{K-1}$ are deactivated, a significant recording light reaches a first layer $L_1$ of the bottom layer as shown in FIG. 58(a), due to the small amount of light absorption by the layers. Thus, the recording mark 314c is formed on the recording layer 253 included in the first layer $L_1$ as shown in FIG. 58(b). Reproduction, deletion and re-recording can be performed as shown in FIGS. 58(c), 58(d) and 58(e). Herein, FIG. 58(c) shows a step of reproducing information from the first layer $L_1$. FIG. 58(d) shows a step of deleting the recording mark 314c formed on the first layer $L_1$. FIG. 58(e) shows a step of re-recording the information on the first layer $L_1$. FIG. 58(f) shows a state in which the recording mark 314 is formed on the recording layer 253 included in the first layer $L_1$. FIG. 58(g) shows a state in which the layer $L_{K-1}$ is activated from the state shown in FIG. 58(f).

Since the reflection layer 257 included in the first layer $L_1$ is fixed, there is no forming or deleting cycle of the reflection layer as in the case of other layers. Thus, the reflection layer 257 does not deteriorate at all. The number of times that information can be written on the first layer $L_1$ is more than one million times similar to a normal RAM disc. Therefore, if the first layer $L_1$ is set as a reference layer, and frequently rewritten data such as FAT data file and management information for data address structure information for each layer is recorded on the first layer $L_1$, the number times information can be rewritten on the optical disc can be substantially increased.

When the reflection layer 307 vanishes by removing the solid electrolyte layer 308, the recording layers included in the layer $L_K$ and the layer $L_{K-1}$, etc., are formed with an electrochromic material so as to be a mark destroying type of write-once recording layer. In this case, the FAT information is required to be re-written for each additional recording. If only the first layer is a writable layer, a disc combining a plurality of write-once (W/O) layers with one layer of a rewritable layer is achieved. In this case, when the FAT, the data structure, recorded-area and unrecorded-area information, etc., are recorded on the first layer, there is an effect that wasteful consumption of recording capacity by recording additional management information together with a change of data such as the FAT the W/O layer can be reduced.

The recording layer 301c in FIG. 56 is realized by using a material, having a low light absorption rate of 0.5 to 1 b, which contains a ternary compound of Te. This is because when the layer $L_K$ is activated (effected) by forming a reflection layer, absorption rate equivalently increases since the λ repeatedly passes through the absorption layer due to the formation of a Fabry-Perot resonator with the reflection layer 307.

(Light Absorption due to a Change of Light Absorption Edge)

The recording layers 301a-301d are formed with materials having changeable electrooptical properties of which band gaps and light absorption edges respectively change due to application of voltage. In this case, the recording layer is set so as to not absorb the recording light with the wavelength λ when no voltage is applied thereto and absorb the recording light with the wavelength λ when a voltage is applied thereto due to a change of a light absorption edge. Alternatively, the wavelength λ is adjusted depending on the characteristic of the recording layer. When a recording light with the wavelength λ is used, the light is not absorbed when the voltage $V_2$ is not applied to the recording layer 301c as shown in FIGS. 56(a) and (b). When the voltage $V_2$ is applied to the recording layer 301c as shown in FIG. 56(d), the bandgap, etc., for the material forming the recording layer 301c changes. As a result, the absorption edge changes (i.e., the recording layer 301 is activated). The laser light for the recording/reproduction has a wavelength λ within a wavelength bandwidth, this wavelength λ corresponding to the absorption edge being changed. Since the activated recording layer 301c indicates an absorption characteristic with respect to the laser light for the recording/reproduction, light energy is absorbed by the recording layer 301c, and as a result, a mark 314 is formed due to damage, color change or phase change when a laser light is irradiated as shown in FIG. 56(e). The information is reproduced by irradiating a laser light for reproduction on the mark. When application of the voltage $V_2$ is stopped, the absorption edge of the recording layer 301c returns to the original state. Thus, the recording layer 301c does not absorb the light with the wavelength λ (a state of the recording layer 301c in FIG. 56(i)). In this state, recording/reproduction can be performed on other recording layers. Therefore, when a system of changing the absorption edge is used, recording/reproduction can be performed on the multi-layer without the reflection layer 307 shown in FIG. 56.

Figure 59:
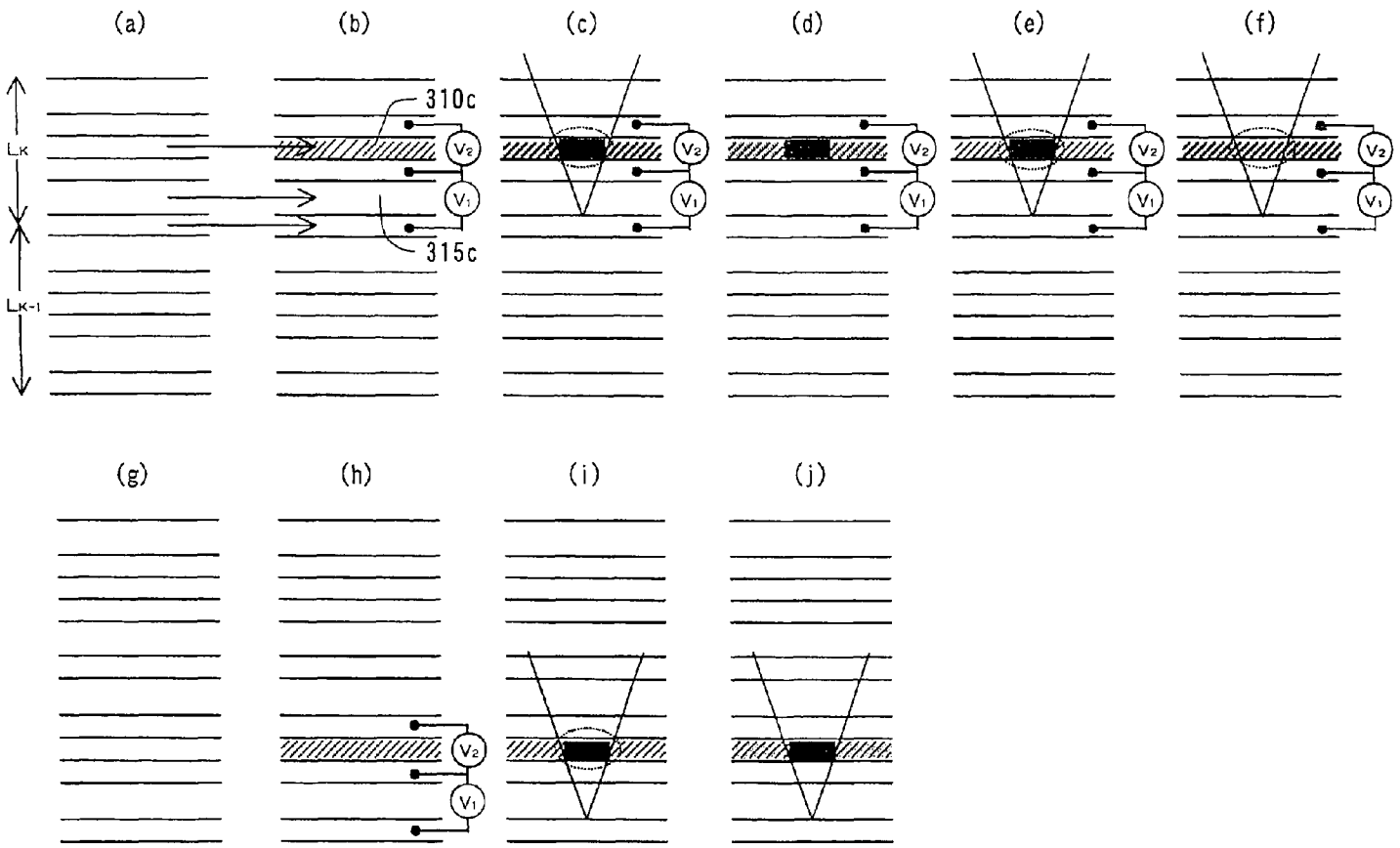
FIG. 59 is a diagram of procedural principle for recording information on a multi-layer disc according to one embodiment of the present invention.

An example where a multi-layer film includes a layer having changeable optical properties will be described with reference to FIG. 59. As shown in FIG. 59(b), a voltage $V_1$ is applied to the layer having changeable optical properties 315c to change a refractive index, so that reflection at the interface between the layer having changeable optical properties 315c and a recording layer 310c is increased. Also, a voltage $V_2$ is applied to the recording layer 310c to change the light absorption edge of the recording layer 310c, so that the light absorption by the recording layer 310c is increased. Thus, information can be recorded on the recording layer 310c as shown in FIG. 59(c). Liquid crystal, $LiNbO_3$, barium titanate, etc., can be used as a material having changeable optical properties. Herein, FIG. 59(a) shows an initial state of a layer $L_K$. FIG. 59(d) shows a state of the recording layer 310c on which a recording mark is formed. FIG. 59(e) shows a step of reproducing information from the recording layer 310c. FIG. 59(f) shows a step of deleting the recording mark. FIG. 59(g) shows a state in which the layer $L_K$ is deactivated. FIG. 59(h) shows a step of activating the layer $L_{K-1}$. FIG. 59(i) shows a step of recording the information on the layer $L_{K-1}$. FIG. 59(j) shows a step of reproducing the information from the layer $L_{K-1}$.

Figure 60:
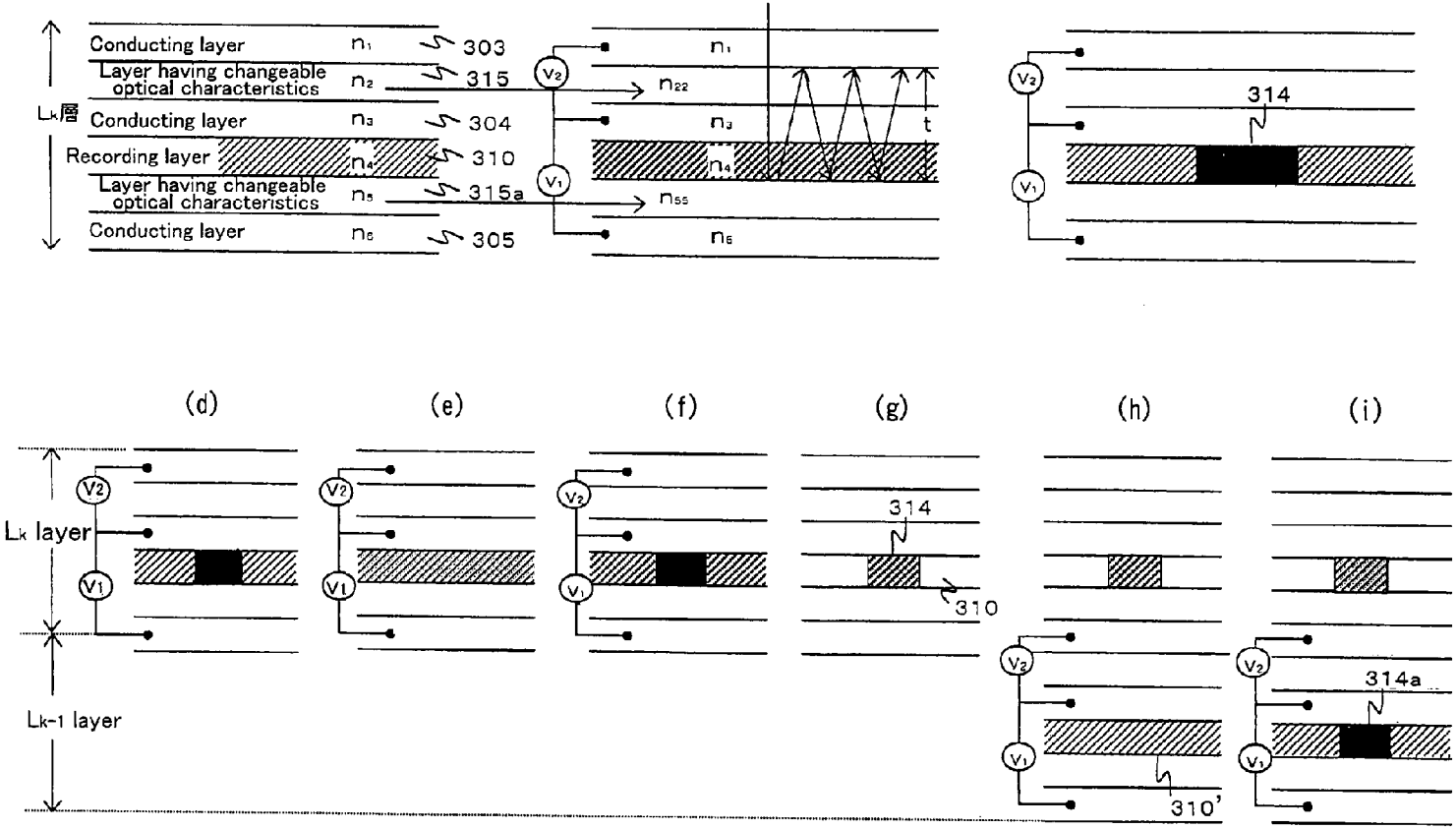
FIG. 60 is a diagram of procedural principle for recording information on a multi-layer disc according to one embodiment of the present invention.

An example where a multi-layer film includes a layer having changeable optical properties will be described in further detail with reference to FIG. 60. A layer $L_K$ shown in FIG. 60 includes a conducting layer 303, a layer having changeable optical properties 315, a conducting layer 304, a recording layer 310, a layer having changeable optical properties 315a and a conducting layer 305. The layers have refractive indexes $n_1$ to $n_6$ respectively. The layer having changeable optical properties 315 is formed with a material such as lithium niobate whose optical properties (i.e., refractive index, absorption edge and reflection) is changed when a voltage is applied thereto. FIG. 60(a) shows an initial state of the layer $L_K$.

When the voltage $V_1$ is applied to the recording layer 310 and the layer having changeable optical properties 315a and the voltage $V_2$ is applied to the layer having changeable optical properties 315, the refractive indexes of the layer having changeable optical properties 315 and the layer having changeable optical properties 315a are changed from $n_2$ and $n_5$ to $n_{22}$ and $n_{55}$, respectively, as shown in FIG. 60(b) (the layer $L_K$ is activated). Therefore, light reflection increases in at least two locations between the conducting layer 303 and the layer having changeable optical properties 315 and the recording layer 310 and the layer having changeable optical properties 315a. When the distance between two reflecting surfaces and the wavelength of the light source are respectively denoted as t and λ, an optical resonator, i.e. Fabry-Perot resonator, is formed between the two reflecting surfaces by multiplying the t with an even number of λ/4. Thus, the light repeatedly passes through the recording layer 310, so that absorption rate equivalently increases. In this manner, a mark 314 is recorded on the recording layer 310 as shown in FIG. 60(c).

Information can be reproduced as shown in FIG. 60(d). The recording mark can be deleted when a large light energy is applied to the recording layer as shown in FIG. 60(e). Information can be rewritten as shown in FIG. 60(f). When application of voltage is stopped, the Fabry-Perot resonator of the layer $L_K$ vanishes as shown in FIG. 60(g), and as a result, an effect of increasing the absorption rate disappears. Therefore, the light absorption rate by the recording layer 310 returns to the original low state (non-active state), and the light absorption at the mark 314 is decreased. As a result, when information is recorded on other recording layers deeper than the recording layer 310, the light attenuation due to light absorption by the recording layer 310 decreases. A voltage is applied to the layer $L_{K-1}$ in FIG. 60(h) (activation of the layer $L_{K-1}$), so that light absorption by a recording layer 310' is substantially increased so as to form a mark 314a on the layer $L_{K-1}$ as shown in FIG. 60(i).

(Hybrid Disc with a Combination of One-Layer (or Two-Layer) Region and a Multi-Layer Region)

Figure 62:
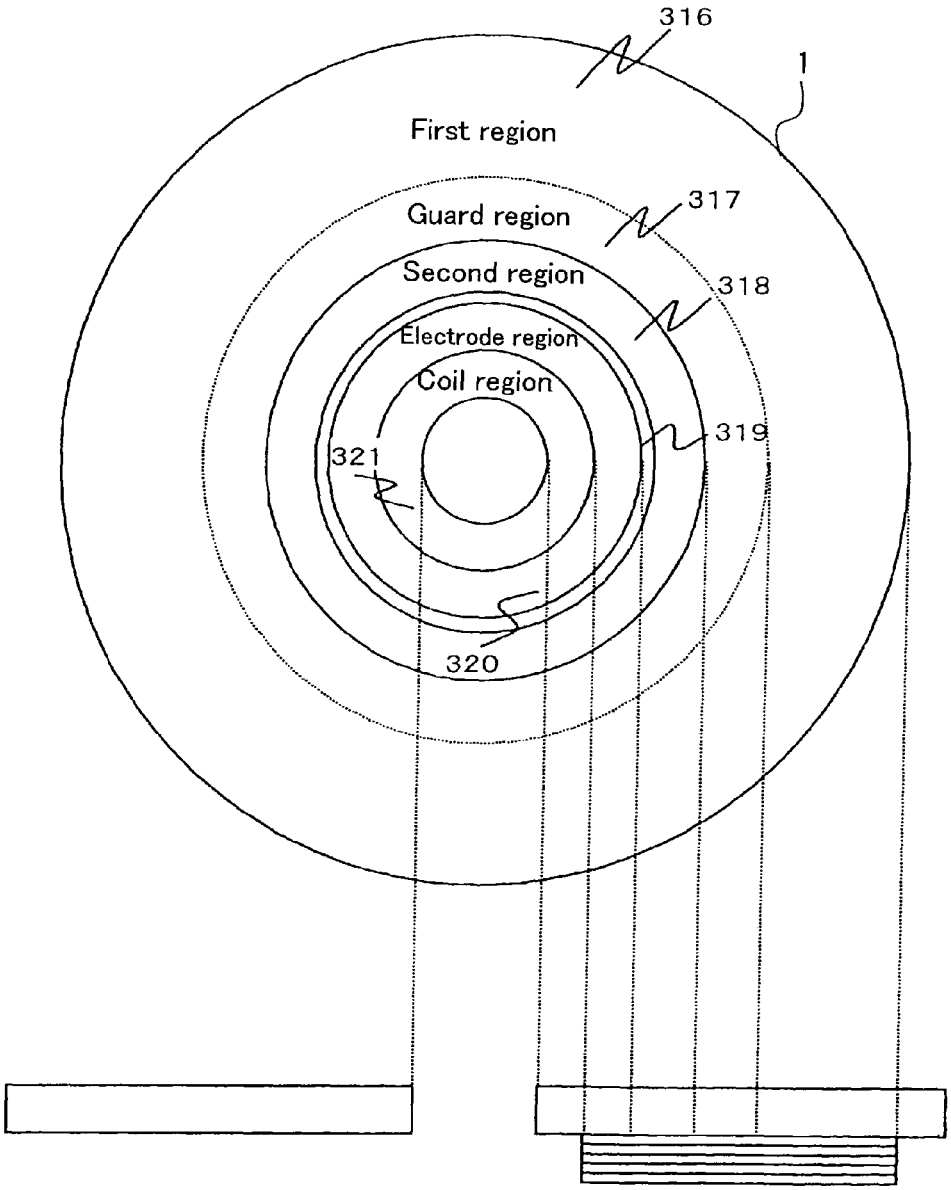
FIG. 62 is a top view of a multi-disc according to one embodiment of the present invention.
Figure 64:
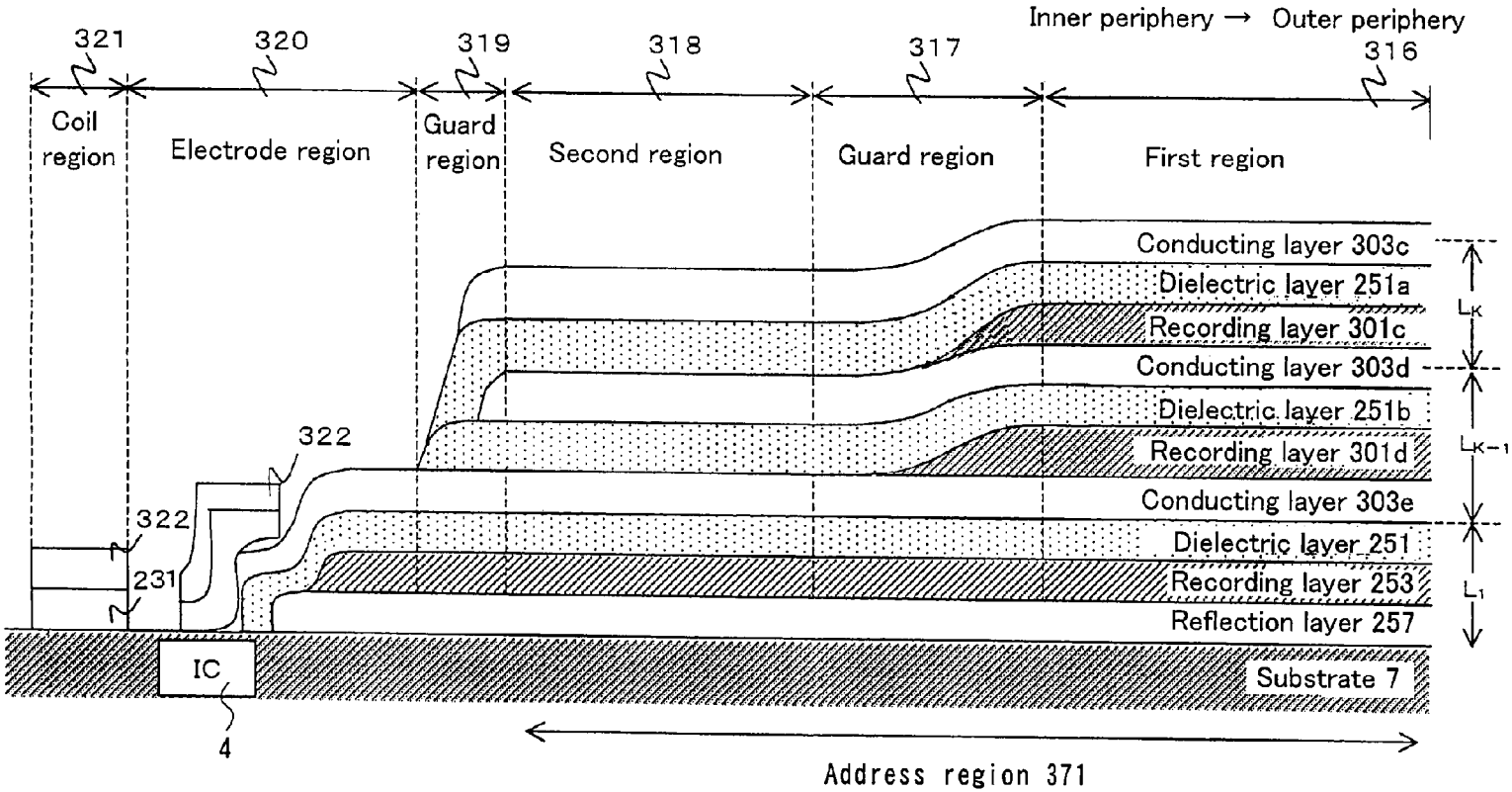
FIG. 64 is a cross sectional-view of a multi-disc according to one embodiment of the present invention.

An optical disc 1 shown in FIG. 62 is a hybrid disc and includes a first region 316, a guard region 317, a second region 318, a guard region 319, an electrode region 320 and a coil region 321. FIG. 64 is a sectional-view of the optical disc 1 shown in FIG. 62. A multi-layer film is formed on the first region 316 (i.e., a plurality of recording layers are formed). Only one recording layer is provided on the second region 318 which sandwiches the guard region 317 with the first region 316. The first region 316, the guard region 317 and the second region 318 are included in an address region 371. Electroplatings 322 are formed on a wiring and an antenna 231 extending from an IC 4.

Figure 61:
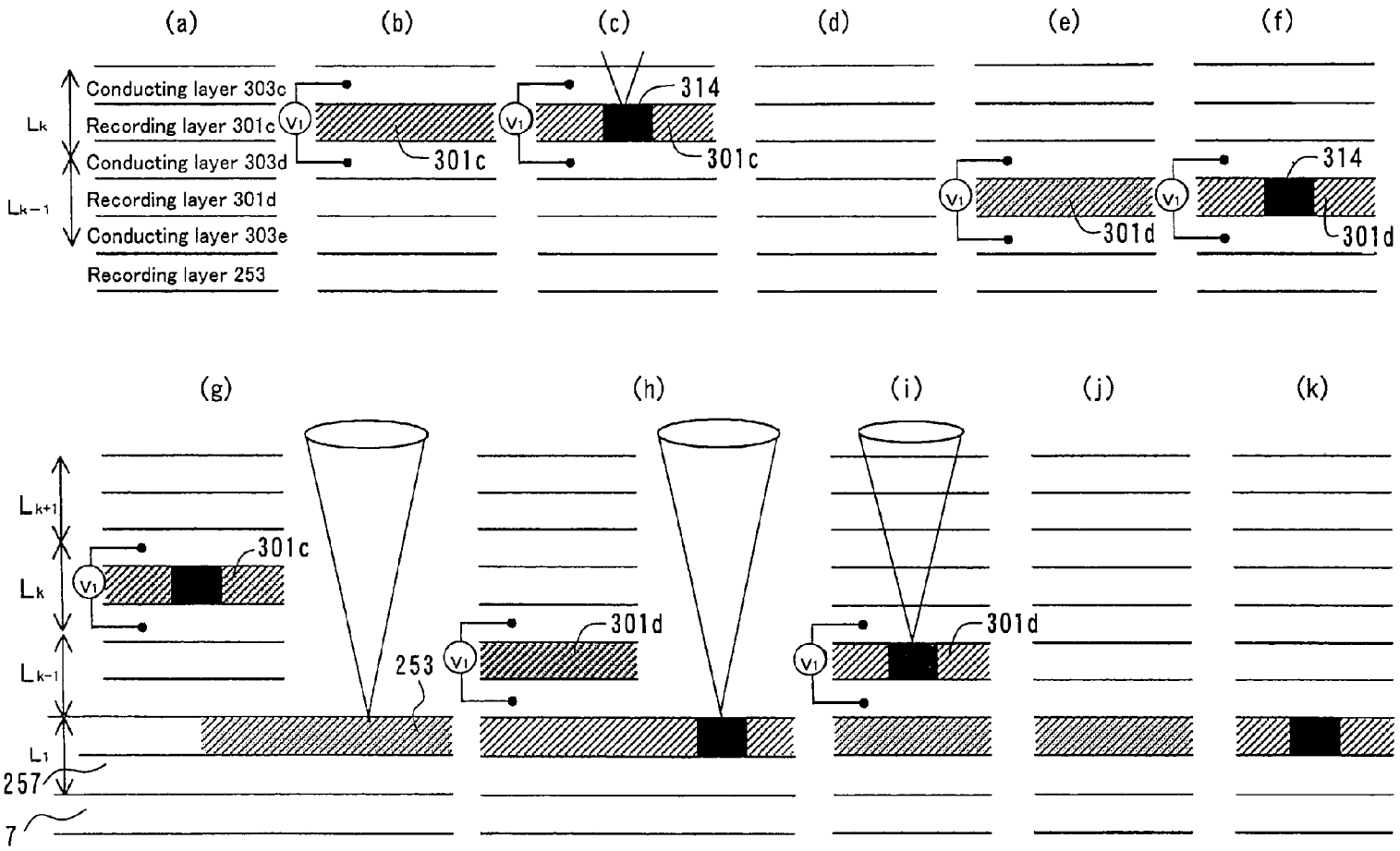
FIG. 61 is a diagram of procedural principle for recording information on a multi-layer disc according to one embodiment of the present invention.

A method of recording/reproduction information on/from a hybrid disc is described with reference to FIG. 61. FIG. 61 shows a sectional-view of parts of important constituents of the optical disc 1 shown in FIG. 62.

The layer $L_K$ shown in FIG. 61 includes a conducting layer 303c, a conducting layer 303d, etc. A recording layer 301c contains an electrochromic material and the like which cause an optical change when a voltage is applied thereto. The recording layer 301c is activated from the initial state shown in FIG. 61(a) when a voltage $V_1$ is applied to the recording layer 301c as shown in FIG. 61(b). In the case where an electrochromic material is contained in the recording layer 301c, the color of the recording layer 301c changes to blue, etc., due to oxidation or reduction of the material. In this manner, the recording light can be focused the layer $L_K$ since only the optical properties (such as light absorption and reflection) of the layer $L_K$ are changed. When the light output is increased, a recording mark 314 is formed on the recording layer 301c, and thus information can be recorded thereon as shown in FIG. 61(c). When the voltage applied to the recording layer 301c is brought to zero, or a voltage in a reverse direction is applied, reverse reaction is generated. Thus, the optical change vanishes. As a result, the layer $L_K$ can be deactivated as shown in FIG. 61(d). A recording layer 301d included in the layer $L_{K-1}$ as shown in FIG. 61(e) is activated in the same manner as the layer $L_K$ is, so that the recording mark 314 is formed on the recording layer 301d so as to record information thereon as shown in FIG. 61(f).

In the case where data is recorded on the recording mark 314, it is required to update file management information such as FAT or VAT. A hybrid disc with a combination of a multi-layer and one-layer according to the present invention shown in FIGS. 62 and 64 or FIGS. 65 and 66 (later described) has only one layer of the recording layer at the second region 318 of the inner peripheral portion or the outer peripheral portion as shown in FIG. 61(g). Thus, a laser light can sufficiently reach the recording layer from the surface of the optical disc without switching operation (such as application of voltage to the recording layer), this recording layer being provided on the second region.

As a system of electrically switching a target layer (activation layer), it is considered that an electrochromic material or an electrodeposition material known as a display material, or liquid crystal material, etc., is used. In the case of this system, several hundreds of milliseconds are required for switching a target layer. Also during the switching operation of a target layer, the reflection rates and absorption rates of the target layer become unstable, thereby resulting in the instability of focusing. Therefore, there is a possibility that the optical head can collide with the opposing surface of the optical disc and receive damage. In the case of the present invention, the optical head is positioned such that light is focused on a first layer of the second region during the switching operation of a target layer. Thereby, damage to the optical head can be prevented.

FIG. 61(g) shows an operation of recording file management information (such as FAT, TOC and VAT), a thumbnail, a starting information, etc., on a region located at the second region 318 among the recording layer 253 included in the first layer $L_1$. In the example shown in FIG. 61(g), the recording layer 301c is activated. However, there is the absence of any recording layer 301c above the recording layer 253. Thus, the laser light incident upon the recording layer 253 is not attenuated due to the absence of any recording layer 301c. FIG. 61(h) shows a step of switching a target layer from the recording layer 301c to a recording layer 301d while the optical head is accessing (e.g., recording of FAT, TOC, VAT or thumbnail) the recording layer 253. FIG. 61(i) shows a step of recording data on the recording layer 301d. FIG. 61(j) shows a state in which the recording layer 301d is deactivated. Data can be recorded on a region located at the first region 316 among the recording layer 253 as shown in FIG. 61(k). In this example, the region located at the second region 318 of the recording layer 253 acts as a reference layer for recording property information, for example, file management information (FAT, TOC, VAT, etc.), thumbnail, a starting information, etc. The property information indicates properties of the optical disc 1. It is preferable as a reference layer, for which a region (reference-layer region) is activated when no voltage (activation signal) is applied thereto. When the optical disc 1 is mounted on the recording/reproduction apparatus, an optical pickup of the recording/reproduction apparatus first tries to reproduce the property information of the optical disc 1. Prior to the reproduction of the property information, the recording/reproduction apparatus can not determine the configuration of the optical disc 1. If the reference-layer region is deactivated in this state, the recording/reproduction apparatus can not determine whether or not it is required to activate the recording layer of the mounted optical disc 1 with the application of voltage, or which layer should be activated so as to read the property information. If the reference-layer region is activated in a state where no voltage is applied thereto, the recording/reproduction apparatus can determine where the reference layer-region is located at the time of mounting the optical disc 1, and thus can read the property information.

The reference-layer region can be always activated regardless of application of voltage thereto. In this case, the reference-layer region is, for example, formed with amorphous materials. FIG. 55 shows a connection between a switching signal generation section 311 and an information layer 6 in the case where the first layer $L_1$ is the reference-layer region. If the reference-layer region is always activated regardless of application of voltage thereto, there is no need to apply an activation signal to the first layer $L_1$ from the switching signal generation section 311.

A reference-layer region can be formed with a material which is activated when no voltage is applied thereto and which is deactivated when a voltage is applied thereto. In this case, a voltage is applied to the reference-layer region from the switching signal generation section 311 as necessary. Even in an optical disc in which a reference-layer region overlaps other recording layers, the reference-layer region is deactivated when the other recording layers are accessed. Thereby, attenuation of a laser light to the other recording layers due to the reference-layer region does not occur.

(Configuration of a Hybrid Disc)

Figure 63:
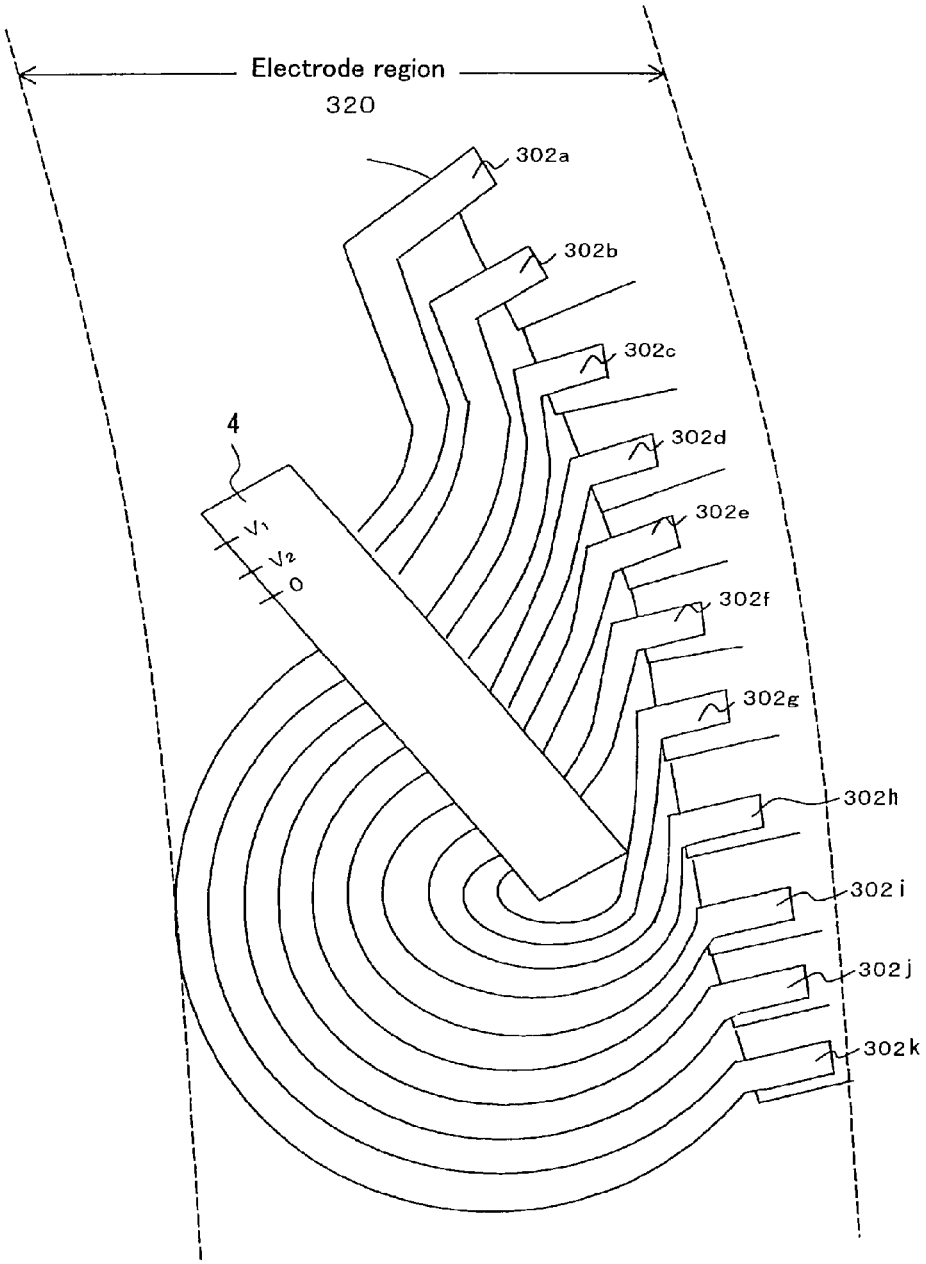
FIG. 63 is a top view of an electrode region of a multi-disc according to one embodiment of the present invention.

A guard region 317 is provided between a first recording region 316 and a second recording region 318 in an optical disc in FIG. 64. A recording layer of this guard region 317 gradually disappears toward the inner periphery of the optical disc. Since there is the absence of any plurality of recording layers in the second recording region 318, reading and writing can be performed on the recording layer 253 without an operation of switching a target layer. There is presence of m number of conducting layers in a step formation in an electrode region 320 as shown in FIG. 63. Each of the conducting layers is connected to one end of wirings 302a-302k and the other end of each wiring is connected to a layer-switching signal generation section 311 included inside the IC 4. With such a configuration, the voltages $V_1$, $V_2$, etc., (activation signals) output from the layer-switching signal generation section 311 are applied to respective conducting layers.

Figure 65:
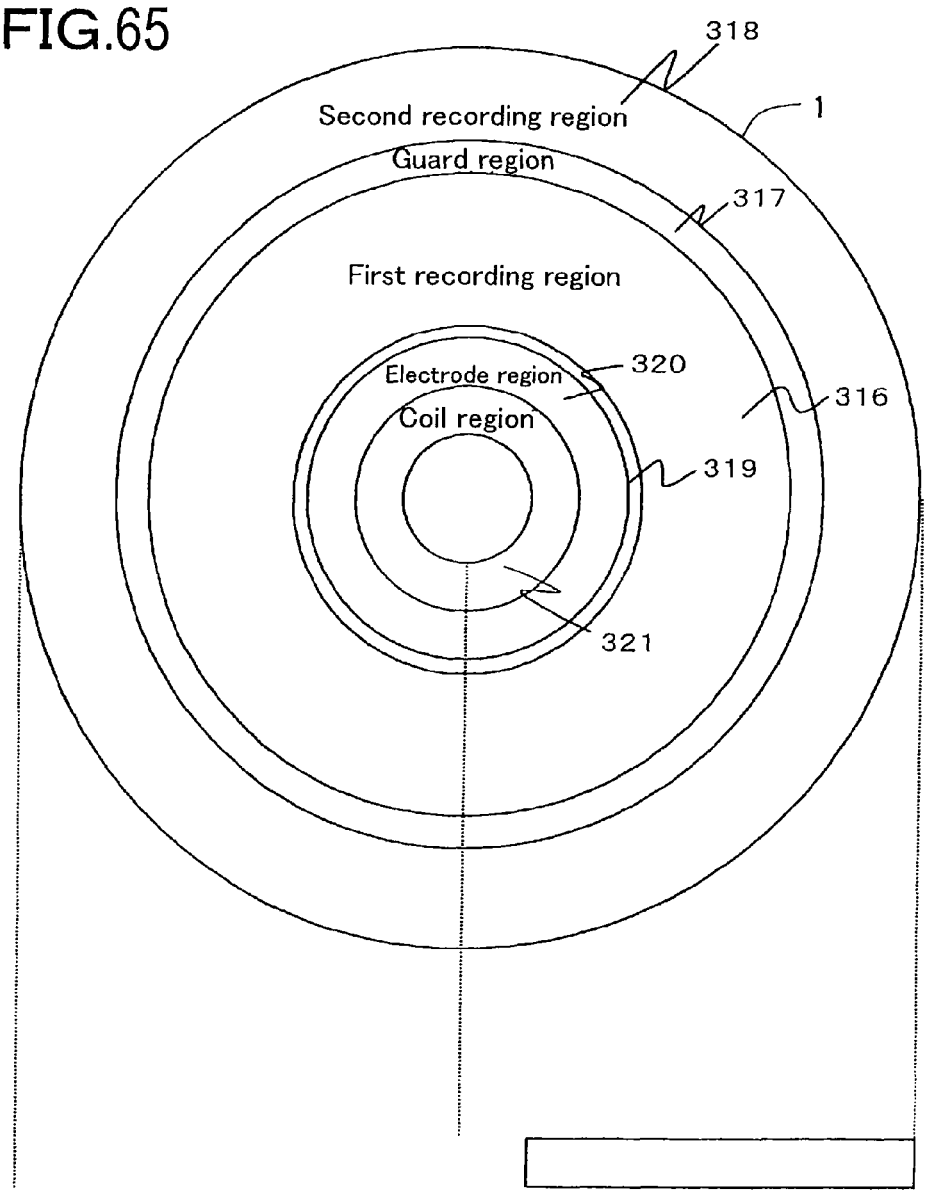
FIG. 65 is a top view of a disc according to one embodiment of the present invention.
Figure 66:
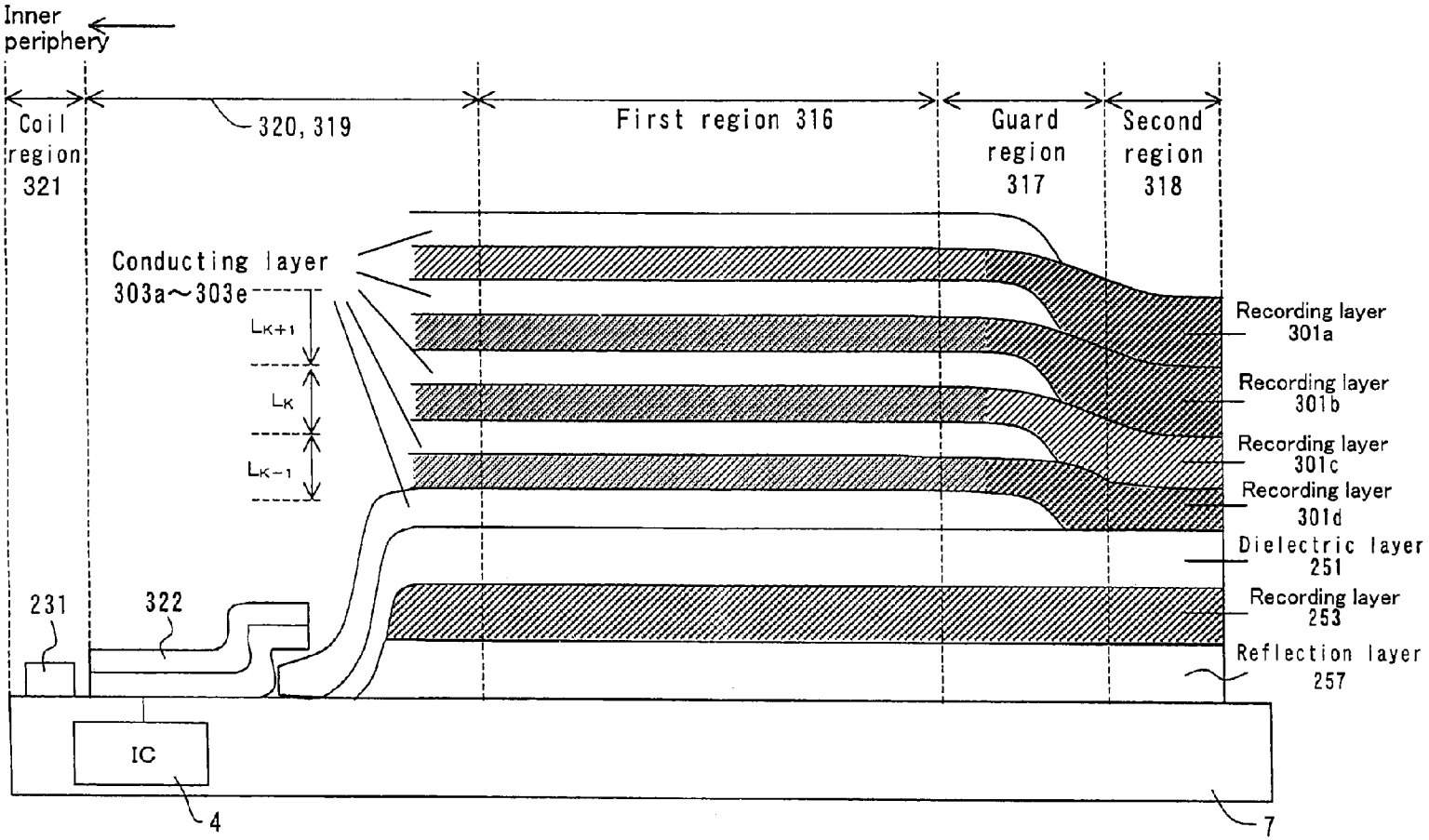
FIG. 66 is a cross sectional-view of a disc according to one embodiment of the present invention.

In an optical disc 1 shown in FIG. 65, a second recording region 318 is provided at an outer peripheral portion, which is different from FIG. 62 where the second recording layer 318 sandwiches the guard region 317 with the first recording region 316. In this case, the probability of short-circuit is decreased since there is the absence of any conducting layers 303a-303e in the second region 318 as shown in FIG. 66. There is presence of a plurality of recording layers in the second region 318 in the optical disc 1 shown in FIG. 66. However, regions located at the second region 318 of the recording layers 301a-301d are not adjacent to any conducting layers. Thus, since no voltage is applied thereto, a laser light to be irradiated onto the recording layer 253 is barely attenuated.

Figure 67:
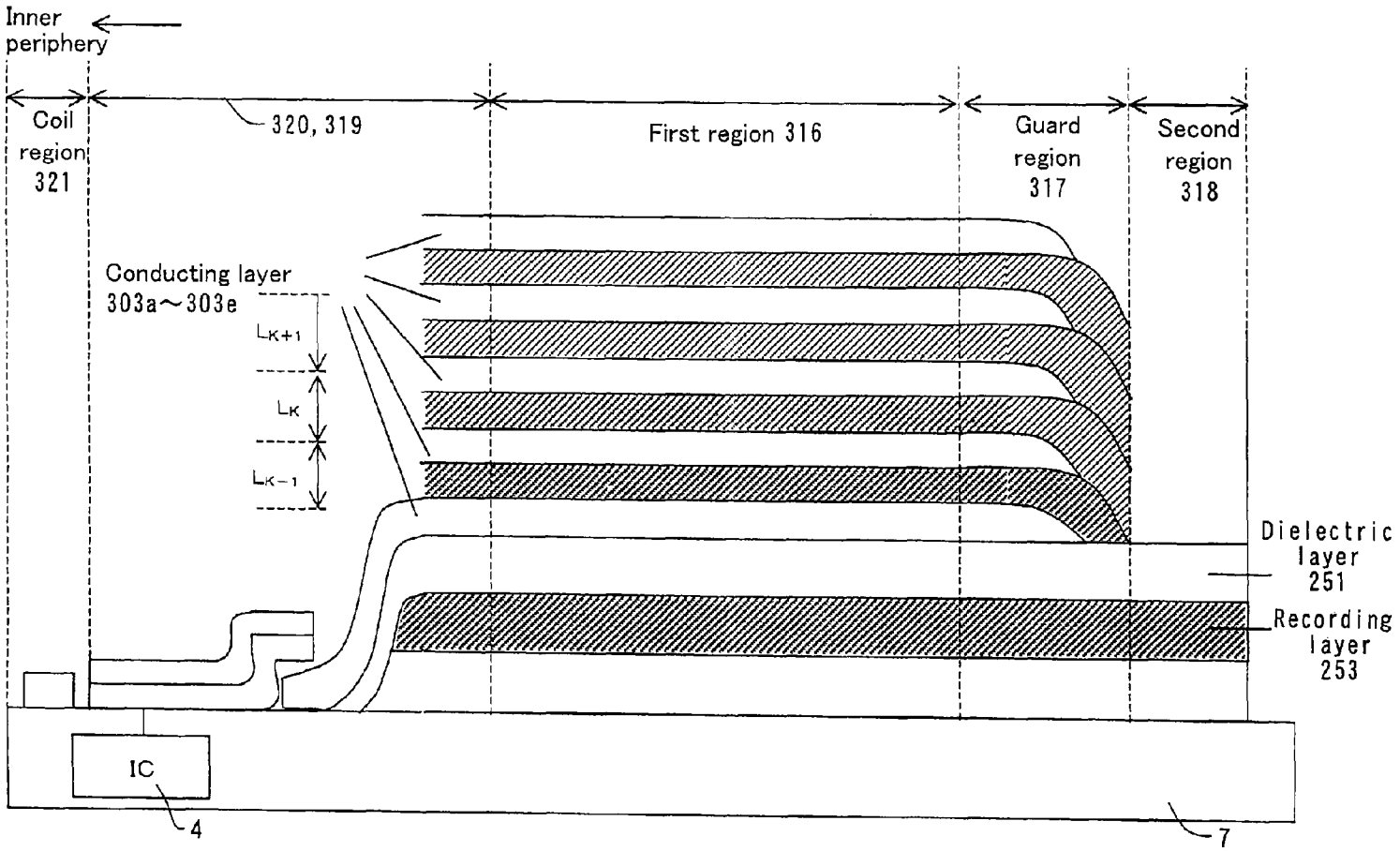
FIG. 67 is a cross sectional-view of a disc according to one embodiment of the present invention.

A recording layer located at the second region 318 of the outer peripheral portion can be only one layer as shown in FIG. 67. In this case, there is the absence of any multi-layer film above the recording layer 253. Thus, a laser light is not attenuated. Thereby, recording and reproduction can be performed on the second region with a weak laser power.

A description of an embodiment in which the second region 318 has a single recording layer is given. However, a second layer is a semi-transparent film (which is the same as the second layer of a two-layer optical disc) and is formed with almost same material as the first layer, so that two RAM layers (recording layers of the second region 318) are formed. In this case, a recording capacity for the second region is increased to about twice as much without reducing the number of times that rewriting is possible.

Figure 68:
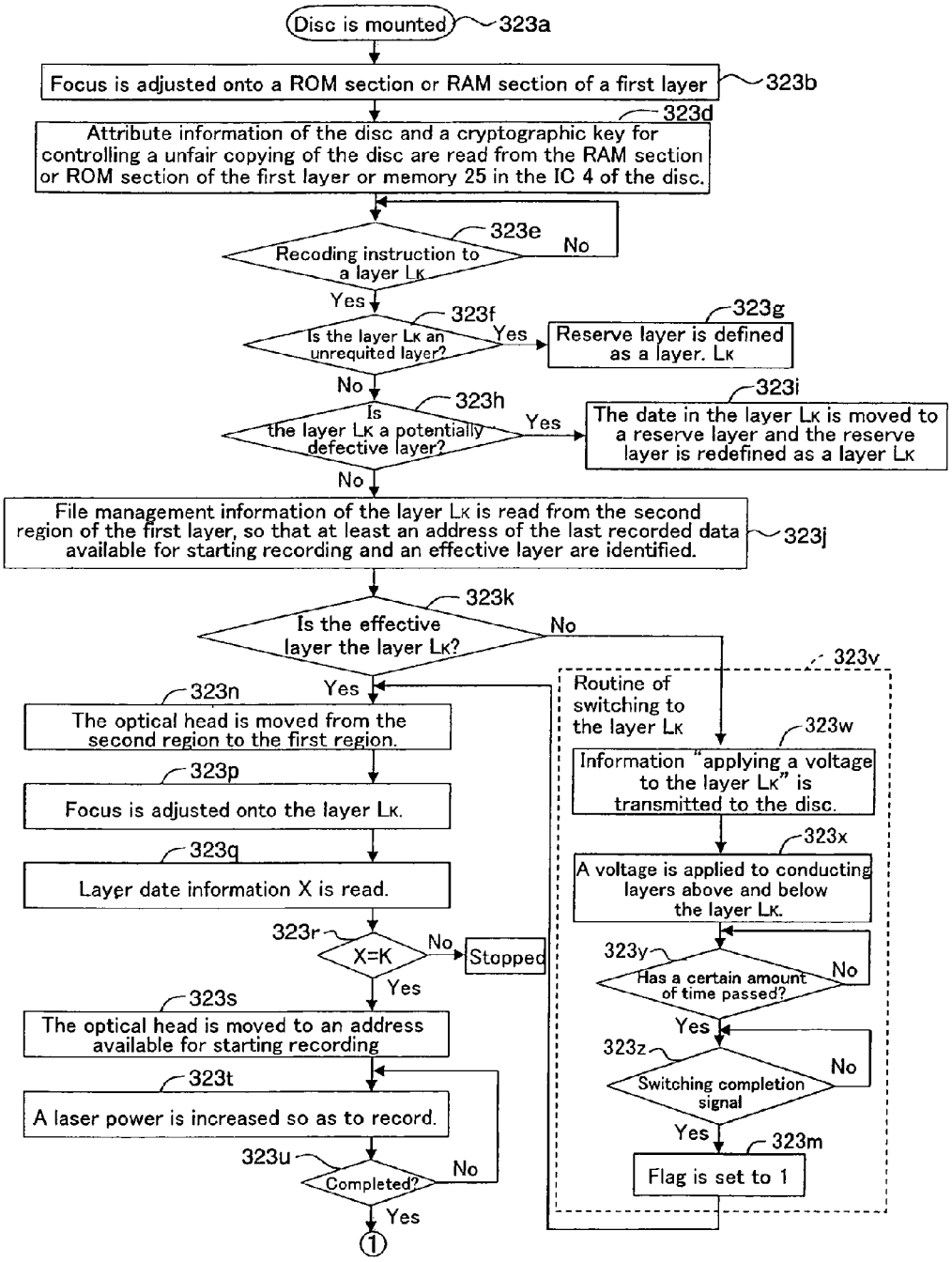
FIG. 68 is a flow chart showing recording/reproduction of a disc according to one embodiment of the present invention.
Figure 69:
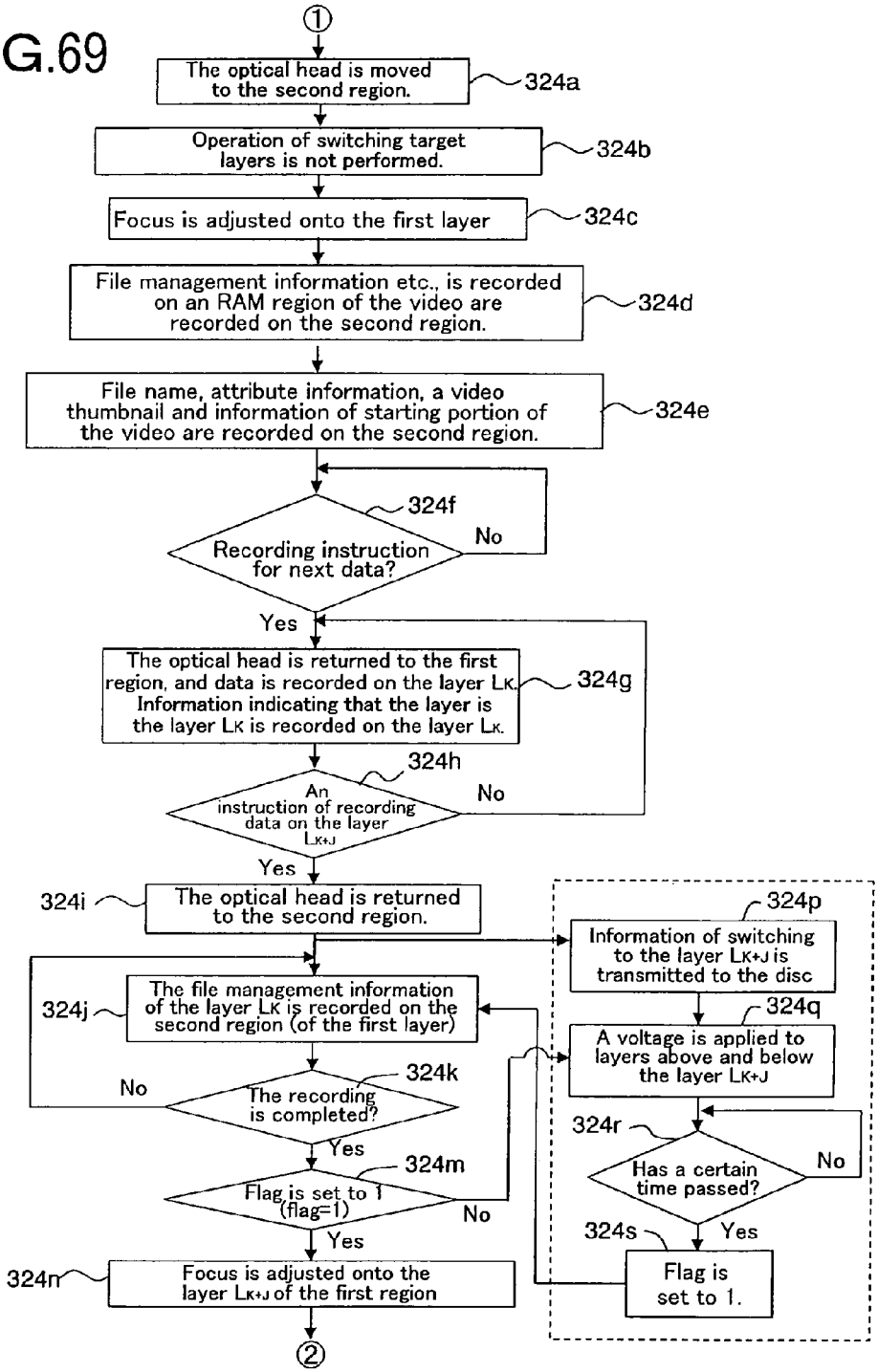
FIG. 69 is a flow chart showing recording/reproduction of a disc according to one embodiment of the present invention.
Figure 70:
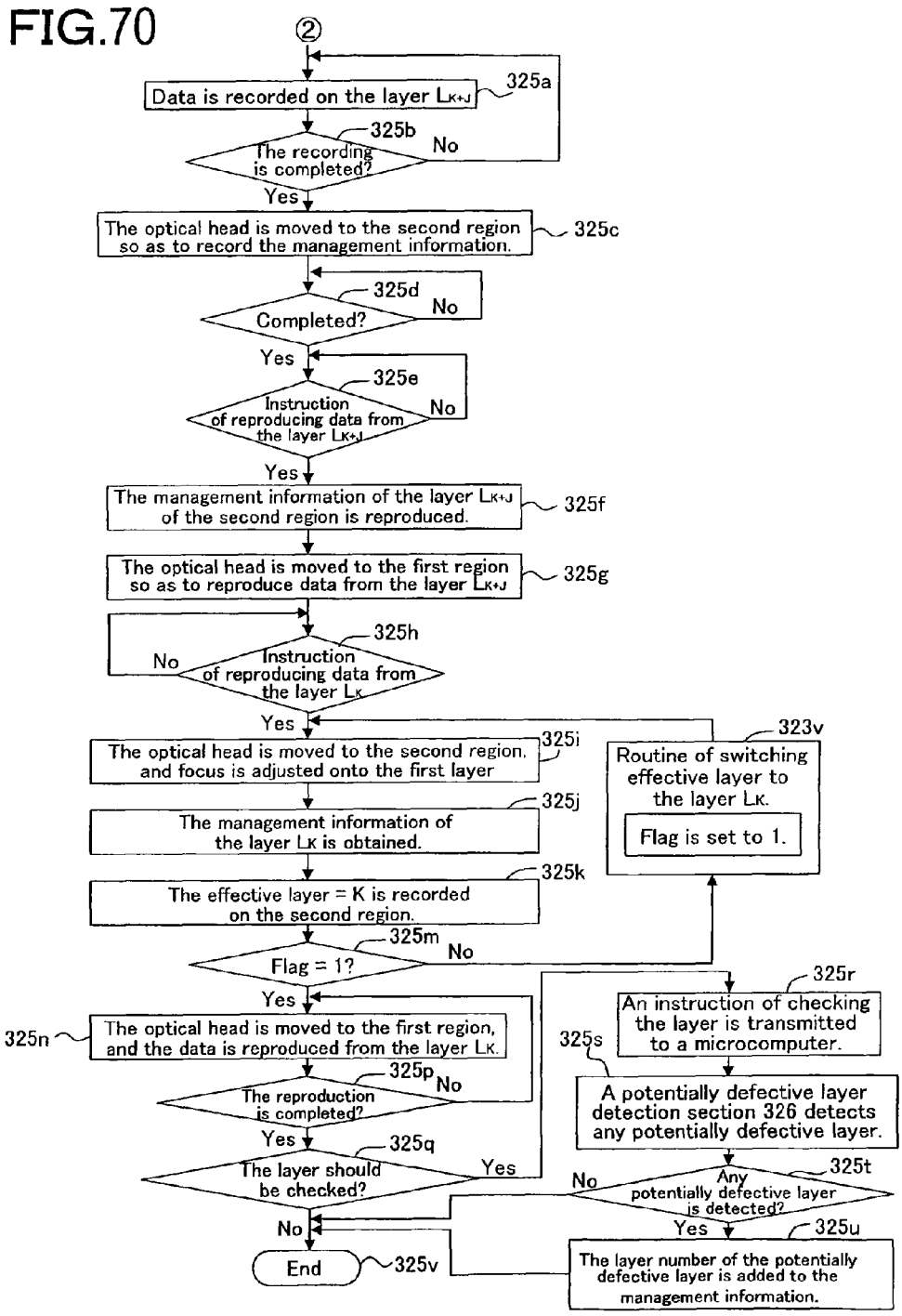
FIG. 70 is a flow chart showing recording/reproduction of a disc according to one embodiment of the present invention.

FIGS. 68, 69 and 70 are flowcharts showing a procedure of recording information on a disc or reproducing information from the disc.

First, a disc is mounted on a recording/reproduction apparatus (step 323a). A focus is adjusted onto a ROM section or a RAM section of a first layer of a second region (step 323b). Property information (total number of disc layers, capacity for each layer, inherent ID, RAM for each layer, property information of W/O, the layer number of the defective layer, the layer number of any layer in which a defect can occur, etc.) of the disc and a cryptographic key for controlling an unauthorized duplication of the disc are read from the RAM section or ROM section in the first layer of the second region, or a memory 25a in the IC 4 (step 323d).

When a recording instruction to a layer $L_K$ is received in step 323e, the process proceeds to step 323f. There, a check is performed to determine if the layer $L_K$ is an unrequired layer. If so, the layer $L_K$ is newly defined as a reserve layer h (step 323g). A check is performed to determine if the layer $L_K$ is a potentially defective layer in step 323h. If so, all the data contained in the layer $L_K$ is moved to a reserve layer j, and the j layer is redefined as a layer $L_K$ (step 323i). Thereafter, the process proceeds to step 323j, and file management information (such as FAT, VAT, UDF) of the layer $L_K$ is read from the second region, so that an ending point of at least the last recorded data and information of an effective layer (target layer) are obtained so as to identify the target layer. A check is performed to determine in step 323k if the effective layer is the layer $L_K$. If not, the process proceeds to a routine of switching to the layer $L_K$ in step 323v.

An instruction to "apply a voltage to the layer $L_K$" is transmitted via a coil 231 to the optical disc from the recording/reproduction apparatus 35 shown in FIG. 55 in step 323w. Voltages are applied from the layer-switching signal generation section 331 to conducting layers immediately above and immediately below the layer $L_K$, respectively, in step 323x. When a certain amount of time has passed (step 323y) and a switching completion information is received from the optical disc 1 (step 323z), a flag is set to "1" (flag=1) (step 323m). Thereafter, the process proceeds to step 323n. There, the optical head is moved from the second region to the first region (step 323n). A focus is adjusted onto the layer $L_K$ (step 323p). A layer data information X is read from the layer where the focus is adjusted onto the layer $L_K$ (step 323q). A check is performed to determine if the layer indicated by the layer data information X and the layer $L_K$ are matched (step 323r). If "NO", the operation is terminated. If "OK", the optical head is moved to an address available for starting a recording operation (step 323s). A laser power is increased so as to record data (step 323t). After the completion of recording in step 323u, the process proceeds to step 324a in FIG. 69.

The optical head is moved to the second region in step 324a. There, a focus is adjusted onto the first layer of the second region (step 324c) without switching a target layer (step 324b). File management information (such as FAT, VAT, UDF, TOC, last recorded address layer information), etc, is recorded on an RAM region of the second region 318 in step 324d. Next, the file name, information necessary for searching a file of property information and the like, a video thumbnail or compressed or uncompressed starting information indicating first 5 to 10 seconds of motion video is recorded on the second region (step 324e).

When next instruction of recording data is received (step 324f), the optical head is returned to the first region. There, data is recorded on the layer $L_K$, and layer information indicating that this layer is the layer $L_K$ is recorded on the layer $L_K$ (step 324g). When an instruction of recording data on the layer $L_{K+J}$ is received (step 324h), the optical head is returned to the second region 318 (step 324i). There, a routine of switching to the layer $L_{K-1}$ is performed, and information of switching to the layer $L_{K+J}$ is transmitted to the disc (step 324p). Thereafter, a voltage is applied to layers adjacent to the layer $L_{K+J}$ (step 324q). When a certain amount of time has passed, or the layer-switching completion information is received from the disc (step 324r), the flag is set to "1" (step 324s). Thereafter, the process proceeds to step 324j, and there, file management information of the layer $L_K$ is recorded on the first layer (can be second or third layer if any) of the second region 318. When the recording is completed (step 324k), the process proceeds to step 324n since the flag is set to "1" in step 324m due to the completion of switching a target layer. There, focus is adjusted onto the layer $L_{K+J}$ of the first region, and the process proceeds to step 325a in FIG. 70.

Data is recorded on the layer $L_{K+J}$ in step 325a. When the recording is completed (step 325b), the optical head is moved to the second region so as to record the management information (step 325c), and then, the processing is completed (step 325d). When an instruction for reproducing data from the layer $L_{K+J}$ is received in step 325e, first, the file management information (such as FAT) of the layer $L_{K+J}$ of the second region is reproduced (step 325f), and thereafter, the optical head is moved to the first region so as to reproduce data from the layer $L_{K+J}$ (step 325g).

When an instruction for reproducing data from the layer $L_K$ is received in step 325h, an effective layer (target layer) is switched from the layer $L_{K+J}$ to the layer $L_K$ due to a routine of switching to the layer $L_K$ at aforementioned step 323v. The optical head is moved to the second region. Focus is adjusted onto the first layer (step 325i). The management information of the layer $L_K$ is obtained (step 325j). Thereafter, the currently effective layer, i.e., the layer $L_K$, is set as a target layer, on which the management information is recorded on the second region (step 325k), and A check is performed to determine if the flag is set to "1" in step 325m, i.e., the effective layer has been switched to the layer $L_K$. If the optical head is moved to the first region or have been already moved to the first region, the focus is adjusted onto the first region, and, then the data is reproduced from the layer $L_K$ (step 325n). When the reproduction is completed in step 325p, a check is performed to determine if the state of the layer should be checked in step 325q. If "Yes", in step 325r, an instruction of checking the layer is transmitted to a microcomputer 367 (FIG. 55) of an IC included in a recording medium 1 (step 325r). A potentially defective layer detection section 326 applies a voltage between two respective layers to measure an insulating resistance or an impedance so as to detect potentially defective layers (step 325s). If a potentially defective layer is detected in step 325t, the layer number of the potentially defective layer is added to the management information contained in a memory 25a and/or the second region 318. After the layer number is added to the management information, operation ends in step 325v.

(Method for Tracking)

Figure 71:
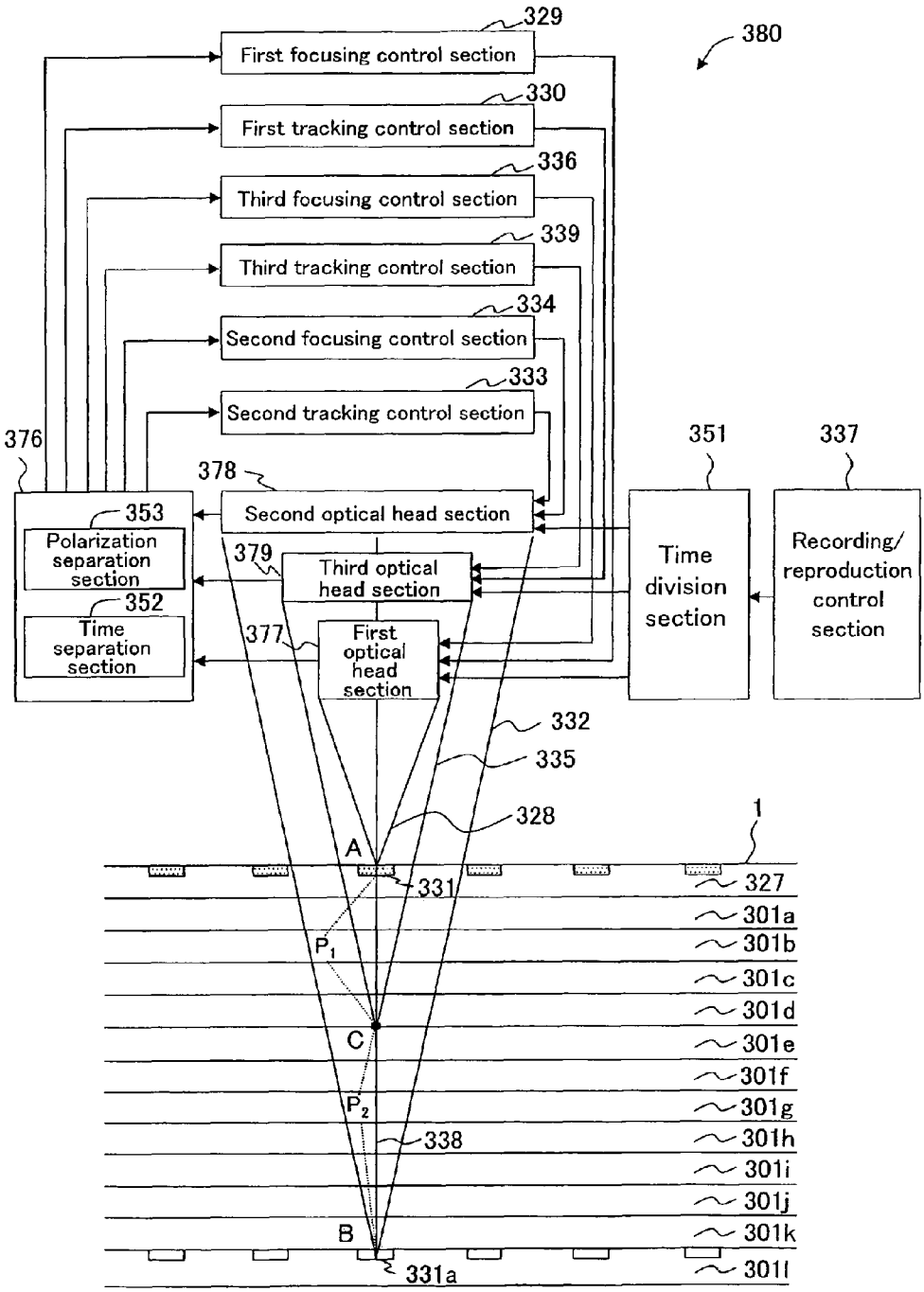
FIG. 71 is a diagram showing an apparatus for performing a three-point beam tracking system according to one embodiment of the present invention.

FIG. 71 shows an apparatus 380 for recording information on an optical disc 1 or reproducing information from the optical disc 1. The apparatus 380 can be any one of a recording/reproduction apparatus, a recording apparatus or a reproduction apparatus. The apparatus 380 includes first through third optical head sections 377, 378, 379, first through third focusing control sections 329, 334, 336, first through third tracking control sections 330, 333, 339, a recording/reproduction control section 337, a time division section 351 and a signal generation section 376. The signal generation section 376 includes a time separation section 352 and a polarization separation section 353.

The optical disc 1 shown in FIG. 71 includes a semi-transparent tracking layer 327 on which a track 331 is provided, a plurality of recording layers 301a-301l, etc. A track 331a is provided on a recording layer 301l.

The recording/reproduction control section 337 controls recording information on a predetermined recording layer (e.g., recording layer 301e) or controls reproducing information from the predetermined recording layer. A control signal output from the recording/reproduction control section 337 is divided by the time division section 351 as necessary, and the divided control signals are sequentially input to the first through third optical head sections 377, 378, 379. Each optical head section includes a laser emitting section, optical components (lens, polarization plate, beam-splitter, etc.) and an actuator, etc.

The signal generation section 376 uses the time-division section 352 and the polarization separation section 353 to separate the reflection light received from the optical disc via each optical head section so as to generate a focusing error signal and a tracking error signal for each light separated. The signals thus generated by the signal generation section 376 are sequentially input to the first through third focusing control sections 329, 334, 336 and the first through third tracking control sections 330, 333, 339.

The first focusing control section 329 controls focusing of the first laser light 328 output from the first optical head section 377. The first tracking control section 330 controls tracking of the first laser light 328. The second focusing control section 334 controls focusing of the second laser light 332 output from the second optical head section 378. The second tracking control section 333 controls tracking of the second laser light 332. The third focusing control section 336 controls focusing of the third laser light 335 output from the third optical head section 379. The third tracking control section 339 controls tracking of the third laser light 335.

A tracking method of recording information on a predetermined recording layer (e.g., recording layer 301e) or reproducing information from the predetermined recording layer will be described. A track 331 for tracking information is provided on the uppermost layer of the optical disc 1, which is referred to as a tracking layer 327. Herein, the target layer on which recording or reproduction is performed is a recording layer 301e.

First, the first laser light 328 is irradiated onto the track 331 contained in the tracking layer 327 by using the first focusing control section 329 and the first tracking control section 330. Thereby, recorded addresses or track numbers are reproduced by wobbling continuous grooves, etc. The second laser light 332 is irradiated onto the track 331a contained in the lowermost recording layer 301l by using the second focusing control section 334 and the second tracking control section 333. Thereby, recorded addresses or track numbers are reproduced by wobbling continuous grooves, etc. Since the first laser light 328 and the second laser light 332 possess the same polarization angle θa and both are also modulated with time-division, the first laser light 328 and the second laser light 332 can be separated with the time-division. Address information is readily separated since it is indicated by frequency components in a low bandwidth.

The third laser light 335 is irradiated onto the recording layer 301e of the target layer by using the third focusing control section 336. Since the third laser light 335 possesses a polarization angle, 90° different from the polarization angle θa, the reflection light of the third laser light 335 can be optically separated from the reflection lights of other laser lights by using a polarization filter/polarization mirror included in the polarization separation section 353. Thereby, the focusing of the third laser light 335 and recording/reproduction on/from the recording layer can be performed. The focus of the third laser light 335 has a predetermined positional relationship with the focus of the first laser light 328 and the focus of the second laser light 332.

Figure 72:
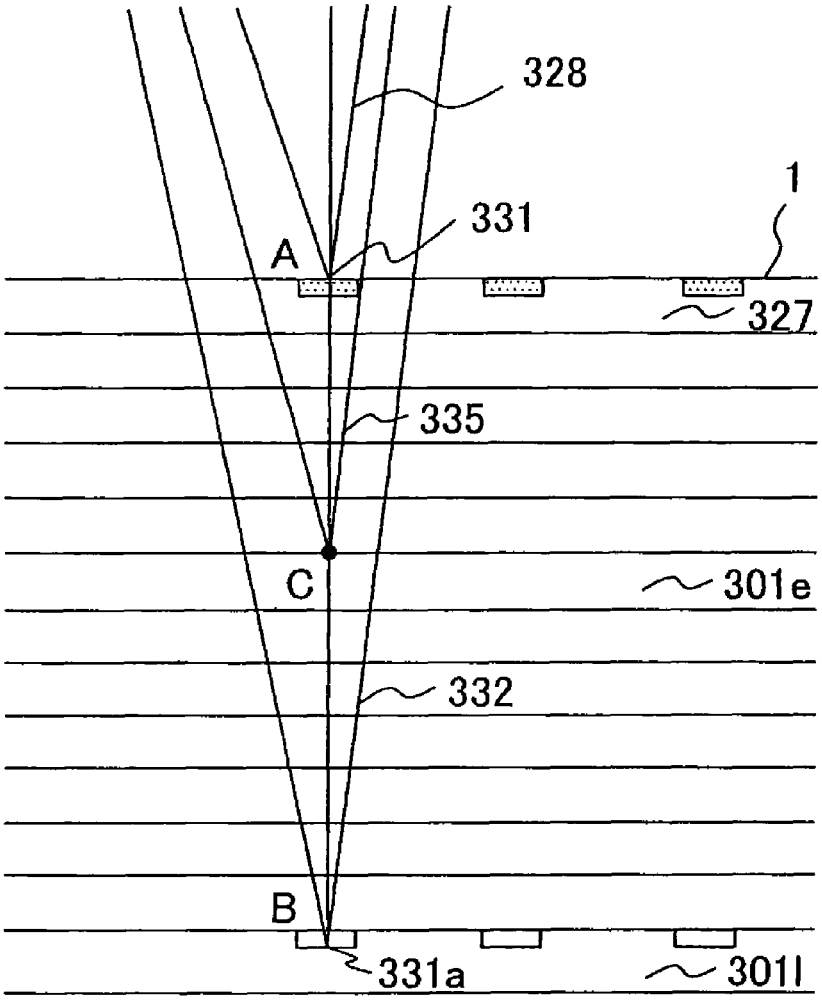
FIG. 72 is a diagram showing an operational principle of a three-point beam tracking system according to one embodiment of the present invention.

According to this method, first, tracking of the first laser light 328 and the second laser light 332 is controlled. The laser light 335 is controlled such that the focus is positioned at $P_2/(P_1+P_2)$ on a straight line 338 which connects the track 331 and the track 331a. The $P_1$ represents the number of layers from the tracking layer 327 to the recording layer 301e (the recording layer 301e not included). The $P_2$ represents the number of layers from the recording layer 301e to the recording layer 301l (the recording layer 301l not included). In the example shown in FIG. 71 where $P_1$ represents 5 ($P_1$=5) and $P_2$ represent 7 ($P_2$=7), the laser light 335 is controlled by the third focusing control section 336 such that AC:CB=5:7. When the positional relationship between the focus of the first laser light 328 and the focus of the third laser light 335 and the focus of the second laser light 332 and the focus of the third second laser light 335 are respectively maintained, the focus of the third laser light 335 scans a virtual track. That is, when tracking of the first laser light 328 and the second laser light 332 is controlled by using the first tracking control section 330 and the second tracking control section 333, respectively, tracking of the third laser light 335 can be controlled. Even if the direction of incidence of the third laser light 335 is tiled as shown in FIG. 72, the third laser light 335 is accurately tracked with easy reenactment without the track on the recording layer 301e since it is always on a straight line AB which connects the track 331 and the track 331a.

(Four-Beam Tracking System)

Figure 73:
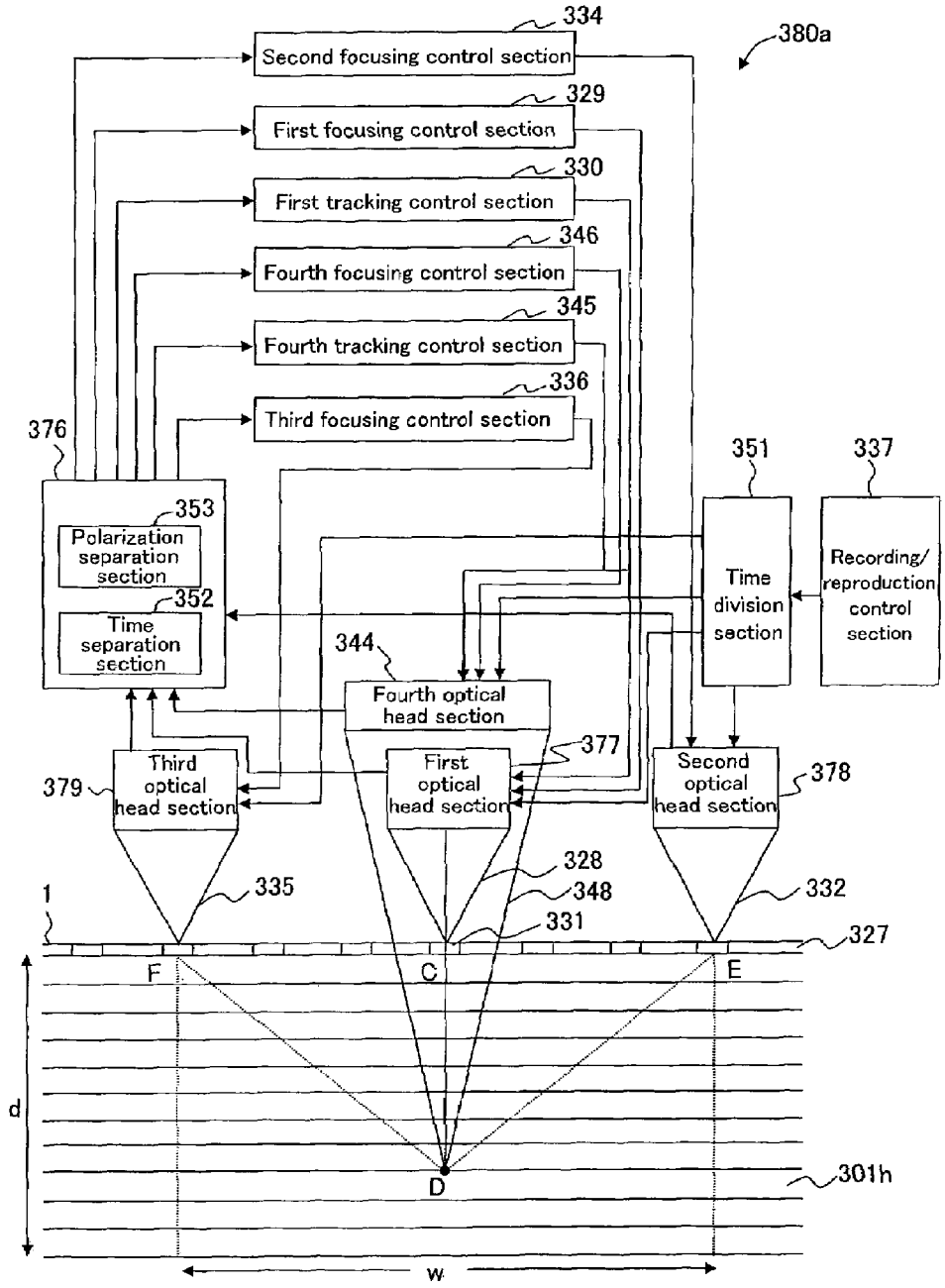
FIG. 73 is a diagram showing an apparatus for performing a four-point beam tracking system according to one embodiment of the present invention.

FIG. 73 shows an apparatus 380a for recording information on the optical disc 1 or reproducing information from the optical disc 1. The apparatus 380a can be any one of a recording/reproduction apparatus, a recording apparatus or a reproduction apparatus. The apparatus 380a controls tracking of a laser light as in the case of the apparatus 380 shown in FIG. 71. In the apparatus 380a shown in FIG. 73, the same reference numbers are denoted to the constituents which possess the same functions as the constituents in the apparatus 380, and the description thereof is omitted.

The apparatus 380a includes first through fourth optical head sections 377, 378, 379, 344, first through fourth focusing control sections 329, 334, 336, 346, first tracking control section 330, a fourth tracking control section 345, a recording/reproduction control section 337, a time division section 351 and signal generation section 376. Similar to other optical head sections, the fourth optical head section 344 includes a laser emitting section, optical components (lens, polarization plate, beam-splitter, etc.) and an actuator, etc. The fourth focusing control section 346 controls focusing of the fourth laser light 348 output from the fourth optical head section 344. The fourth tracking control section 345 controls tracking of the fourth laser light 348. In the optical disc 1 shown in FIG. 73, the recording layer 301l is omitted from the optical disc 1 shown in FIG. 71, and the only layer on which a track is formed is the tracking layer 327.

A four-beam tracking method of recording information on a predetermined recording layer (e.g., recording layer 301e) or reproducing information from the predetermined recording layer will be described. The first laser light 328 is irradiated onto the track 331 on the tracking layer 327 by using the first focusing control section 329 and the first tracking control section 330. Focusing the second laser light 332 and the third laser light 335 are controlled by using the second focusing control section 334 and the third focusing section 336 such that the focuses of the second laser light 332 and the third laser light 335 are adjusted onto the tracking layer 327. The first through third laser lights possess the same polarization angle θa, so that the first through third laser lights can be optically separated from the fourth laser light 348. Since the first through third laser lights can be emitted in a low frequency, the first through third laser lights are controlled with time-division by using the time division section 351 so as to be emitted. Thus, respective reflection lights of the laser lights can be separated from one another by the time separation section 352. Therefore, tracking and focusing the reflection lights can be controlled independently from one another. The fourth laser light 348 possesses a polarization angle, 90° different from the polarization angle θa. The fourth laser light 348 is irradiated by the fourth focusing control section 346 such that the focus of the fourth laser light 348 is adjusted onto a recording layer 301h. The fourth laser light 348 has a predetermined positional relationship with the first through third laser lights 328, 332, 335, respectively According to the four-beam tracking method, the fourth tracking control section 345 controls the fourth laser light 348 such that the optical axis of the fourth laser light 348 is vertical to straight lines passing through F, C and E. Herein, F represents the focus of the third laser light 335. C represents the focus of the first laser light 328. E represents the focus of the second laser light 332. When the respective focuses of the first through third laser lights 328, 332, 335 are adjusted onto the tracking layer 327, the focus of the fourth laser light 348 scans a virtual track. That is, when focusing of the first through third lights 328, 332, 335 and tracking of the first laser light 328 are controlled, tracking of the fourth laser light 348 can be controlled.

In this case, focusing error between the second laser light 332 and the third laser light 335 is about 0.2μ. When the distance between the tracking layer 327 and the lowermost layer of the recording layer is denoted as d, the width w between the second laser light 332 and the third laser light 335 is required to be w>d. In the case with this condition, the track error is 0.2 to 0.3μ. As a result, a margin with the next track can be secured. Since the first through third laser lights 328, 332, 335 possess a different polarization angle from that of the fourth laser light 348, the first through third laser lights 328, 332, 335 and the fourth laser light 348 can be separated from each other by using the polarization separation section 354. Therefore, focusing control of the fourth laser light 348 and the recording/reproduction on/from the recording layer with the fourth laser light 348 can be performed independently from the other laser lights.

Irradiation with the second laser light 332 can be omitted. Only focusing of the first laser light 328 and the third laser light 335 and tracking of the first laser light 328 can control tracking of the fourth laser light 348.

(Circuit Operation Within a Recording Medium)

As shown in FIG. 55, a recording/reproduction apparatus 35 transmits data with a high bandwidth signal from a frequency separation section 360 and transmits power with a low bandwidth signal. The signals are transmitted from the recording/reproduction apparatus 35 to an IC 4 through a radio communication via antennas, i.e., a coil 18 and a coil 231. The signals received at the IC 4 are respectively separated into a high bandwidth signal and a low bandwidth signal by using a HPF 361 and an LPF 362 included in the frequency separation section 360. The high bandwidth signal is transformed into data such as a layer data (layer-switching instruction) 364 by using a demodulation section 363. A layer-switching signal generation section 311, which has received the layer data 364, switches transmission paths for voltages $V_1$, $V_2$ and 0 output from the signal generation section 312 so as to apply the voltages to predetermined conducting layers. A power supply section 22 acts as a power supply section for supplying power to, for example, the layer-switching signal generation section 311. The power supply section 22 receives the low bandwidth signal received through the radio communication as power 22 and supplies the power 22 thus received to, for example, the layer-switching signal generation section 311.

A potentially defective layer detection section 326 applies DC or AC voltage to each layer to measure resisting value or impedance so as to check the insulative properties thereof, so that the potentially defective layer detection section 326 determines layers which have lower values for certain insulative properties as potentially defective layers and sends the result data thus determined to the microcomputer so as to accumulate the result data in a memory 25a. Data (such as, total number of layers, the layer number of the current target layer, number of layers on which information is recorded, the layer number of the defective layer, disc ID) including this data contained in the memory 25a is transmitted to the recording/reproduction apparatus 35 via the coil 231 from the demodulation circuit 365 and the transmitting section 366. The data can be transmitted through radio as in the case of the aforementioned RF-ID operation. Alternatively, the data can be transmitted together with the disc ID as in the case of the RF-ID operation. The RF-ID section 368 includes a demodulation circuit 365a. Phase change, a destruction type and color changing type recording methods have been described as methods of recording marks. However, other recording methods, such as optical magnetic recording can be used as a method of recording marks.

At least the following items are within the scope of the present invention.

A1 An optical disc including: a plurality of recording layers; a receiving section for receiving, from outside the optical disc, a switching instruction for switching a target layer to be targeted for recording/reproducing information among the plurality of the recording layers; and a switching section for switching the target layer among the plurality of recording layers, based on the received switching instruction.

A2 An optical disc according to A1, further including a plurality of conducting layers, wherein each of the plurality of conducting layers is provided adjacent to at least one corresponding recording layer of the plurality of recording layers, and the switching section adjusts voltages being applied to each of the plurality of conducting layers so as to switch the target layer.

A3 An optical disc according to A1, wherein the receiving section receives the switching instruction through a radio communication from outside the optical disc.

A4 An optical disc according to A1, further including a power supply section for supplying power to the switching section.

A5 An optical disc according to A4, wherein the power supply section receives power through a radio communication with outside the optical disc.

A6 An optical disc according to A1, further including a substrate on which the plurality of recording layers are provided, wherein a hole is formed on the substrate, and the receiving section and the switching section are embedded into the hole.

A7 An optical disc according to A1, further including a substrate on which the plurality of recording layers are provided and an integrated circuit section including the receiving section and the switching section, wherein a hole is formed on the substrate, and the integrated circuit section is embedded into the hole.

A8 An optical disc according to A1, wherein at least a portion of the plurality of the recording layers is switched between an active state and a non-active state in response to whether an activation signal output from the switching section is applied thereto or not, the optical disc further includes a predetermined region with an active state when no activation signal is applied, and property information indicating properties of the optical disc is recorded on the predetermined region.

A9 An optical disc according to A8, wherein the predetermined recording region is in an active state regardless of presence of the activation signal.

A10 An optical disc including: a plurality of recording layers, wherein at least a portion of the plurality of the recording layers is switched between an active state and a non-active state in response to whether an activation signal is applied thereto or not, the optical disc further includes a predetermined recording region with an active state when no activation signal is applied.

A11 An optical disc according to A10, including a first region on which the plurality of the recording layers are provided and a second region on which one recording layer is provided, wherein the second region includes the predetermined recording region.

A12 An optical disc according to A10, wherein property information indicating properties of the optical disc is recorded on the predetermined recording region.

A13 An optical disc according to A10, wherein the predetermined recording region is in an active state regardless of presence of the activation signal.

A14 An optical disc according to A10, wherein the predetermined recording region is in a non-active state when the activation signal is applied thereto.

A15 An apparatus for recording information on an optical disc or reproducing information from the optical disc, the optical disc including: a predetermined layer, a first and a second layer on which tracks being respectively provided, the apparatus including a first tracking control section for controlling tracking of a first laser light to be irradiated onto the first layer; and a second tracking control section for controlling tracking a second laser light to be irradiated onto the second layer, wherein a third laser light to be irradiated onto the predetermined layer has a predetermined positional relationship with the first laser light and the second laser light, the first tracking control section and the second tracking control section respectively controls tracking of the first laser light and the second laser light as so to control tracking of the third laser light.

A16 An apparatus for recording information on an optical disc or reproducing information from the optical disc, the optical disc including a predetermined layer, a first layer on which a track being provided, the apparatus including: a tracking control section for controlling tracking of a first laser light to be irradiated onto the first layer; a first focusing control section for controlling focusing of a second laser light to be irradiated onto the first layer; and a second focusing control section for controlling focusing of a third laser light to be irradiated onto the predetermined layer, wherein the third laser light has a predetermined positional relationship with the first laser light and the second laser light, the tracking control section and the first focusing section respectively controls tracking of the first laser light and focusing of the second laser light so as to control tracking of the third laser light.

INDUSTRIAL APPLICABILITY

According to the present invention, it becomes possible to manage IDs of discs by attaching a radio wave transmission/reception IC, including ID information, to the discs.

According to a manufacturing method of the present invention, it becomes easy to fabricate an optical disc having a radio wave transmission/reception IC, including ID information, attached thereto.

The present invention solves difficulty of searching data recorded on an exchangeable type of medium, such as an optical disc. Thus, a method of manufacturing an optical disc with an easy operation of searching data recorded on the optical disc is provided.

According to the present invention, an optical disc includes a receiving section for receiving a switching instruction for switching a target layer and a switching section for switching a target layer based on the received switching instruction. Thereby, the optical disc can switch without applying a voltage to a conducting layer of the optical disc directly from a recording/reproduction apparatus.

The present invention achieves control of tracking of a laser light to be irradiated on a target layer by controlling tracking of another laser light. Thereby, even in the case that no track is provided on the target layer, tracking of a laser light irradiated on the target layer can be controlled.

The invention claimed is:

[1. An optical disc comprising:

a plurality of recording layers;

a receiving section for receiving, from outside the optical disc, a switching instruction for switching a target layer to be targeted for recording/reproducing information among the plurality of the recording layers; and a switching section for switching the target layer among the plurality of recording layers, based on the received switching instruction, wherein the switching section includes a signal generation section generating three switching signals for switching the target layer.]

[2. An optical disc according to claim 1, further comprising a plurality of conducting layers, wherein each of the plurality of conducting layers is provided adjacent to at least one corresponding recording layer of the plurality of recording layers, and the switching section adjusts voltages being applied to each of the plurality of conducting layers so as to switch the target layer.]

[3. An optical disc according to claim 1, wherein the receiving section receives the switching instruction through a radio communication from outside the optical disc.]

[4. An optical disc according to claim 1, further comprising a power supply section for supplying power to the switching section.]

[5. An optical disc according to claim 4, wherein the power supply section receives power through a radio communication with outside the optical disc.]

[6. An optical disc according to claim 1, further comprising a substrate on which the plurality of recording layers are provided, wherein a hole is formed on the substrate, and the receiving section and the switching section are embedded into the hole.]

[7. An optical disc according to claim 1, further comprising a substrate on which the plurality of recording layers are provided and an integrated circuit section including the receiving section and the switching section, wherein a hole is formed on the substrate, and the integrated circuit section is embedded into the hole.]

[8. An optical disc according to claim 1, wherein at least a portion of the plurality of the recording layers is switched between an active state and a non-active state in response to whether an activation signal output from the switching section is applied thereto or not, the optical disc further includes a predetermined region with an active state when no activation signal is applied, and property information indicating properties of the optical disc is recorded on the predetermined region.]

[9. An optical disc according to claim 8, wherein the predetermined recording region is in an active state regardless of presence of the activation signal.]

[10. An optical disc including:

a plurality of recording layers, wherein at least a portion of the plurality of the recording layers is switched between an active state and a non-active state in response to whether an activation signal is applied thereto or not, wherein the activation signal is generated from the optical disc, the optical disc further includes a predetermined recording region with an active state when no activation signal is applied.]

[11. An optical disc according to claim 10, including a first region on which the plurality of the recording layers are provided and a second region on which one recording layer is provided, wherein the second region includes the predetermined recording region.]

[12. An optical disc according to claim 10, wherein property information indicating properties of the optical disc is recorded on the predetermined recording region.]

[13. An optical disc according to claim 10, wherein the predetermined recording region is in an active state regardless of presence of the activation signal.]

[14. An optical disc according to claim 10, wherein the predetermined recording region is in a non-active state when the activation signal is applied thereto.]

*15. A mobile communication device for conducting wireless communication with an external relay device connected to an external server through the Internet and for conducting near field communication with an external terminal in a modulation method which is different from a modulation method for the wireless communication, comprising:*

*an information processing section;*

*a first communication section for conducting near field communication with an external terminal, which is external to the mobile communication device, upon receipt of an instruction from the information processing section, to receive, from the external terminal, terminal information including identification information of the external terminal stored in a storage section of the external terminal, wherein the identification information identifies the external terminal;*

*a second communication section for transmitting the identification information received by the first communication section to the server through the relay device and the Internet, and for receiving related information including coded motion pictures having a plurality resolutions, which is related to identification information, that is stored in a storage section of the server, through the Internet and the relay device from the server;*

*a motion picture decoder for decoding the coded motion picture to generate a motion picture having a resolution lower than a predetermined resolution from the plurality of resolutions and corresponding to the identification information included in the terminal information received by the first communication section, the related information being stored in the server; and*

*a display section for displaying the motion picture generated by the motion picture decoder.*

*16. A mobile communication device according to claim 15, wherein the near field communication by the first communication section uses a frequency band in the neighborhood of 13.5 MHz.*

*17. A mobile communication device according to claim 15, wherein the mobile communication device supplies electric power to the external terminal through the near field communication, and wherein, due to the electric power, the terminal information is read from the storage section of the external terminal and the terminal information is sent to the mobile communication device.*

* * * * *